(12) United States Patent
Hirai et al.

(10) Patent No.: US 7,410,677 B2
(45) Date of Patent: Aug. 12, 2008

(54) ORGANOSILICON COMPOUND-CONTAINING POLYMERIZABLE LIQUID-CRYSTAL COMPOSITION

(75) Inventors: Yoshiharu Hirai, Chiba (JP); Takashi Kato, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 544 days.

(21) Appl. No.: 11/002,225

(22) Filed: Dec. 3, 2004

(65) Prior Publication Data
US 2005/0224754 A1 Oct. 13, 2005

(30) Foreign Application Priority Data
Dec. 12, 2003 (JP) ............................. 2003-415332
Apr. 22, 2004 (JP) ............................. 2004-126705

(51) Int. Cl.
*C09K 19/00* (2006.01)
*C09K 19/52* (2006.01)

(52) U.S. Cl. ...................... 428/1.1; 430/20; 252/299.01

(58) Field of Classification Search .................. 428/1.1; 430/20; 252/299.01
See application file for complete search history.

(56) References Cited

U.S. PATENT DOCUMENTS

| | | | |
|---|---|---|---|
| 5,211,877 A * | 5/1993 | Andrejewski et al. .. | 252/299.01 |
| 6,287,650 B1 | 9/2001 | Pauluth et al. | |
| 6,685,998 B1 | 2/2004 | Nishikawa et al. | |
| 6,816,218 B1 | 11/2004 | Coates et al. | |
| 2002/0054260 A1 | 5/2002 | Maeda et al. | |
| 2002/0054269 A1 | 5/2002 | Maeda et al. | |
| 2002/0136845 A1 | 9/2002 | Pauluth et al. | |

OTHER PUBLICATIONS

Abstract of JP2002006138 published Jan. 9, 2002.
Abstract of JP2001222009 published Aug. 17, 2001.
Abstract of JP2002372623 published Dec. 26, 2002.
Abstract of JP2003211465 published Jul. 29, 2003.
Abstract of JP10319408 published Dec. 4, 1998.
Abstract of JP11240890 published Sep. 7, 1999.

* cited by examiner

*Primary Examiner*—Geraldina Visconti
(74) *Attorney, Agent, or Firm*—Wenderoth, LInd & Ponack, L.L.P.

(57) ABSTRACT

An object of the invention is to provide a polymerizable liquid-crystal composition for obtaining a liquid-crystal film having good adhesiveness to supporting substrates. A polymerizable liquid-crystal layer of controlled alignment can be formed from the polymerizable liquid-crystal composition, and when the polymerizable liquid-crystal composition is polymerized, it gives a liquid-crystal film.

The polymerizable liquid-crystal composition of the invention contains a polymerizable liquid-crystal compound represented by Formula (1) and a organosilicon compound having a primary amino group.

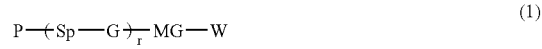

(1)

wherein W is hydrogen, alkyl, alkenyl, halogen, —CN or -(G-Sp)$_r$-P; P is a polymerizable group; Sp is alkylene; G is a bonding group; and MG is a mesogenic group represented by Formula (2):

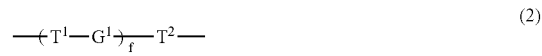

(2)

wherein $T^1$ and $T^2$ are ringed group; $G^1$ is a bonding group; and f is an integer of 0 to 4. The symbols in these formulae are defined in detail in claim 2.

44 Claims, 2 Drawing Sheets

ORGANOSILICON COMPOUND-CONTAINING POLYMERIZABLE LIQUID-CRYSTAL COMPOSITION

FIELD OF THE INVENTION

The present invention relates to a polymerizable liquid-crystal composition containing an organosilicon compound and to a liquid-crystal film obtained from it. Further, the invention relates to an optical device and a liquid-crystal display device comprising the film.

BACKGROUND OF THE INVENTION

Recently, application of polarizers and phase retarders that comprise photopolymerizable liquid crystals to optical devices has been proposed. Such optical devices are obtained by polymerizing polymerizable liquid crystals having optical anisotropy in the liquid-crystal condition thereof and fixing the condition. Polymerizable liquid crystals can be subjected to suitable alignment control in the liquid-crystal condition and can be polymerized while they still keep the alignment state thereof. Accordingly, various polymers of different optical anisotropy can be obtained from them by fixing the director of the liquid-crystal skeleton in any alignment state of homogeneous alignment, tilted alignment, homeotropic alignment or twisted alignment. In the following description, showing the above-mentioned alignment state may be simply referred to as "having homogeneous alignment", "having tilted alignment", "having homeotropic alignment", or "having twisted alignment".

Polymers having homogeneous alignment can be used, for example, as combined with ½ wavelength plates, ¼ wavelength plates, or films of any other optical functions. Polymers having tilted alignment can be applied to, for example, viewing angle compensators in TN (twisted nematic) modes. Polymers having homeotropic alignment improve the viewing angle characteristics of polarizers, for example, when combined with films of any other functions. Polymers having homeotropic alignment have an optical axis in the n, direction, and the refractive index thereof in the direction of the optical axis is larger than that in the direction perpendicular to the optical axis direction, and therefore, they are in a group of positive C-plates in terms of the index ellipsoid. When combined with films of any other functions, the positive C-plates can be applied to optical compensation of horizontally-oriented liquid-crystal modes, i.e., IPS (in-plane switching) modes, for example, for improvement of the viewing angle characteristics of polarizers.

Polymers having twisted alignment, or that is, cholesteric liquid-crystal polymers essentially comprising polymerizable liquid-crystal molecules having positive birefringence can be applied to various optical devices depending on the helical pitch (P) thereof. For visible light, for example, when P is sufficiently larger than the wavelength of visible light, the polymers of the type may be applied to head-up displays or projectors based on the function as rotators thereof, or may be applied to optical compensation in STN (super twisted nematic) modes based on the function of birefringence thereof. When P is on the same level as that of a visible light wavelength, the polymers may be applied to the field of designs such as decorative structures that utilize selective reflection, to forgery preventive technology, and to color filters or brightness-increasing films in liquid-crystal display devices (see Non-Patent Reference 1). The refractive index in a visible light region to the plane vertical to the helical axis of the polymers is represented by $((ne^2+no^2)/2)^{0.5}$, and the refractive index in a visible light region in the direction of the helical axis is equal to no (see Non-Patent Reference 2). Optical films having such optical characteristics are referred to as negative C-plates. The negative C-plates have an optical axis in the $n_z$ direction, and the refractive index thereof in the direction of the optical axis is smaller than the refractive index ($n_x$, $n_y$) in the direction perpendicular to the optical axis direction ($n_z<n_x=n_y$). Accordingly, optically-anisotropic media of which the refractive index satisfies $n_z>n_x=n_y$ may be optically compensated by negative C-plates. Of optically-anisotropic media, especially those of nematic liquid crystals having a region in which the alignment direction of the liquid crystals is vertical to the liquid crystal cell plane can be compensated by negative C-plates. Accordingly, negative C-plates could be good optical compensators suitable for improvement of the viewing angle characteristics of liquid-crystal display devices, especially those of VA (vertically aligned), TN (twisted nematic), OCB (optically compensated birefringence), or HAN (hybrid aligned nematic) modes. At present, compressed polymer films or films of discotic liquid crystals having planar-oriented negative birefringence (see Patent Reference 1) are used for optical compensators. Utilizing polymers of cholesteric liquid crystals of liquid-crystal molecules having positive birefringence broadens the latitude in planning refractive index anisotropy and wavelength dispersion. Negative C-plates can be combined with various optical compensation layers.

In any of the above-mentioned applications, optically-anisotropic films may be provided inside cells, or outside cells. Examples of providing them inside cells are described in Patent Reference 2. Examples of providing them outside cells are described in Patent Reference 3. When they are provided outside cells, the polymerizable liquid-crystal material for them may be laminated on a supporting substrate of a film of TAC (triacetyl cellulose) or norbornene polymer.

When a polymer of polymerizable liquid crystal is provided inside cells, it is required to have good heat resistance; and when the polymer is provided outside cells, it is required to have good adhesiveness to the supporting substrate for it and have good heat resistance and moisture resistance. Common to the two cases, photopolymerizable liquid crystals are desired to have the following properties before polymerization, or that is, to have a nematic phase at room temperature, to have good alignment and to have rapid curability through exposure to UV in air. Further, as the properties thereof after polymerization, it is important that they have good An in accordance with optical designing, have good transparency, and have good heat resistance and moisture resistance. It is therefore desired to develop photopolymerizable liquid-crystal compositions capable of giving such polymers. Of these properties, in particular, the adhesiveness of the polymer films to supporting substrate when the films are provided outside cells, and the heat resistance or uniform alignment thereof are problematic and could not be fully satisfied at present. In particular, regarding homeotropic alignment, methods of applying a long-chain alkyl-having surfactant, a coupling agent, a metal complex or the like to supporting substrates of glass or the like are disclosed in Non-Patent Reference 3, Patent Reference 4, Patent Reference 5 and Patent Reference 6. However, even though these methods are utilized, the uniformity and the stability of homeotropic alignment are still unsatisfactory.

Non-Patent Reference 1: Y. Hisatake et al., Asia Display/IDW '01 LCT8-2,

Non-Patent Reference 2: W. H. de Jew, Physical Properties of Liquid Crystalline Materials, Gordon and Breach, New York (1980), Non-Patent Reference 3: Kikan kagaku sosetsu No. 22, Chemistry of Liquid Crystal, The Chemical Society of Japan, P.99, Patent Reference 1: JP-A 2002-6138,
Patent Reference 2: JP-A 2001-222009,
Patent Reference 3: JP-A 2002-372623,
Patent Reference 4: JP-A 2003-211465,
Patent Reference 5: JP-A 10-319408,
Patent Reference 6: JP-A 11-240890.

An object of the invention is to provide a polymerizable liquid-crystal composition to give liquid-crystal films having good adhesiveness to supporting substrates, good heat resistance and uniform alignment. Further, another object of the invention is to provide an alignment-controlled liquid-crystal layer comprising the polymerizable liquid-crystal composition, to a liquid-crystal film formed through polymerization of the polymerizable liquid-crystal composition, and to provide an optical compensation film comprising the film. Still another object of the invention is to provide image display devices such as liquid-crystal display devices, organic EL display devices and PDP that comprise the optical compensation film.

SUMMARY OF THE INVENTION

We the present inventors have known that using a specific polymerizable liquid-crystal compound as a component of a polymerizable liquid-crystal composition and adding an organosilicon compound having a primary amino group to the polymerizable liquid-crystal composition are effective for control of the alignment morphology of the polymerizable liquid-crystal compound and that liquid-crystal films obtained from the polymerizable liquid-crystal composition have excellent adhesiveness to supporting substrates. Specifically, even though films or glass plates to be supporting substrates are not subjected to surface treatment, the alignment morphology of the polymerizable liquid-crystal compound can be controlled, and at the same time, liquid-crystal films having good adhesiveness to the supporting substrates and having uniform alignment can be obtained. Even when the polymerizable liquid-crystal composition is applied to supporting substrates subjected to mechanical surface treatment such as rubbing or to chemical surface treatment, the same effects can be obtained. The present invention has the following constitution.

[1] A polymerizable liquid-crystal composition containing a polymerizable liquid-crystal compound and an organosilicon compound having a primary amino group.

[2] A polymerizable liquid-crystal composition containing a polymerizable liquid-crystal compound represented by Formula (1) and an organosilicon compound having a primary amino group:

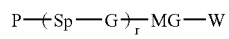

(1)

wherein W is hydrogen, alkyl having 1 to 25 carbon atoms, alkenyl having 2 to 6 carbon atoms, halogen, —CN, or -(G-SP)$_r$-P; in these alkyl and alkenyl, optional —CH$_2$— may be replaced by —O—, —S—, —NH—, —N(CH$_3$)—, —CO—, —COO—, —OCO—, —OCO—O—, —S—CO—, —CO—S— or —C≡C—, and optional hydrogen may be replaced by halogen; P is a polymerizable group; Sp is alkylene having 1 to 20 carbon atoms, and in the alkylene, when the number of carbon atoms is 2 or more, optional —CH$_2$— may be replaced by —O—, —CH=CH— or —C≡C—; G is a single bond, —O—, —S—, —CO—, —COO—, —OCO—, —O—COO—, —SO$_2$—O—, —O—SO$_2$, —CH$_2$O—, —OCH$_2$—, —CF$_2$O—, —OCF$_2$—, —CH=CH—COO—, —OCO—CH=CH—, —C≡C—COO—, —OCO—C≡C—, —(CH$_2$)$_3$O—, —O(CH$_2$)$_3$—, —CH=CH—CH$_2$O—, —OCH$_2$—CH=CH—, —(CH$_2$)$_2$—CF$_2$O— or —OCF$_2$—(CH$_2$)$_2$—; r is 0 or 1; and MG is a mesogen skeleton represented by Formula (2):

(2)

wherein T$^1$ and T$^2$ are independently 1,4-phenylene in which optional —CH= may be replaced by —N=, 1,4-cyclohexylene in which optional —CH$_2$— may be replaced by —O— or/and —S— and two carbon atoms not adjacent to each other may be crosslinked, 1,4-cyclohexenylene, naphthalene-2,6-diyl or fluorene-2,7-diyl; optional hydrogen in these rings may be replaced by halogen, —CN, —CF$_3$, —CF$_2$H, —NO$_2$, or alkyl having 1 to 7 carbon atoms; in the alkyl having 1 to 7 carbon atoms, optional —CH$_2$— may be replaced by —O—, —CH=CH— or —C≡C—, and optional hydrogen may be replaced by halogen; G$^1$ is a single bond, —O—, —CO—, —COO—, —OCO—, —SO$_2$—O—, —O—SO$_2$—, —OCF$_2$—, —CF$_2$O—, —CF=CF—, —CF$_2$CF$_2$—, —CH=CH—, —C≡C—, —CH=CH—COO—, —OCO—CH=CH—, —CH=CH—CH$_2$O—, —OCH$_2$—CH=CH—, —CONH—, —NHCO—, —(CH$_2$)$_2$—COO—, —OCO—(CH$_2$)$_2$—, —(CH$_2$)$_b$—, —O(CH$_2$)$_b$—, —(CH$_2$)$_b$O—, or —O(CH$_2$)$_b$O—; in these groups, b is an integer of 1 to 20; f is an integer of 0 to 4, and when f is 2 to 4, plural T$^1$'s may be the same or different and plural G$^1$'s may be the same or different.

[3] The polymerizable liquid-crystal composition of item [2], which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; and P is acryloyloxy, methacryloyloxy, CH$_2$=C(CF$_3$)—COO—, CH$_2$=CF—COO—, vinyloxy, maleimido or vinylcarbonyl.

[4] The polymerizable liquid-crystal composition of item [2], which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; P is acryloyloxy, methacryloyloxy, CH$_2$=C(CF$_3$)—COO—, CH$_2$=CF—COO—, vinyloxy, maleimido or vinylcarbonyl; G is a single bond, —O—, —CO—, —COO—, —OCO—, —CF$_2$O—, —OCF$_2$—, —CH=CH—COO—, —OCO—CH=CH—, —C≡C—COO—, —OCO—C≡C—, —CH=CH—CH$_2$O—, —OCH$_2$—CH=CH—, —(CH$_2$)$_2$—CF$_2$O— or —OCF$_2$—(CH$_2$)$_2$—; Sp is alkylene having 1 to 20 carbon atoms, and in the alkylene, optional —CH$_2$— may be replaced by —O—; and G$^1$ is a single bond, —O—, —CO—, —COO—, —OCO—, —(CH$_2$)$_2$—COO—, —OCO—(CH$_2$)$_2$—, —CH=CH—COO—, —OCO—CH=CH—, —CH$_2$CH$_2$—, —(CH$_2$)$_4$—, —(CH$_2$)$_3$O—, —O(CH$_2$)$_3$—, —OCH$_2$— or —CH$_2$O—.

[5] The polymerizable liquid-crystal composition of item [2], which contains an organosilicon compound having a primary amino group, and a polymerizable liquid-crystal compound in which W is alkyl having 1 to 10 carbon atoms, alkoxy having 1 to 10 carbon atoms, —$OCF_3$, —CN, fluorine, or -(G-Sp)$_r$-P; P is acryloyloxy, methacryloyloxy, $CH_2$=C($CF_3$)—COO—, or $CH_2$=CF—COO—; G is a single bond, or —O—; Sp is alkylene having 2 to 20 carbon atoms, and in the alkylene, optional —$CH_2$— may be replaced by —O—; and $G^1$ is a single bond, —O—, —CO—, —COO—, —OCO—, —($CH_2$)$_2$—COO—, —OCO—($CH_2$)$_2$—, —$CH_2CH_2$—, —($CH_2$)$_4$—, —($CH_2$)$_3$O—, —O($CH_2$)$_3$—, —$OCH_2$— or —$CH_2$O—.

[6] The polymerizable liquid-crystal composition of item [2], which contains an organosilicon compound having a primary amino group, and a polymerizable liquid-crystal compound in which W is alkyl having 1 to 10 carbon atoms, alkoxy having 1 to 10 carbon atoms, —$OCF_3$, —CN, fluorine, or -(G-Sp)$_r$-P; P is acryloyloxy, methacryloyloxy, $CH_2$=C($CF_3$)—COO—, or $CH_2$=CF—COO—; G is a single bond, or —O—; Sp is alkylene having 4 to 8 carbon atoms the alkylene; and $G^1$ is a single bond, —O—, —CO—, —COO—, —OCO—, —($CH_2$)$_2$—COO—, —OCO—($CH_2$)$_2$—, —$CH_2CH_2$—, —($CH_2$)$_4$—, —($CH_2$)$_3$O, —O($CH_2$)$_3$—, —$OCH_2$— or —$CH_2$O—; r is 1; and f is an integer of 0 to 2.

[7] The polymerizable liquid-crystal composition of any one of items [2] to [6], wherein the organosilicon compound having a primary amino group is a compound represented by Formula (3):

wherein $R^1$ is hydrogen, or a hydrocarbon group having 1 to 8 carbon atoms; $R^2$ is a hydrocarbon group having 1 to 8 carbon atoms; $R^3$ is alkylene having 1 to 20 carbon atoms, and in the alkylene, optional —$CH_2$— may be replaced by —O—, —NH—, —CH=CH—, —CONH—, cycloalkylene having 3 to 8 carbon atoms, or arylene having 6 to 10 carbon atoms, and in the arylene, optional hydrogen may be replaced by alkyl having 1 to 4 carbon atoms; and n is an integer of 0 to 2.

[8] The polymerizable liquid-crystal composition of item [7], wherein $R^1$ is hydrogen, or a hydrocarbon group having 1 to 3 carbon atoms; $R^2$ is a hydrocarbon group having 1 to 4 carbon atoms; and $R^3$ is alkylene having 1 to 12 carbon atoms, and in the alkylene, optional —$CH_2$— may be replaced by —O—, —NH—, —CONH—, or arylene having 6 to 10 carbon atoms, and in the arylene, optional hydrogen may be replaced by alkyl having 1 to 4 carbon atoms.

[9] The polymerizable liquid-crystal composition of item [7], wherein $R^1$ is hydrogen, or a hydrocarbon group having 1 to 3 carbon atoms; $R^2$ is a hydrocarbon group having 1 to 4 carbon atoms; and $R^3$ is alkylene having 3 to 12 carbon atoms, and in the alkylene, optional —$CH_2$— may be replaced by —O—, —NH— or phenylene.

[10] The polymerizable liquid-crystal composition of item [7], wherein $R^1$ is hydrogen, or a hydrocarbon group having 1 to 3 carbon atoms; $R^2$ is a hydrocarbon group having 1 to 4 carbon atoms; and $R^3$ is alkylene having 3 to 12 carbon atoms, and in the alkylene, optional —$CH_2$— may be replaced by —O— or —NH—.

[11] The polymerizable liquid-crystal composition of any one of items [2] to [6], wherein the organosilicon compound having a primary amino group is a compound represented by Formula (4):

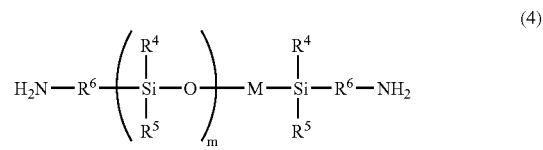

wherein $R^4$ and $R^5$ are independently alkyl having 1 to 4 carbon atoms, or phenyl; $R^6$ is alkylene having 1 to 10 carbon atoms, and in the alkylene, optional —$CH_2$— may be replaced by —O— or phenylene; in the phenylene, optional hydrogen may be replaced by alkyl having 1 to 4 carbon atoms; M is a single bond or phenylene; and m is an integer of 0 to 10.

[12] The polymerizable liquid-crystal composition of item (11), wherein $R^4$ and $R^5$ are independently alkyl having 1 to 4 carbon atoms, or phenyl; and $R^6$ is alkylene having 1 to 10 carbon atoms, and in the alkylene, optional —$CH_2$— may be replaced by —O—.

[13] The polymerizable liquid-crystal composition of item [11], wherein $R^4$ and $R^5$ are independently alkyl having 1 to 4 carbon atoms; $R^6$ is alkylene having 1 to 10 carbon atoms, and in the alkylene, optional —$CH_2$— may be replaced by —O—.

[14] The polymerizable liquid-crystal composition of item [11], wherein $R^4$ and $R^5$ are methyl or ethyl; and $R^6$ is alkylene having 1 to 10 carbon atoms, and in the alkylene, optional —$CH_2$— may be replaced by —O—.

[15] The polymerizable liquid-crystal composition of any one of items [2] to [6], wherein the organosilicon compound having a primary amino group is a silsesquioxane derivative having a constitutive unit represented by Formula (5):

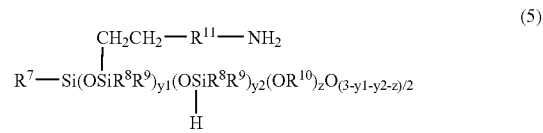

wherein $R^7$, $R^8$ and $R^9$ are independently alkyl having 1 to 18 carbon atoms, cycloalkyl having 3 to 8 carbon atoms, alkenyl having 2 to 6 carbon atoms, cycloalkenyl having 4 to 8 carbon atoms, aryl having 6 to 10 carbon atoms, or arylalkyl having 7 to 10 carbon atoms; $R^{10}$ is alkyl having 1 to 4 carbon atoms, $CH_3$CO—, $CH_2$=CHCO—, or $CH_2$=C($CH_3$)C—; z is 0, or 0.05 to 2.0; (y1+y2) is 0.1 to 2.0 when z=0, and is 0.05 to 2.0 when z≠0, and y2 is 0, or less than or equal to 3 times of y1; (y1+y2 +z) is 0.1 to 3.0; and $R^{11}$ is alkylene having 1 to 8 carbon atoms in which optional —$CH_2$— may be replaced by —O— or —NH—.

[16] The polymerizable liquid-crystal composition of item [15], wherein $R^8$ and $R^9$ are methyl, isopropyl, isobutyl, tert-butyl or phenyl; and $R^{10}$ is alkyl having 1 to 4 carbon atoms; and $R^{11}$ is —$CH_2$—.

[17] The polymerizable liquid-crystal composition of any one of items [2] to [16], wherein the amount of the organosilicon compound having a primary amino group is 0.0001 to 0.30 in term of the ratio by weight thereof to the polymerizable liquid-crystal compound.

[18] A polymerizable liquid-crystal layer obtained by directly applying the polymerizable liquid-crystal composition of any one of items [1] to [17] onto a substrate.

[19] The polymerizable liquid-crystal layer of item [18], wherein the substrate is a glass substrate.

[20] The polymerizable liquid-crystal layer of item [18], wherein the substrate is a plastic substrate.

[21] The polymerizable liquid-crystal layer of item [18], wherein the substrate is a plastic substrate obtained by using any one selected from polyimide, polyamidimide, polyamide, polyetherimide, polyether-ether-ketone, polyether-ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, partially-saponified triacetyl cellulose, epoxy resin, phenol resin and norbornene resin.

[22] The polymerizable liquid-crystal layer of any one of items [18] to [21], wherein the substrate is mechanically, physically or chemically surface-treated.

[23] The polymerizable liquid-crystal layer of item [22], wherein the surface treatment is rubbing treatment.

[24] The polymerizable liquid-crystal layer of item (22], wherein the surface treatment is corona treatment or plasma treatment.

[25] The polymerizable liquid-crystal layer of item [22], wherein the surface treatment is coating treatment with polymer.

[26] The polymerizable liquid-crystal layer of item [22], wherein the surface treatment is coating treatment with a polymer having at least one polar group selected from a carboxyl group, a hydroxyl group and an amino group in the molecular.

[27] The polymerizable liquid-crystal layer of item [22], wherein the surface treatment is coating treatment with a solution of a polyimide polymer.

[28] The polymerizable liquid-crystal layer of item [22], wherein the surface treatment is coating treatment with a solution of at least one selected from polyamic acid, polyamic acid amide, polyamic acid ester, soluble polyimide and polyamidimide.

[29] The polymerizable liquid-crystal layer of item [22], wherein the surface treatment is coating treatment with a solution of any one of polyamic acid and polyamic acid amide.

[30] The polymerizable liquid-crystal layer of item [22], wherein the surface treatment is coating treatment with a solution of at least two selected from polyamic acid, polyamic acid amide, polyamic acid ester, soluble polyimide and polyamidimide.

[31] The polymerizable liquid-crystal layer of item [22], wherein the surface treatment is coating treatment with a solution of one type of polyamic acid only, or with a solution of two types of polyamic acids.

[32] The polymerizable liquid-crystal layer of item [22], wherein the surface treatment is coating treatment with a solution of a hydrolyzed product of a trialkoxysilane having an amino group.

[33] The polymerizable liquid-crystal layer of item [22], wherein the surface treatment is coating treatment with polymer followed by rubbing treatment.

[34] The polymerizable liquid-crystal layer of any one of items [18] to [33], wherein the alignment state of the long molecular axis of the liquid crystal molecules in the polymerizable liquid-crystal layer is homeotropic alignment.

[35] The polymerizable liquid-crystal layer of any one of items [18] to [33], wherein the alignment state of the long molecular axis of the liquid crystal molecules in the polymerizable liquid-crystal layer is tilted alignment.

[36] The polymerizable liquid-crystal layer of any one of items [18] to [33], wherein the alignment state of the long molecular axis of the liquid crystal molecules in the polymerizable liquid-crystal layer is homogeneous alignment.

[37] The polymerizable liquid-crystal layer of any one of items [18] to [33], wherein the alignment state of the long molecular axis of the liquid crystal molecules in the polymerizable liquid-crystal layer is twisted alignment.

[38] A liquid-crystal film obtained through polymerization of the polymerizable liquid-crystal layer of any one of items [18] to [37].

[39] An optical compensation device having at least one liquid-crystal film of item [38].

[40] An optical device having at least one liquid-crystal film of item [38] and a polarizer.

[41] A liquid-crystal display device having the optical compensation device of item [39] on the inner face or the outer face of a liquid-crystal cell.

[42] A liquid-crystal display device having the optical device of item [40] on the inner face or the outer face of a liquid-crystal cell.

[43] A polymerizable liquid-crystal composition containing a compound represented by Formula (MA-116), a compound represented by any one of Formula (MA-163), Formula (MA-213), Formula (MA-217) and Formula (MA-228), and a compound represented by any one of Formula (3-1), Formula (4-1-3) and Formula (5-1):

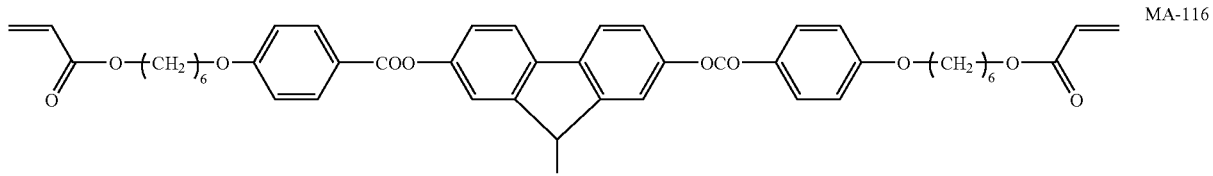

MA-116

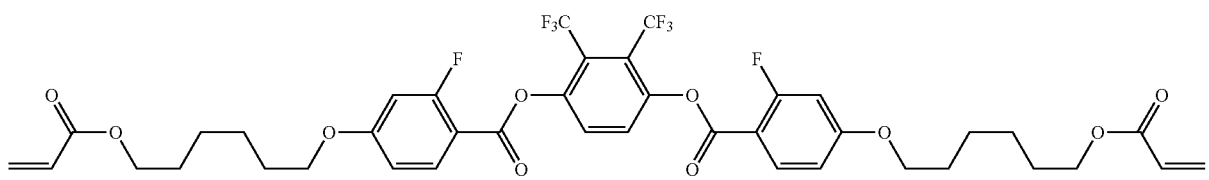

(MA-163)

-continued

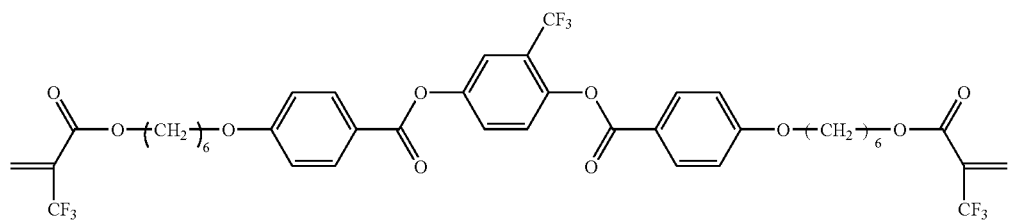
(MA-213)

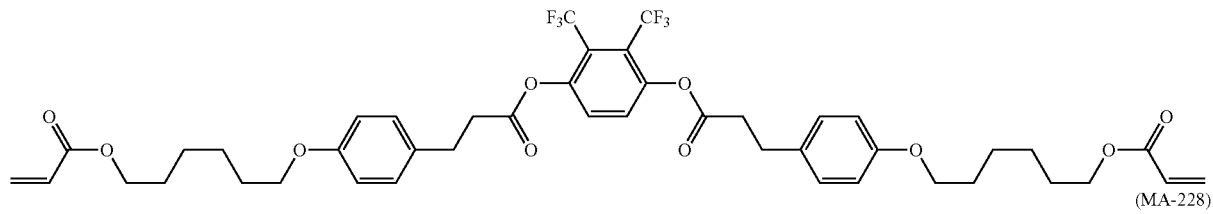
(MA-217)

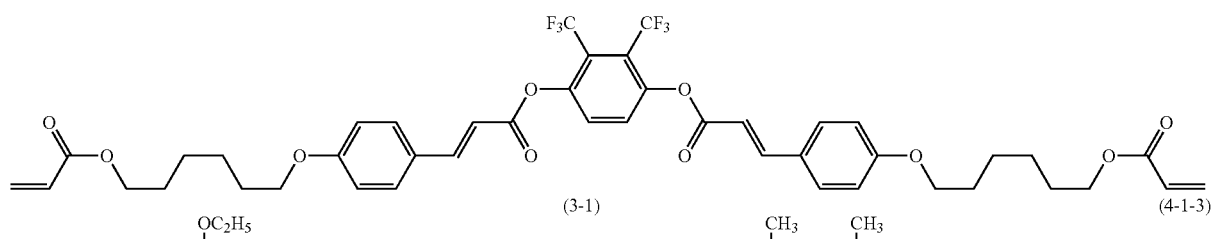
(MA-228)

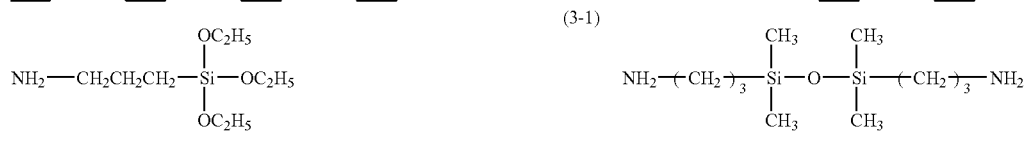
(3-1) (4-1-3)

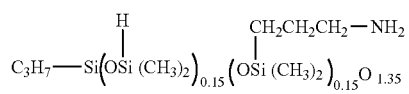
(5-1)

DETAILED DESCRIPTION OF THE INVENTION

The terms used in the invention are described. The "tilt angle" indicates the angle of the alignment state of long molecular axis of a liquid-crystal molecules to the plane of a supporting substrate. An alignment state in which the tilt angle is uniformly nearly zero from one interface to the other interface, and in particular, it is from 0° to 5°, is referred to as "homogeneous alignment". In this case, the interface is the interface of a supporting substrate having an alignment layer thereon, or a free interface. An alignment state in which the tilt angle is constant within a range of from 5° to 85° from one interface to the other interface, or continuously varies within a range of from 0° to 90° is referred to as "tilted alignment". An alignment state in which the tilt angle is uniformly from 85° to 90° from one interface to the other interface is referred to as "homeotropic alignment". An alignment state which has a twisted structure and in which the helical axis is nearly vertical to the interface is referred to as "twisted alignment". The "polymerizable liquid-crystal layer" is meant to indicate a layer that is obtained by applying a polymerizable liquid-crystal composition to a substrate, or is obtained by drying the coating layer of the composition.

The meaning of "liquid-crystalline" is not limited only to having a liquid-crystal phase. It is included in the meaning of the liquid crystalline that the compound itself does not have a liquid crystal phase but have such characteristics that it can be used as a component for a liquid crystal composition when it is mixed with the other liquid crystal compounds. The word "optional" is meant to indicate that not only position but also number may be optional, but does not include a number of 0. The expression saying that any A may be replaced by B or C is meant to include a case where any A is replaced by B and at the same time any other of the remaining A is replaced by C, in addition to a case where any A is replaced by B and a case where any A is replaced by C. For example, alkyl in which optional —CH$_2$— may be replaced by —O— or —CH=CH— includes alkyl, alkenyl, alkoxy, alkoxyalkyl, alkoxyalkenyl, alkenyloxyalkyl, etc. In the invention, it is undesirable that continuing two methylenes are replaced by —O— or —S— to give —O—O—, —O—S— or —S—S—. "(Meth)acrylate" may be used as a generic term of acrylate and methacrylate. Unless otherwise noted, the term "alkyl" includes both of a straight alkyl and a branched alkyl. The same shall apply to alkenyl, alkylene and alkenylene. For example, butyl may be any of n-butyl, 2-methylpropyl and 1,1-dimethylethyl. Halogen means fluorine, chlorine or bromine. Cycloalkyl and cycloalkenyl include not only ordinary cyclic groups but also crosslinked cyclic groups. In the following description, polymerizable liquid-crystal compound(s) represented by Formula (1) may be referred to as compound (1). The same simplified expression shall apply to the other compounds of other formulae.

The polymerizable liquid-crystal composition of the invention contains a polymerizable liquid-crystal compound as the essential ingredient thereof. Examples of the polymerizable liquid-crystal compound are compounds represented by Formula (1).

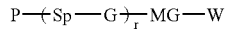  (1)

In Formula (1), W is hydrogen, alkyl having 1 to 25 carbon atoms, alkenyl having 2 to 6 carbon atoms, halogen, —CN, or -(G-Sp)$_r$-P. In these alkyl and alkenyl, optional —CH$_2$— may be replaced by —O—, —S—, —NH—, —N(CH$_3$)—, —CO—, —COO—, —OCO—, —OCO—O—, —S—CO—, —CO—S— or —C≡C—, and optional hydrogen may be replaced by halogen. Preferred examples of W are alkyl having 1 to 10 carbon atoms, alkoxy having 1 to 10 carbon atoms, —OCF$_3$, —CN, fluorine, and -(G-Sp)$_r$-P.

P is a polymerizable group. Preferred examples of P are acryloyloxy, methacryloyloxy, CH$_2$=C(CF$_3$)—COO—, CH$_2$=CF—COO—, vinyloxy, maleimido and vinylcarbonyl. More preferred examples of P are acryloyloxy, methacryloyloxy, CH$_2$=C(CF$_3$)—COO— and CH$_2$=CF—COO—.

Sp is alkylene having 1 to 20 carbon atoms. When the alkylene has 2 or more carbon atoms, optional —CH$_2$— may be replaced by —O—, —CH=CH— or —C≡C—. More preferably, Sp is alkylene having 1 to 20 carbon atoms in which, when it has 2 or more carbon atoms, optional —CH$_2$— may be replaced by —O—. Further more preferable example of Sp is alkylene having 2 to 10 carbon atoms in which optional —CH$_2$— may be replaced by —O—. And, particularly preferable example of Sp is alkylene having 4 to 8 carbon atoms.

G is a single bond, —O—, —S—, —CO—, —COO—, —OCO—, —O—COO—, —SO$_2$—O—, —O—SO$_2$—, —CH$_2$O—, —OCH$_2$—, —CF$_2$O—, —OCF$_2$—, —CH=CH—COO—, —OCO—CH=CH—, —C≡C—COO—, —OCO—C≡C—, —O(CH$_2$)$_3$—, —CH=CH—CH$_2$O—, —OCH$_2$—CH=CH— or —OCF$_2$—(CH$_2$)$_2$—. These groups bond to Sp via the left-side free radical thereof. Preferred examples of G are a single bond, —O—, —CO—, —COO—, —OCO—, —CF$_2$O—, —OCF$_2$—, —CH=CH—COO—, —OCO—CH=CH—, —C≡C—COO—, —OCO—C≡C—, —CH=CH—CH$_2$O—, —OCH$_2$—CH=CH—, —(CH$_2$)$_2$—CF$_2$O— and —OCF$_2$—(CH$_2$)$_2$—. More preferred examples of G are a single bond and —O—. r is 0 or 1, and is preferably 1.

In Formula (1), MG is a mesogenic group represented by Formula (2):

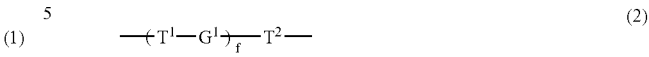  (2)

In Formula (2), T$^1$ and T$^2$ are cyclic groups. These are independently 1,4-phenylene in which optional —CH= may be replaced by —N=, 1,4-cyclohexylene in which optional —CH$_2$— may be replaced by —O— or/and —S— and two carbon atoms not adjacent to each other may be crosslinked, or 1,4-cyclohexenylene, naphthalene-2,6-diyl or fluorene-2,7-diyl. Optional hydrogen in these rings may be replaced by halogen, —CN, —CF$_3$, —CF$_2$H, —NO$_2$, or alkyl having 1 to 7 carbon atoms. In the alkyl having 1 to 7 carbon atoms, optional —CH$_2$— may be replaced by —O—, —CH=CH— or —C≡C—, and optional hydrogen may be replaced by halogen.

G$^1$ in Formula (2) is a bonding group. G$^1$ is a single bond, —O—, —CO—, —COO—, —OCO—, —SO$_2$—O—, —O—SO$_2$—, —CH$_2$CH$_2$—, —(CH$_2$)$_4$—, —(CH$_2$)$_3$O—, —O(CH$_2$)$_3$—, —OCH$_2$—, —CH$_2$O—, —OCF$_2$—, —CF$_2$O—, —CF=CF—, —CF$_2$CF$_2$—, —CH=CH—, —C—C—, —CH=CH—COO—, —OCO—CH=CH—, —CH=CH—CH$_2$O—, —OCH$_2$—CH=CH—, —CONH—, —NHCO—, —(CH$_2$)$_2$—COO—, —OCO—(CH$_2$)$_2$—, —(CH$_2$)$_b$—, —O(CH$_2$)$_b$—, —(CH$_2$)$_b$O—, or —O(CH$_2$)$_b$O—; and b is an integer of 1 to 20. Preferred examples of G$^1$ are a single bond, —O—, —CO—, —COO—, —OCO—, —(CH$_2$)$_2$—COO—, —OCO—(CH$_2$)$_2$—, —CH=CH—COO—, —OCO—CH=CH—, —CH$_2$CH$_2$—, —(CH$_2$)$_4$—, —(CH$_2$)$_3$O—, —O(CH$_2$)$_3$—, —OCH$_2$— and —CH$_2$O—. More preferred examples of G$^1$ are a single bond, —O—, —CO—, —COO—, —OCO—, —(CH$_2$)$_2$—COO—, —OCO—(CH$_2$)$_2$—, —CH$_2$CH$_2$—, —(CH$_2$)$_4$—, —(CH$_2$)$_3$O—, —O(CH$_2$)$_3$—, —OCH$_2$— and —CH$_2$O—.

In Formula (2), f is an integer of 0 to 4. When f is 2 to 4, plural T$^1$'s may be the same or different rings, and plural G$^1$'s may be the same or different bonding groups. Preferably, f is 0 to 3.

Specific examples of the polymerizable liquid-crystal compounds are listed below.

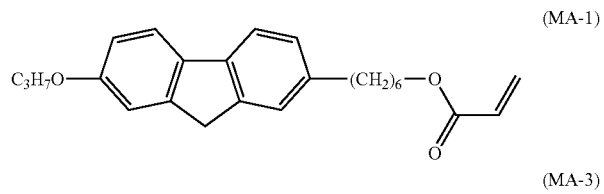

(MA-1)

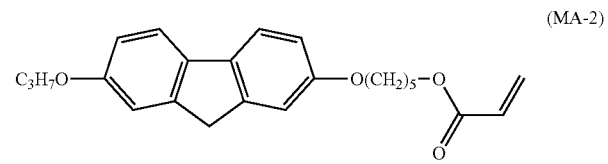

(MA-2)

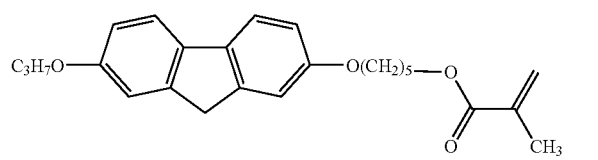

(MA-3)

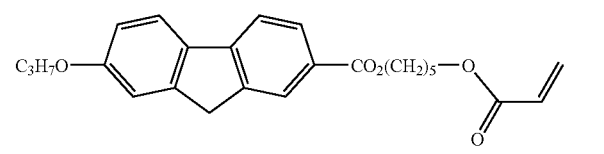

(MA-4)

-continued
(MA-5) 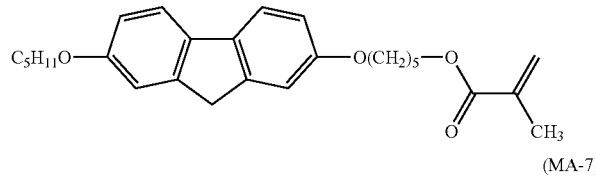
(MA-6) 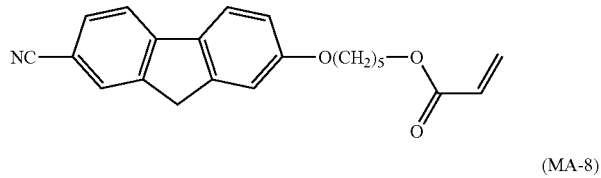
(MA-7) 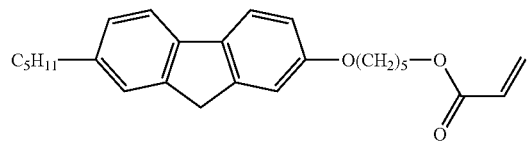
(MA-8) 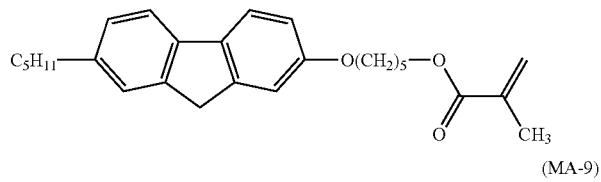
(MA-9) 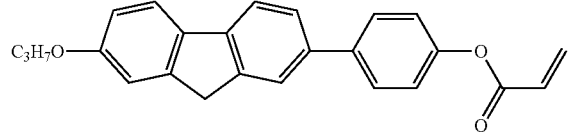
(MA-10) 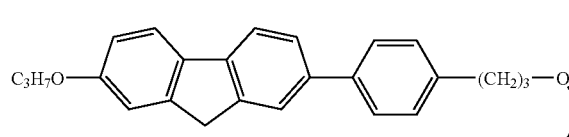
(MA-11) 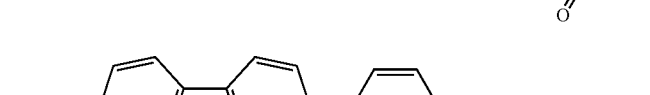
(MA-12) 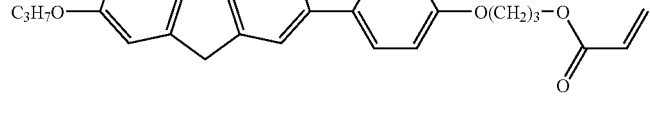
(MA-13) 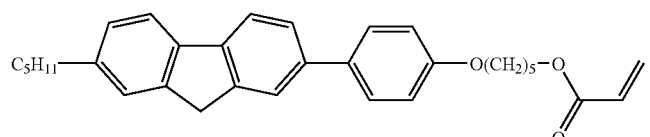
(MA-14) 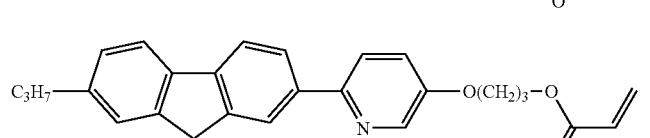
(MA-15) 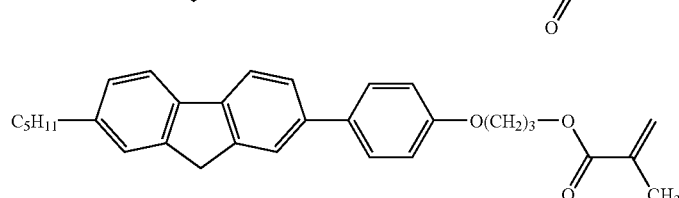
(MA-16) 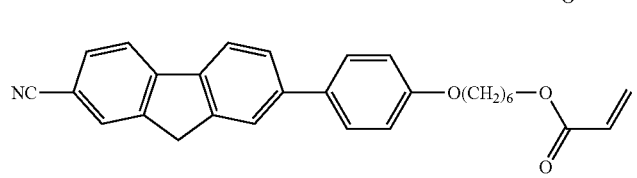

-continued
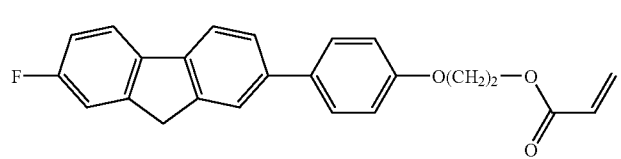
(MA-17)
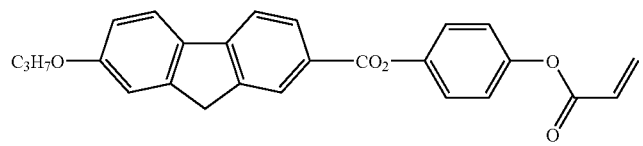
(MA-18)
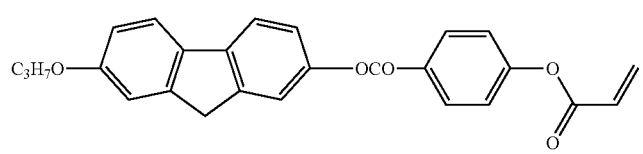
(MA-19)
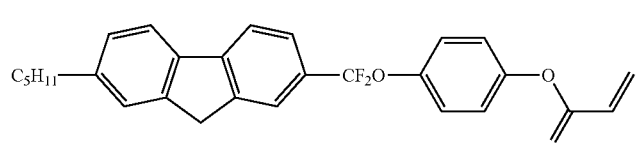
(MA-20)
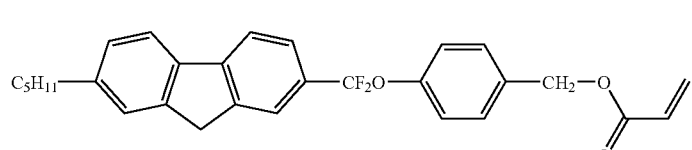
(MA-21)
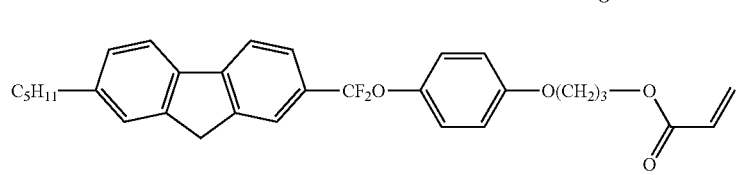
(MA-22)
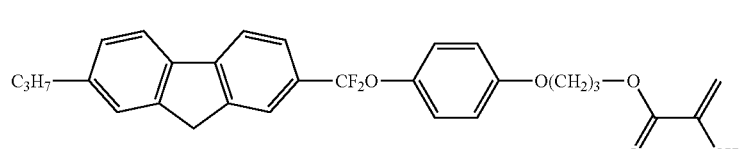
(MA-23)
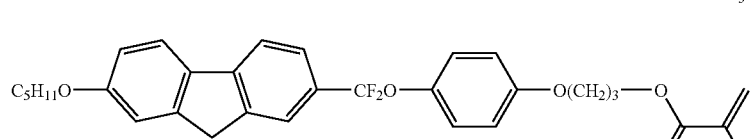
(MA-24)
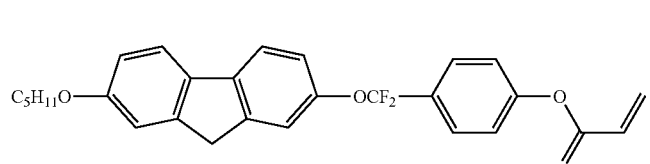
(MA-25)
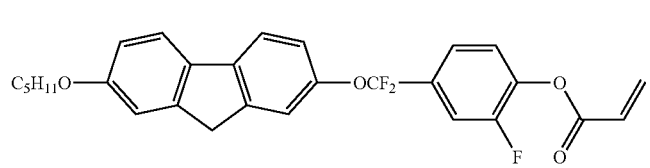
(MA-26)

-continued
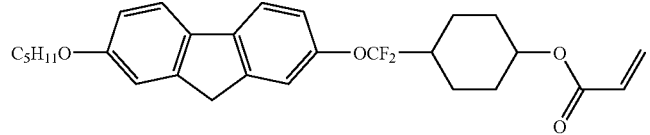
(MA-27)
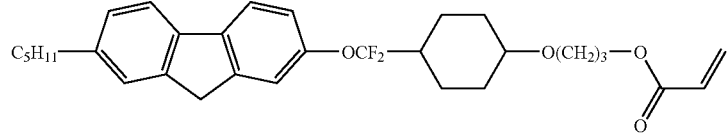
(MA-28)
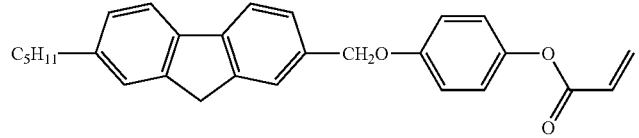
(MA-29)
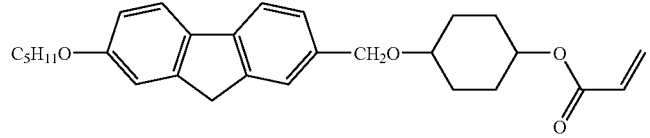
(MA-30)
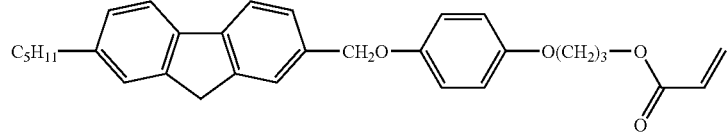
(MA-31)
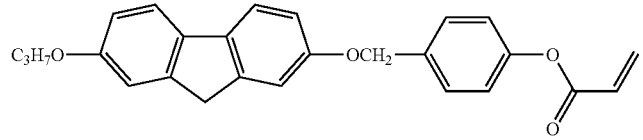
(MA-32)
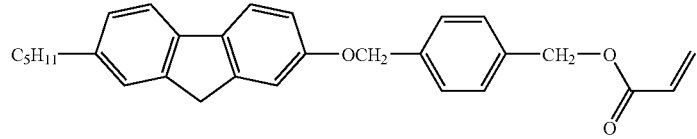
(MA-33)
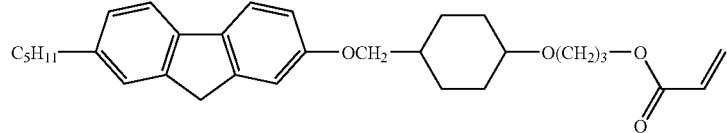
(MA-34)
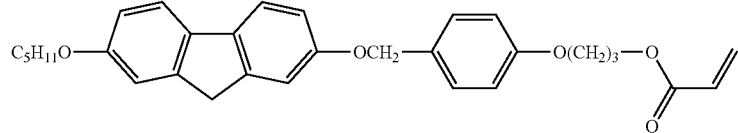
(MA-35)
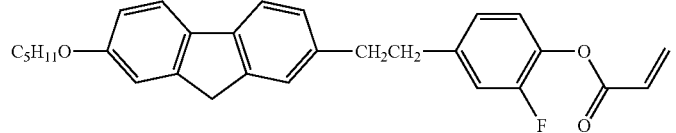
(MA-36)

-continued
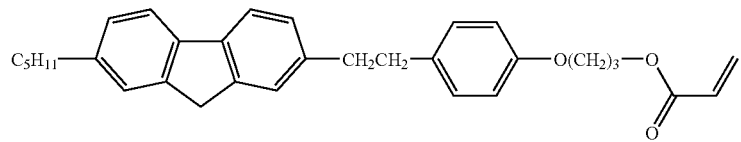
(MA-37)
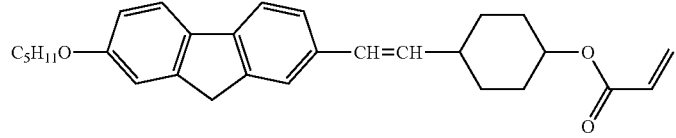
(MA-38)
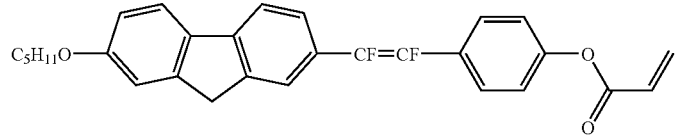
(MA-39)
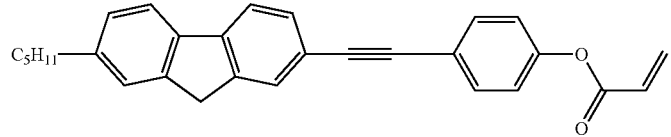
(MA-40)
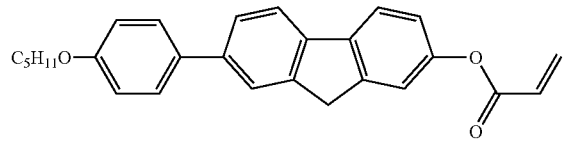
(MA-41)
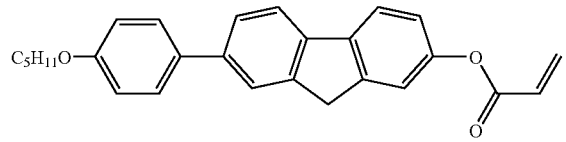
(MA-42)
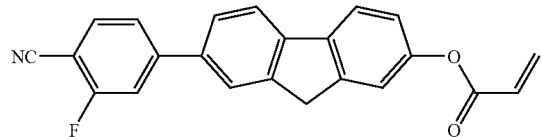
(MA-43)
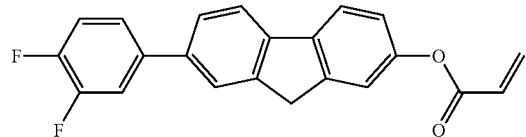
(MA-44)
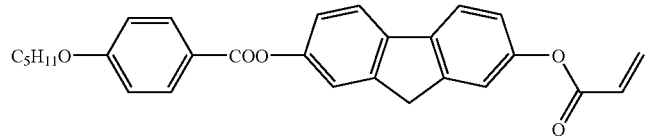
(MA-45)
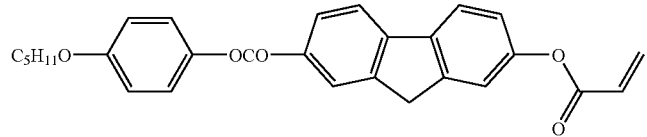
(MA-46)

-continued
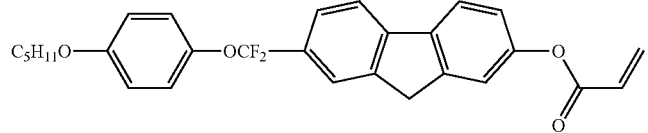
(MA-47)
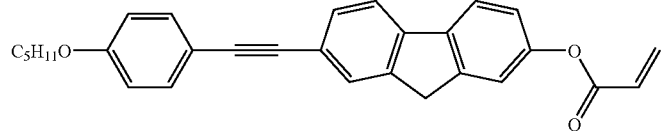
(MA-48)
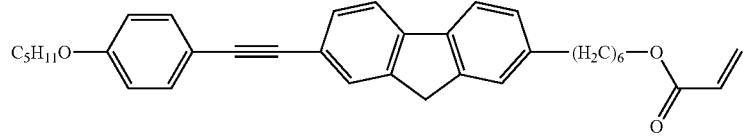
(MA-49)
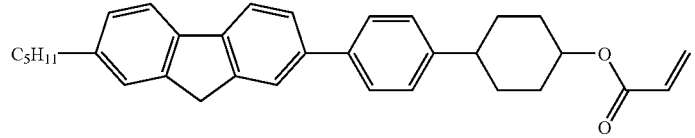
(MA-50)
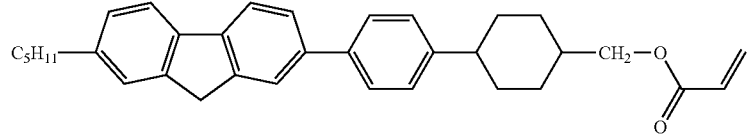
(MA-51)
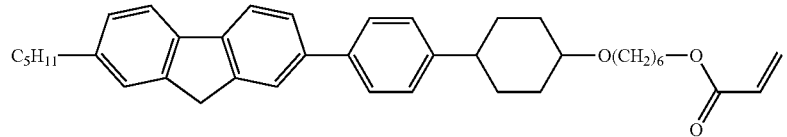
(MA-52)
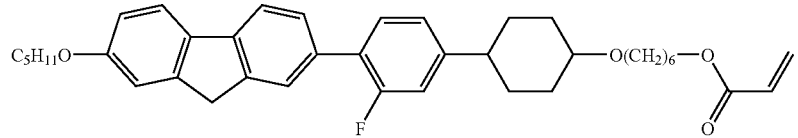
(MA-53)
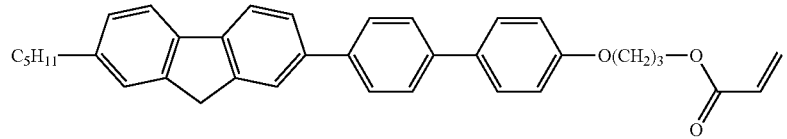
(MA-54)
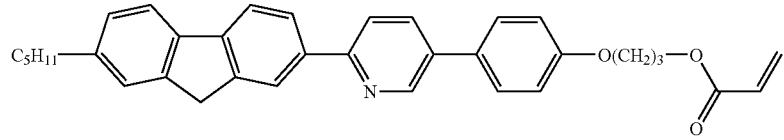
(MA-55)
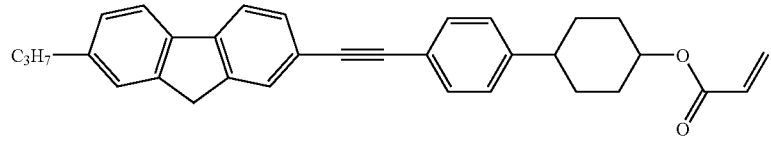
(MA-56)

-continued
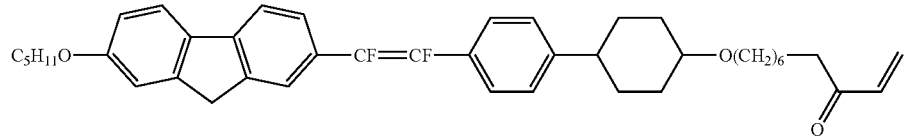
(MA-57)
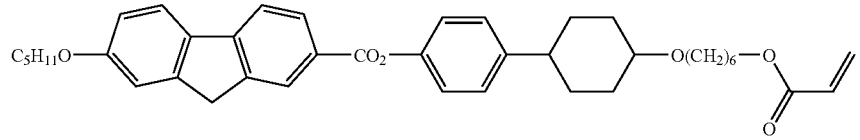
(MA-58)
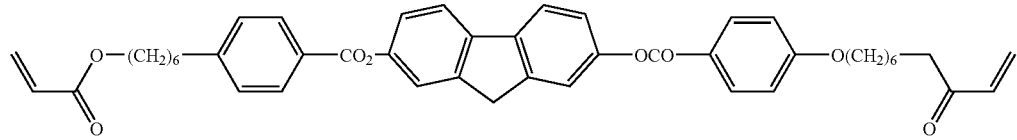
(MA-59)
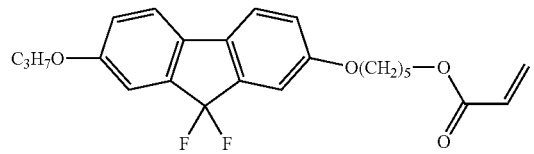
(MA-60)
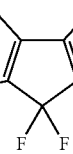
(MA-61)
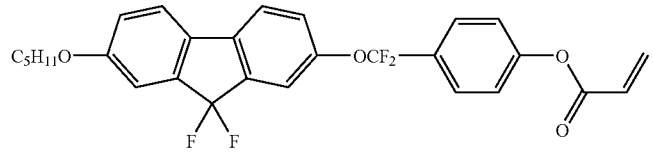
(MA-62)
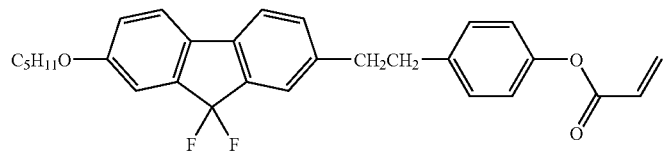
(MA-63)
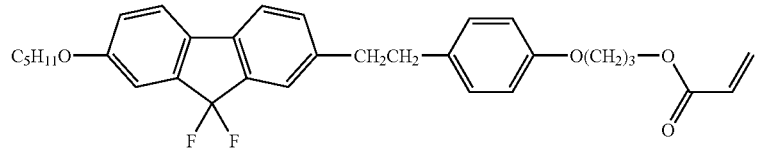
(MA-64)
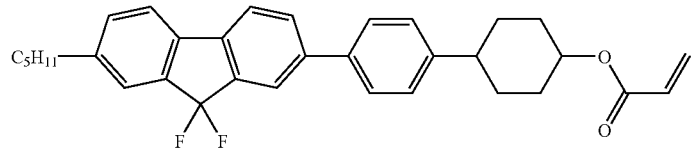
(MA-65)
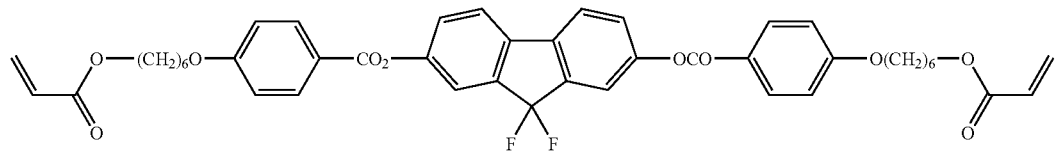
(MA-66)
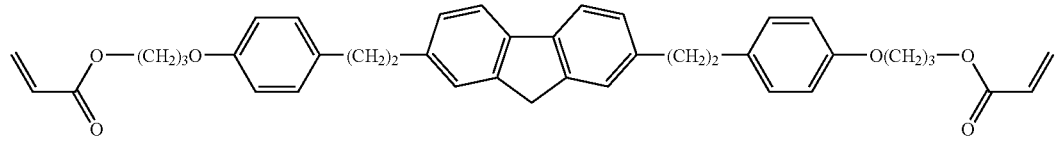
(MA-67)

-continued
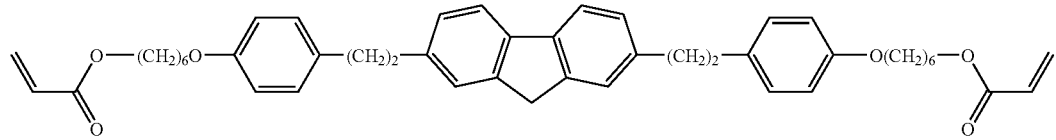 (MA-68)
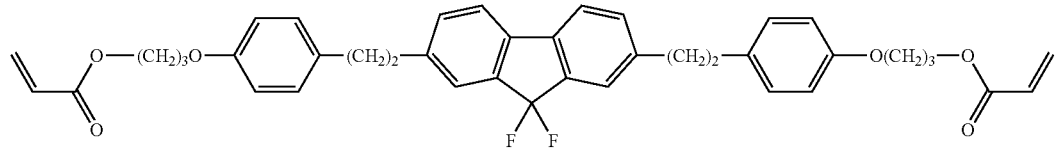 (MA-69)
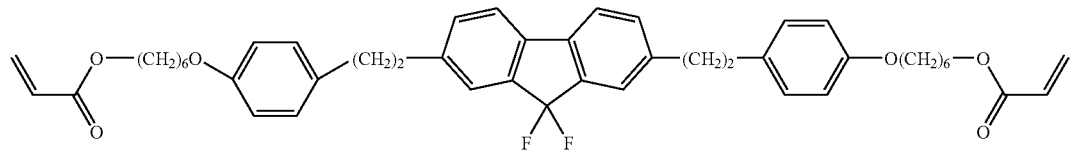 (MA-70)
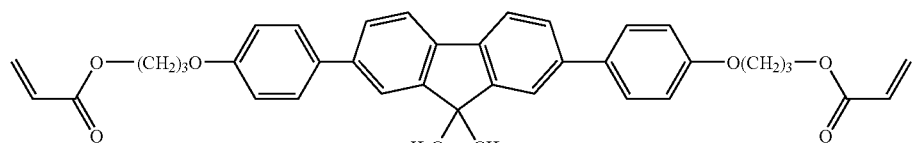 (MA-71)
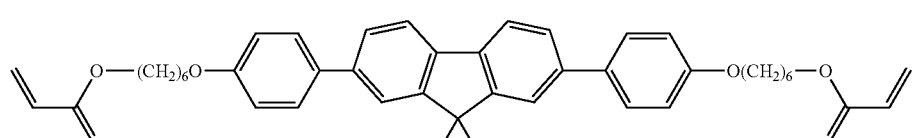 (MA-72)
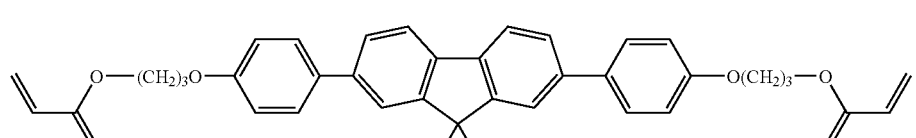 (MA-73)
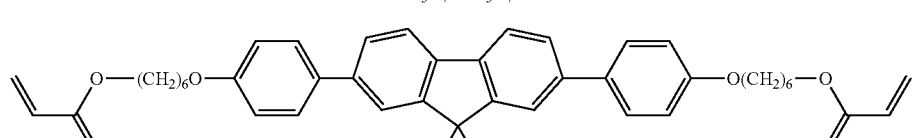 (MA-74)
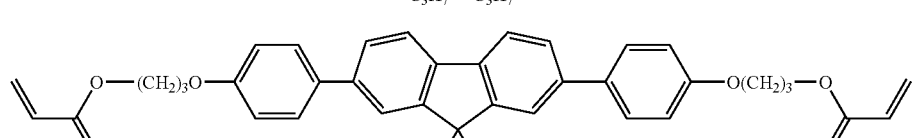 (MA-75)
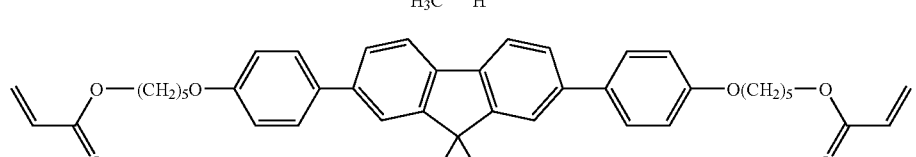 (MA-76)
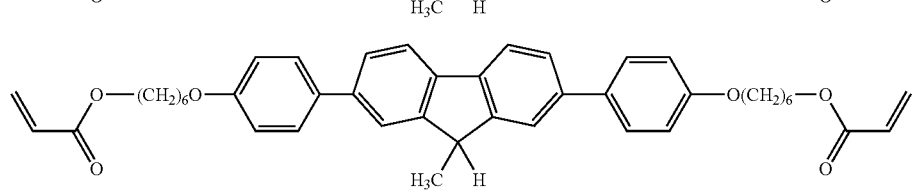 (MA-77)

-continued
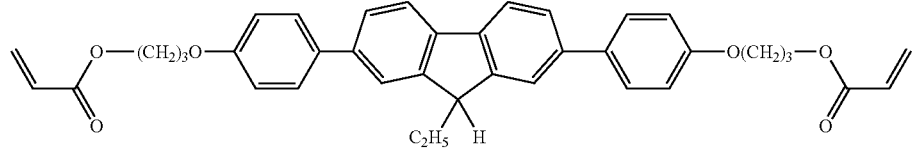
(MA-78)
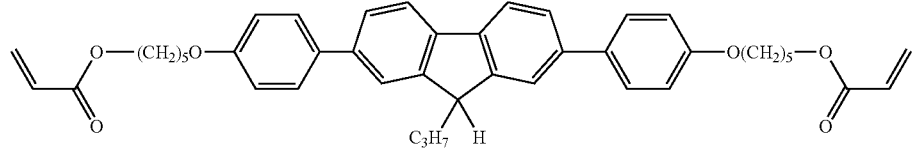
(MA-79)
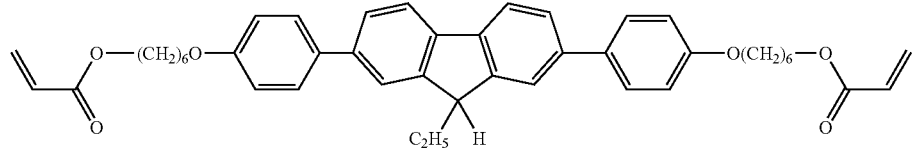
(MA-80)
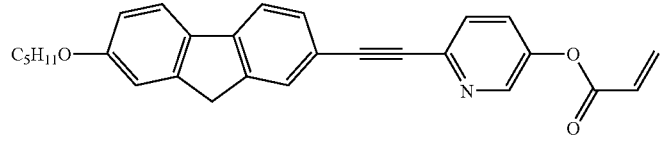
(MA-81)
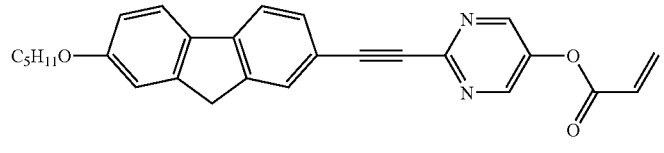
(MA-82)
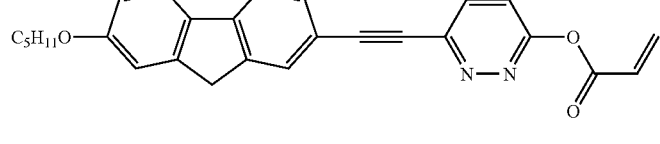
(MA-83)
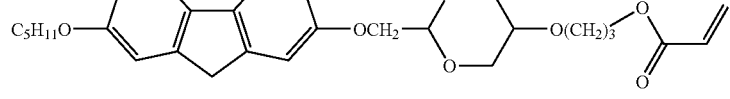
(MA-84)
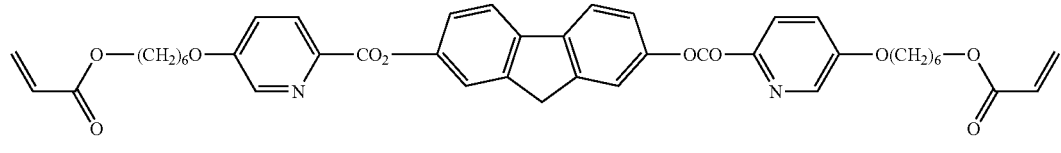
(MA-85)
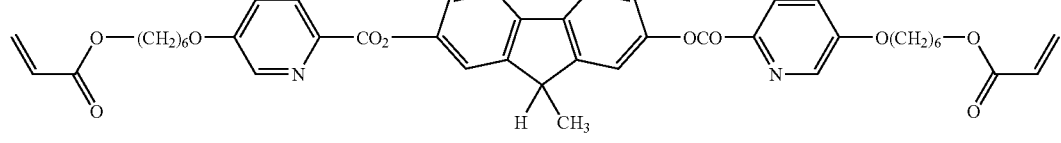
(MA-86)
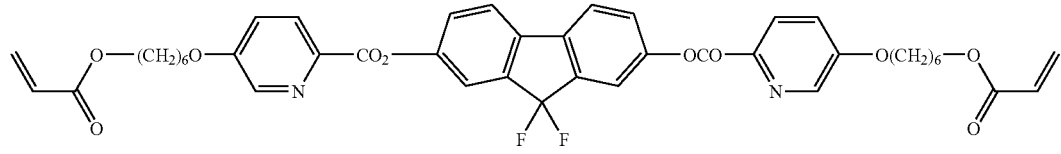
(MA-87)

-continued
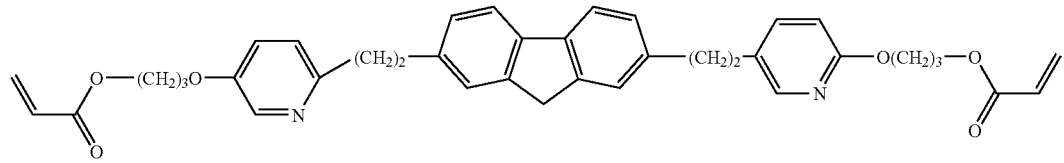 (MA-88)
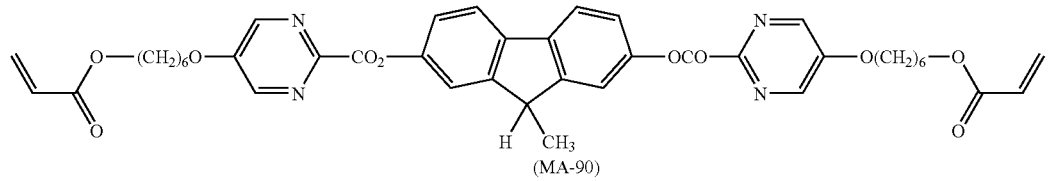 (MA-89)
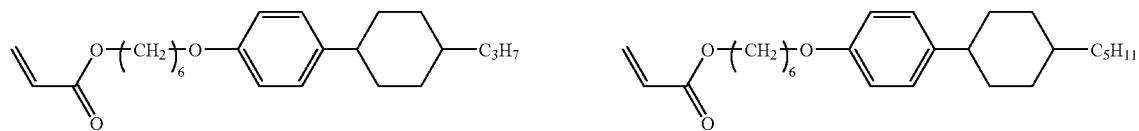
(MA-90)
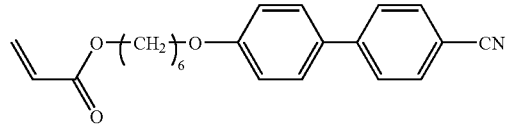 (MA-91)
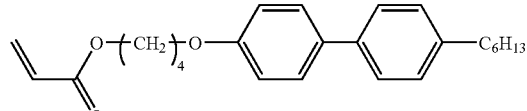 (MA-92)
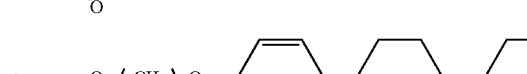 (MA-93)
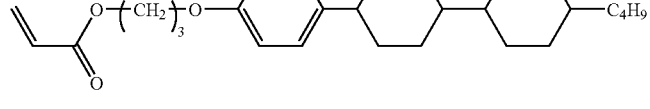 (MA-94)
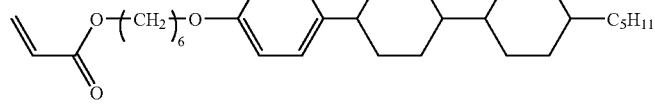 (MA-95)
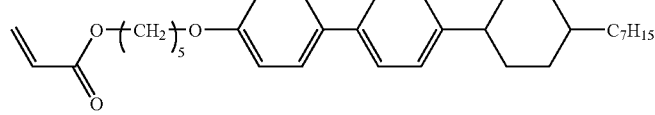 (MA-96)
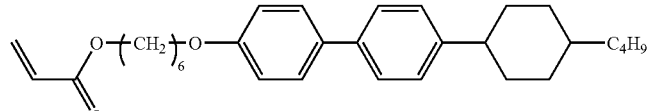 (MA-97)
(MA-98)  (MA-99)
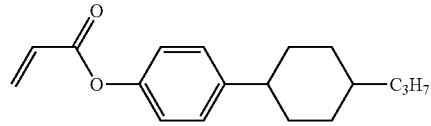 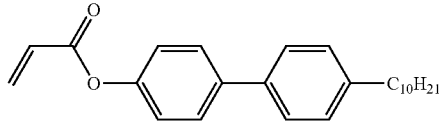
(MA-100)  (MA-101)
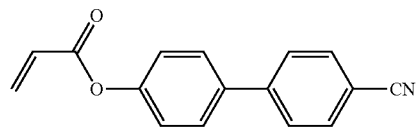 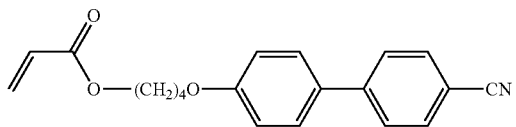

-continued
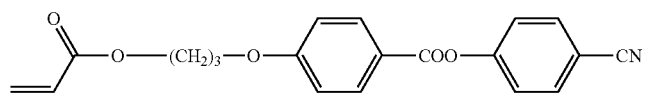
(MA-102)
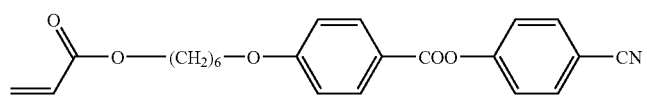
(MA-103)
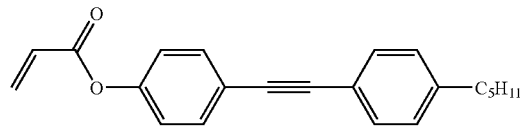
(MA-104)
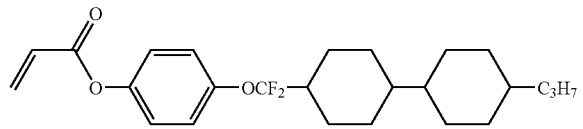
(MA-105)
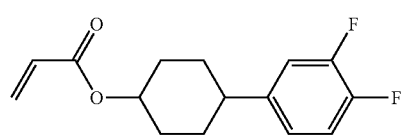
(MA-106)
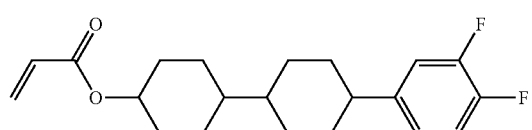
(MA-107)
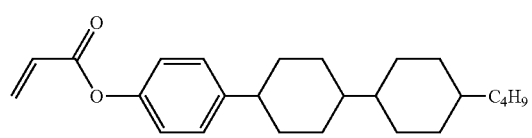
(MA-108)
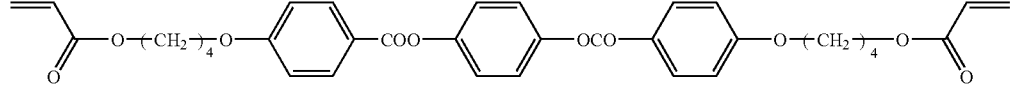
(MA-109)
(MA-110)
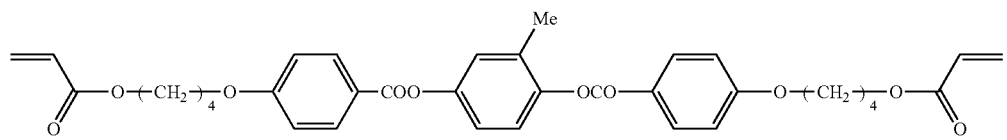
(MA-111)
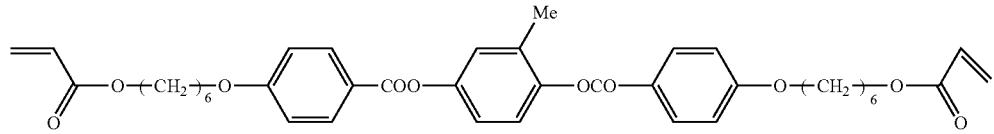
(MA-112)
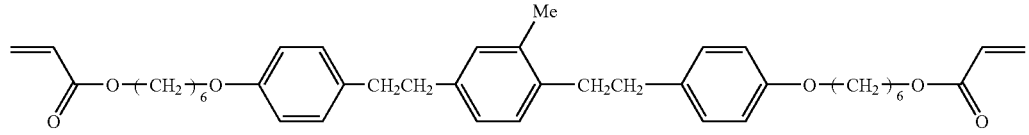
(MA-113)
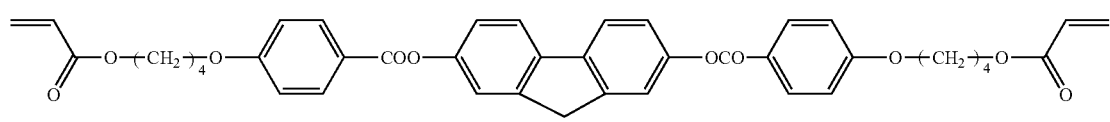
(MA-114)

-continued
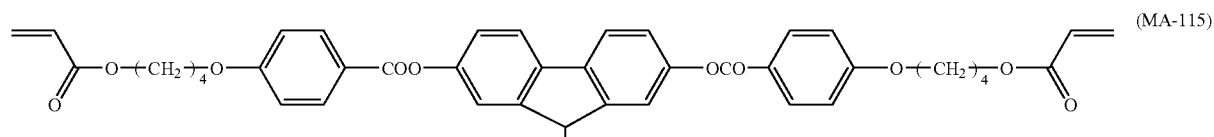
(MA-115)
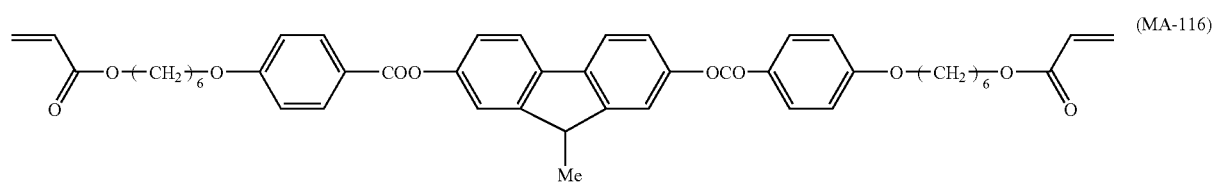
(MA-116)
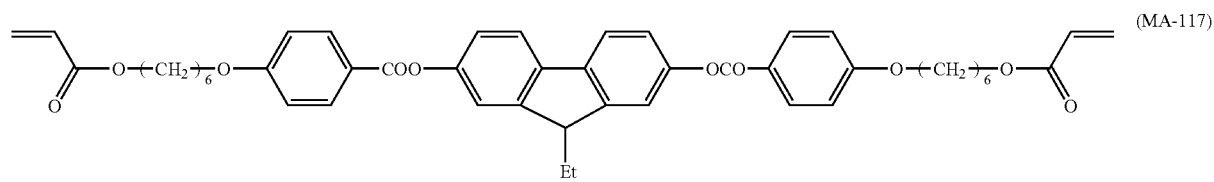
(MA-117)
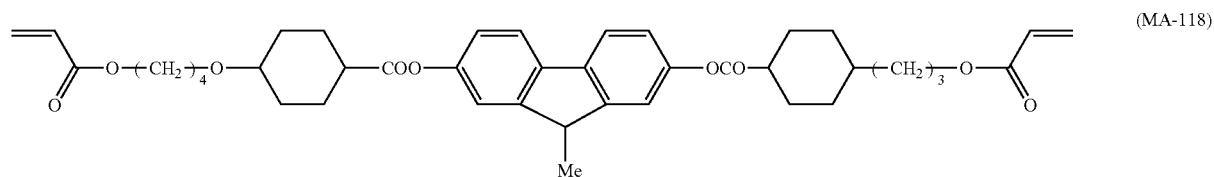
(MA-118)
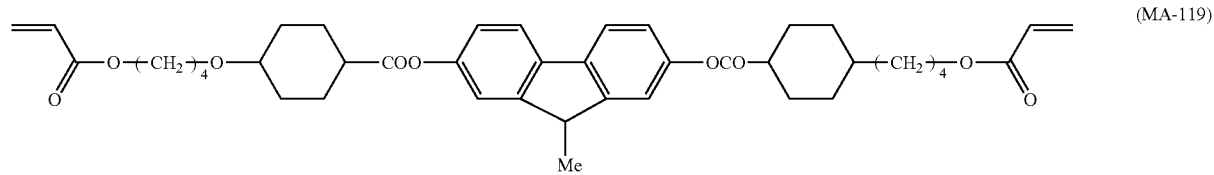
(MA-119)
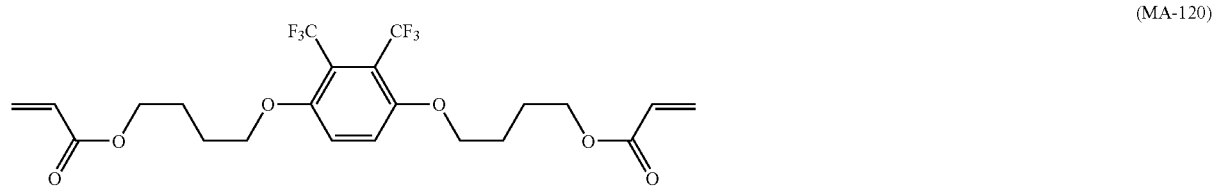
(MA-120)
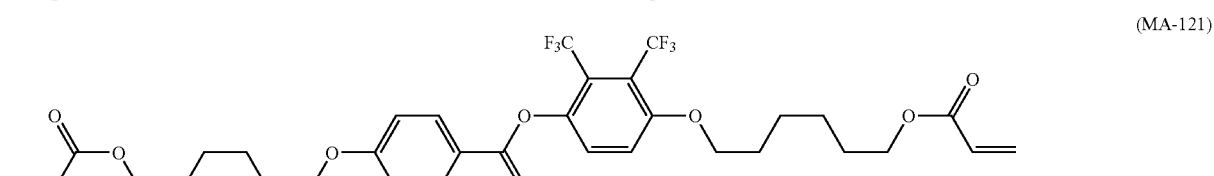
(MA-121)
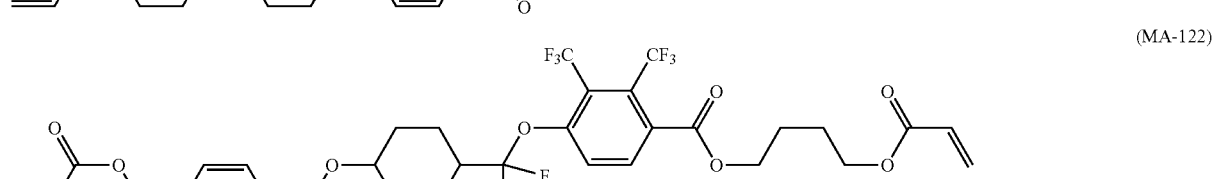
(MA-122)
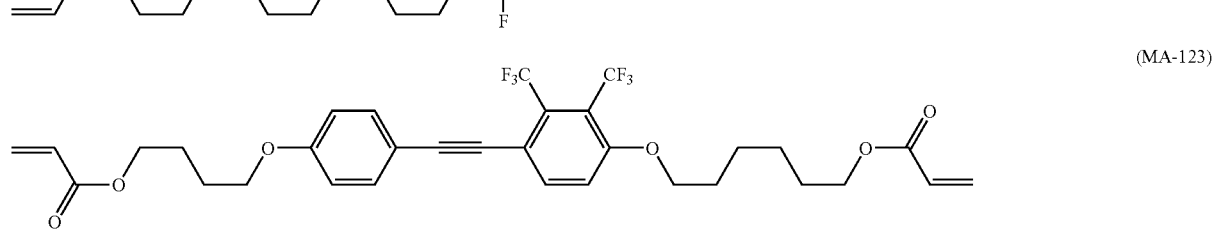
(MA-123)

-continued
(MA-124)
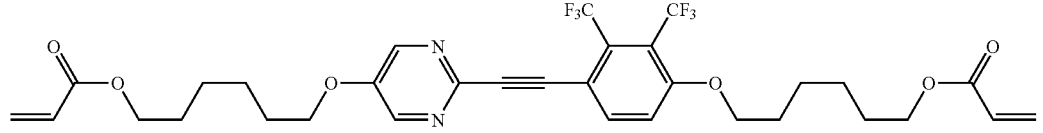
(MA-125)
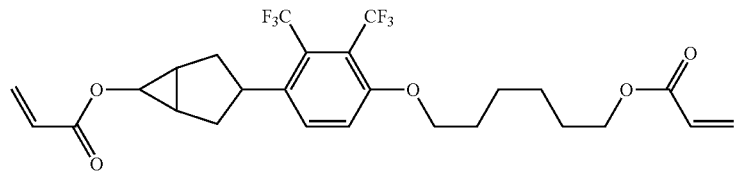
(MA-126)
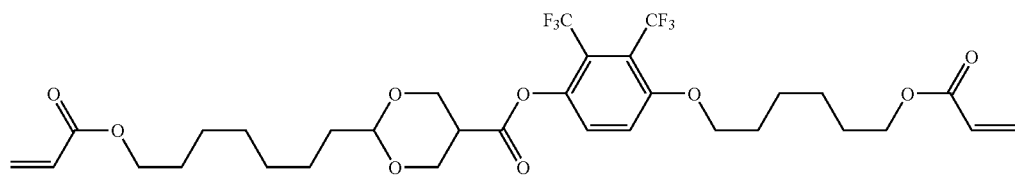
(MA-127)
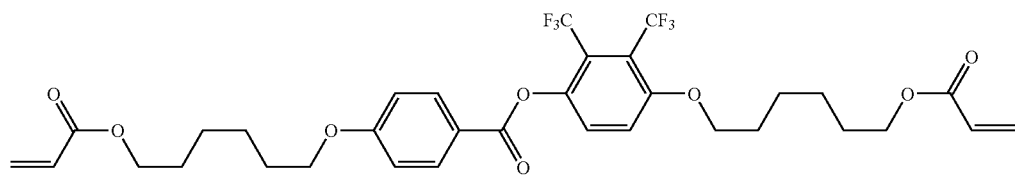
(MA-128)
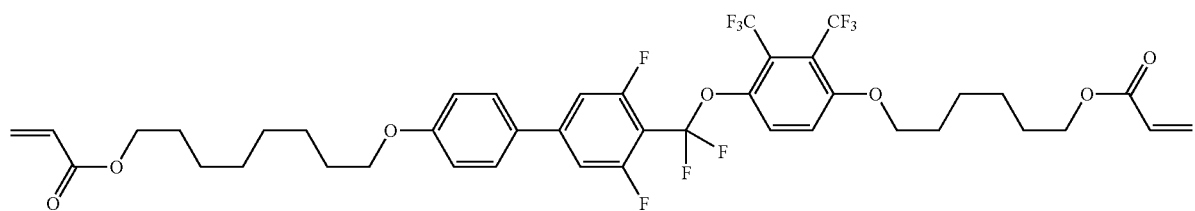
(MA-129)
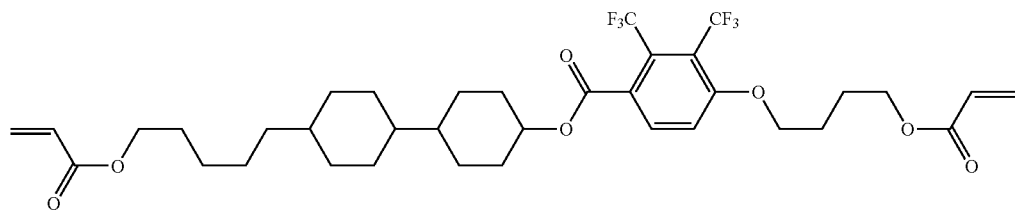
(MA-130)
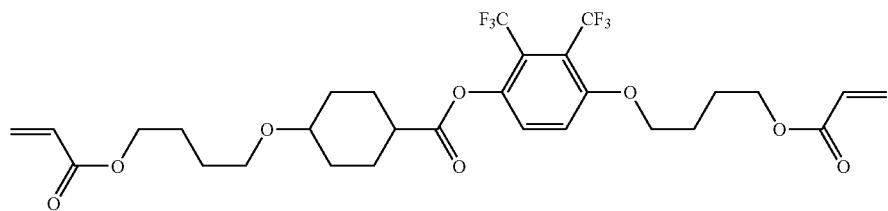
(MA-131)
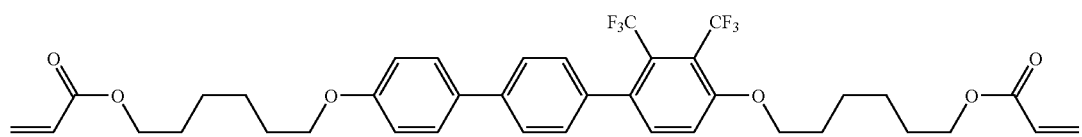

-continued
(MA-132)
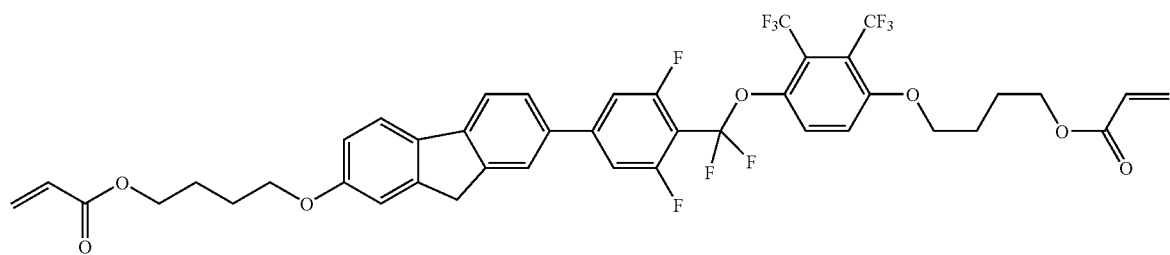
(MA-133)
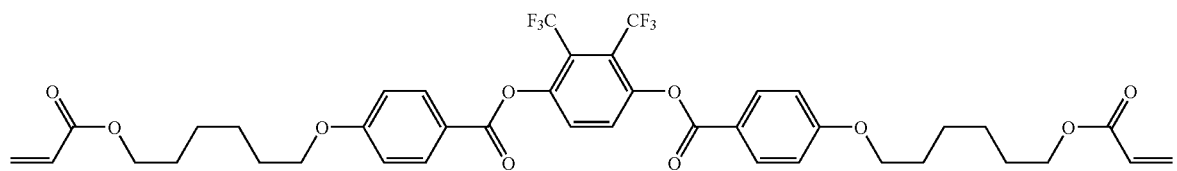
(MA-134)
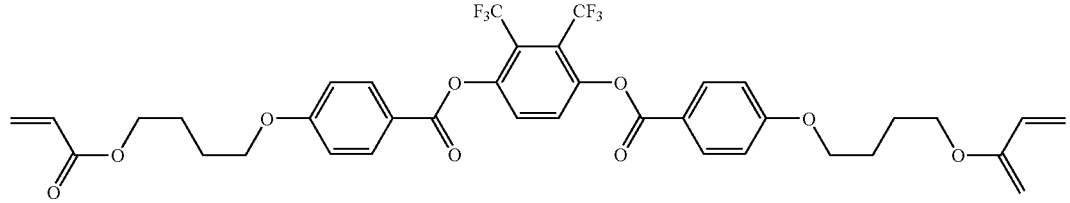
(MA-135)
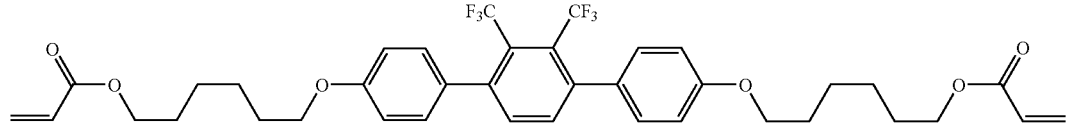
(MA-136)
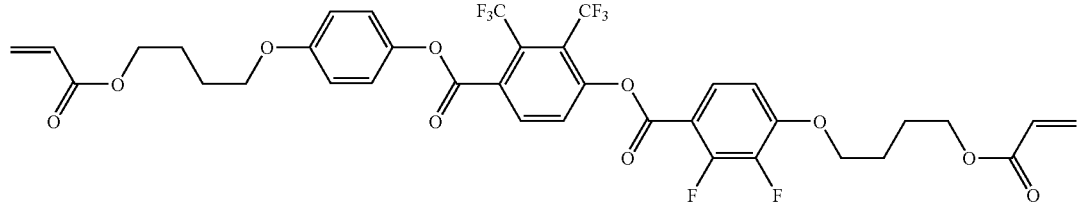
(MA-137)
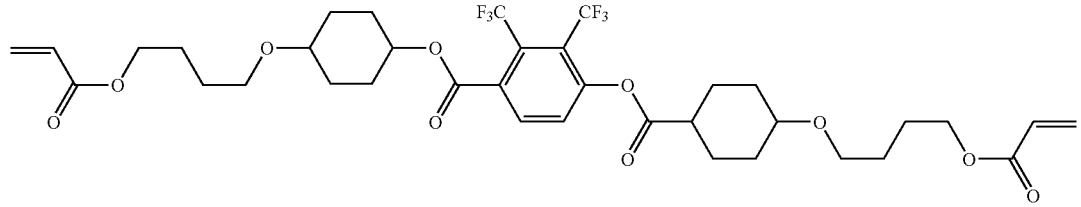
(MA-138)
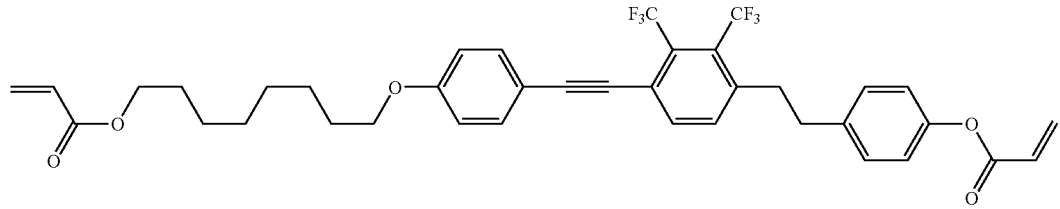

-continued
(MA-139)
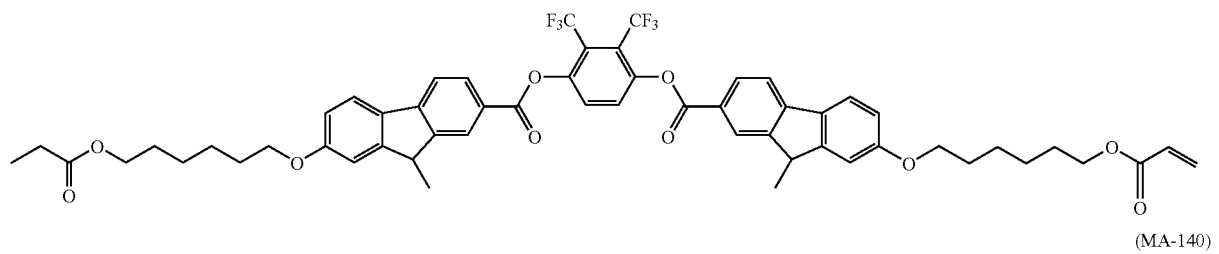
(MA-140)
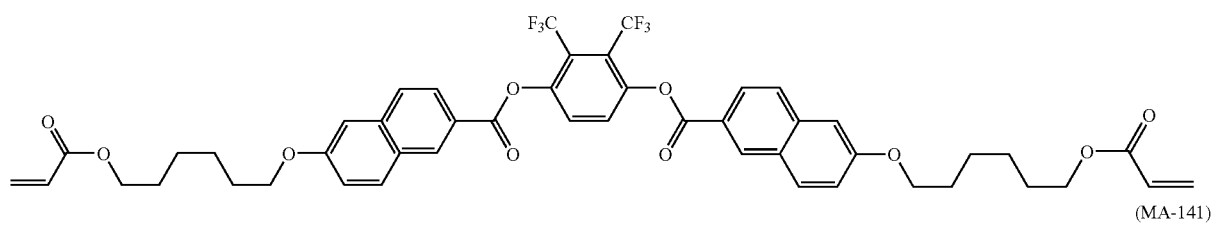
(MA-141)
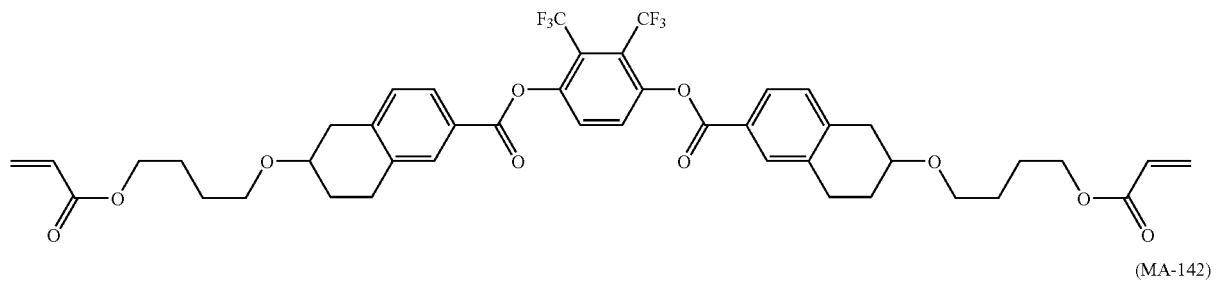
(MA-142)
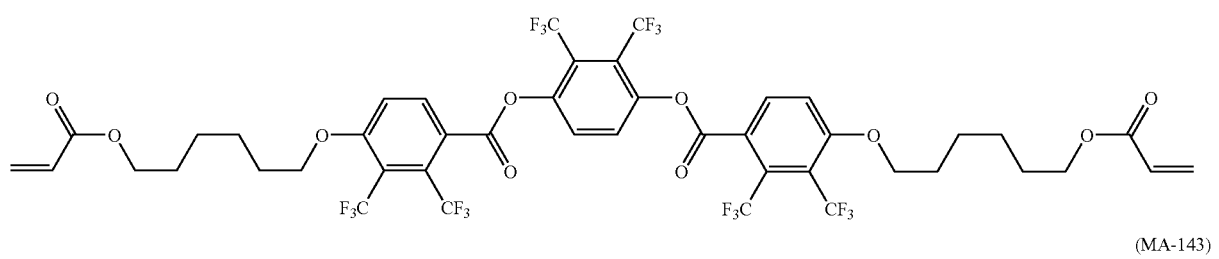
(MA-143)
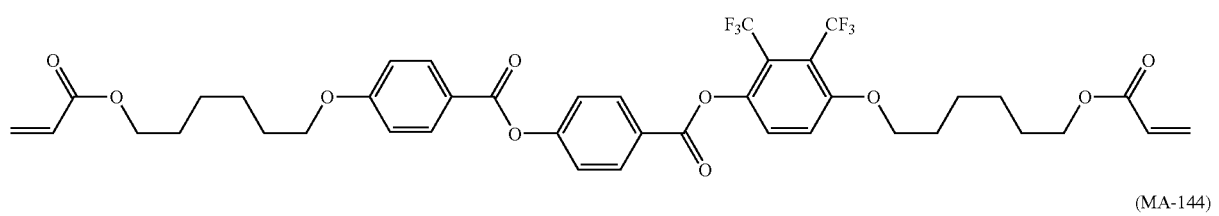
(MA-144)
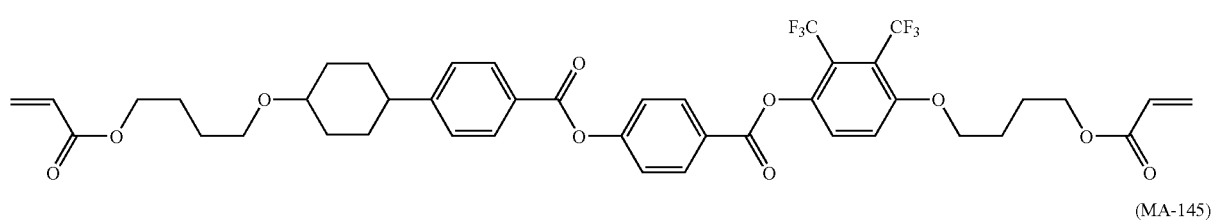
(MA-145)
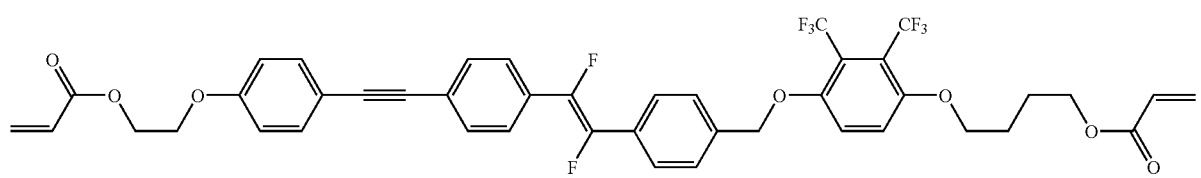

-continued
(MA-146)
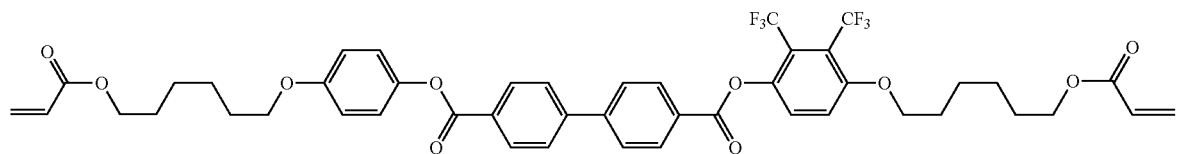
(MA-147)
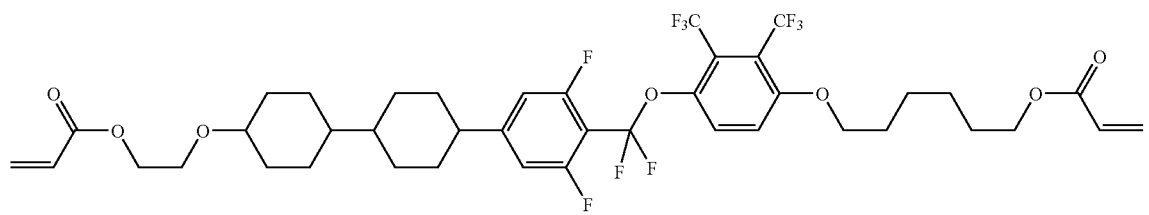
(MA-148)
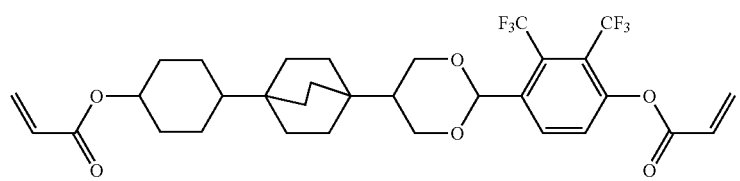
(MA-149)
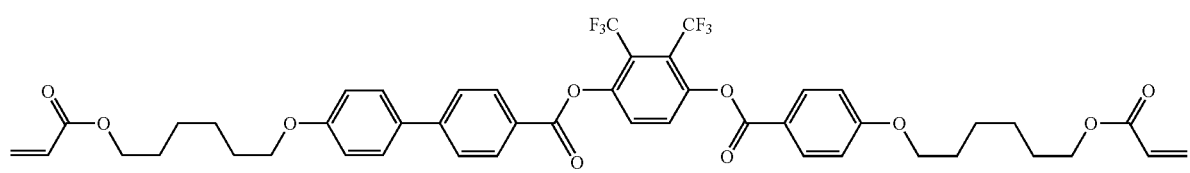
(MA-150)
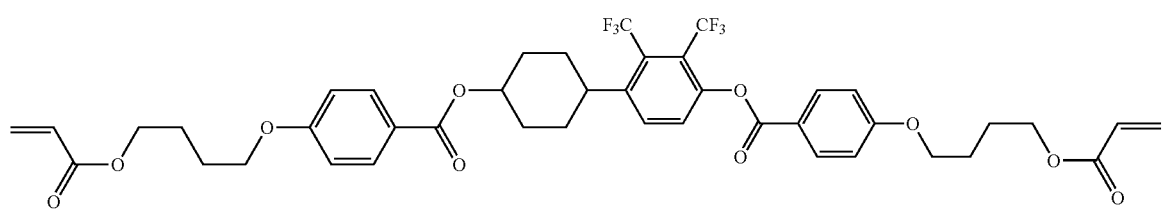
(MA-151)
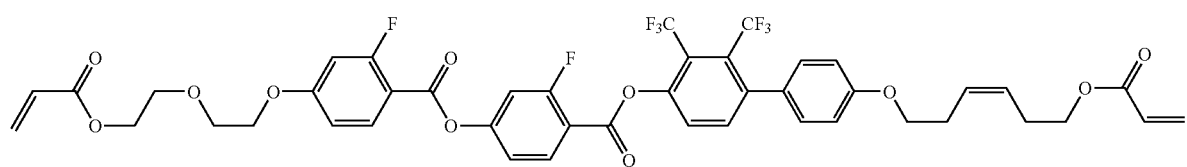
(MA-152)
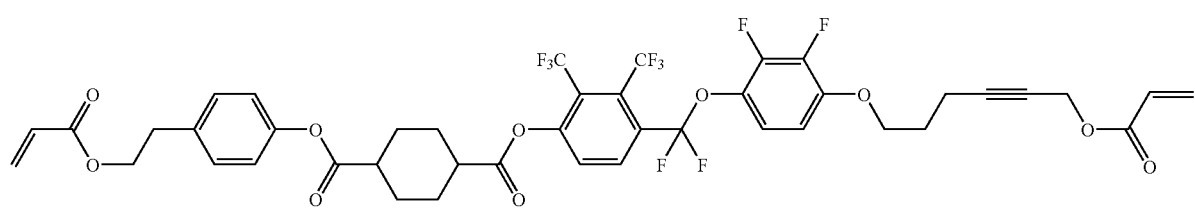

-continued
(MA-153)
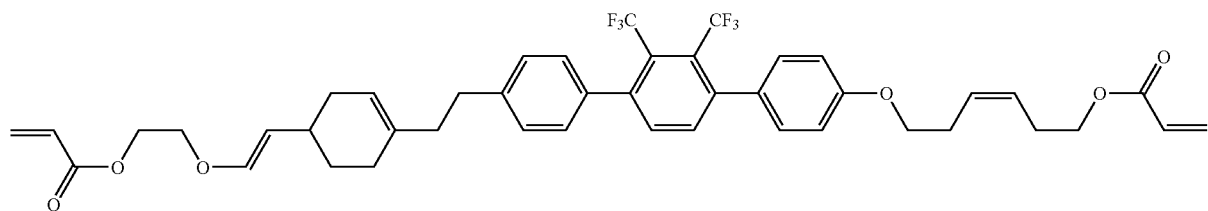
(MA-154)
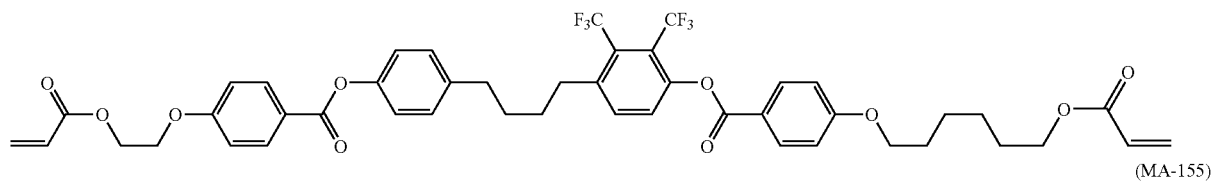
(MA-155)
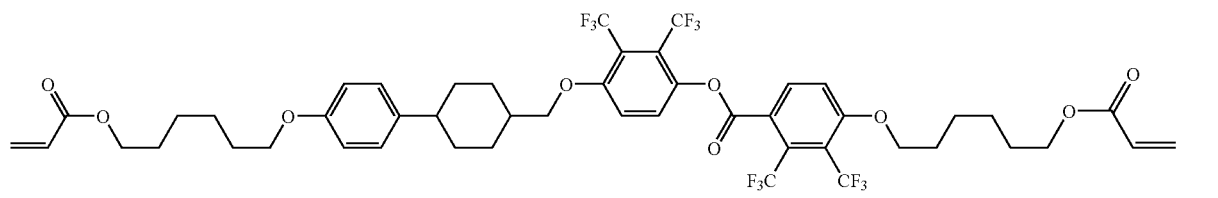
(MA-156)
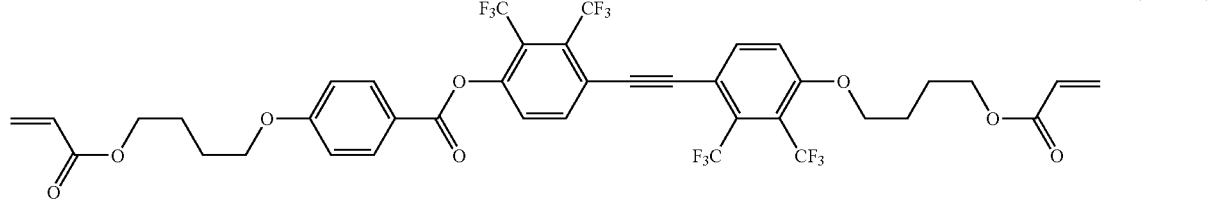
(MA-157)
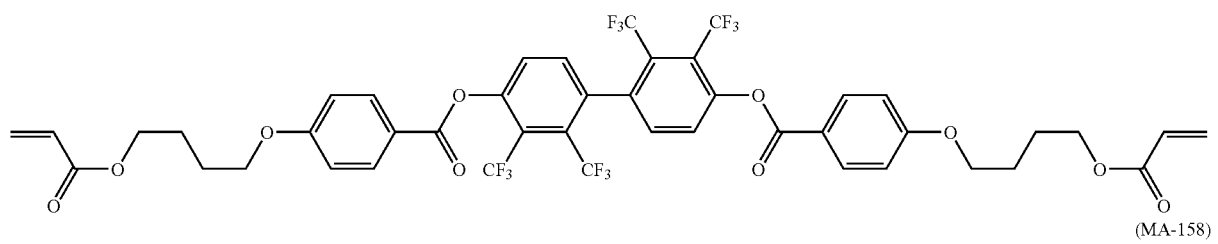
(MA-158)
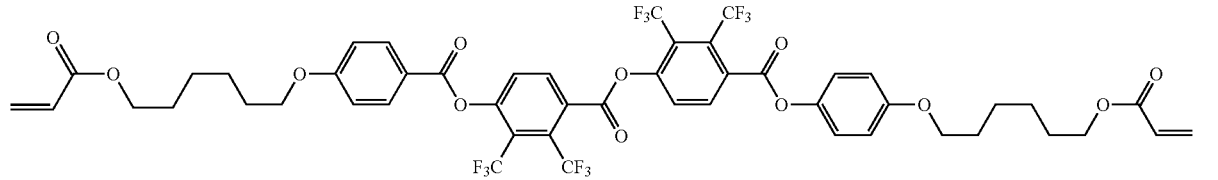
(MA-159)
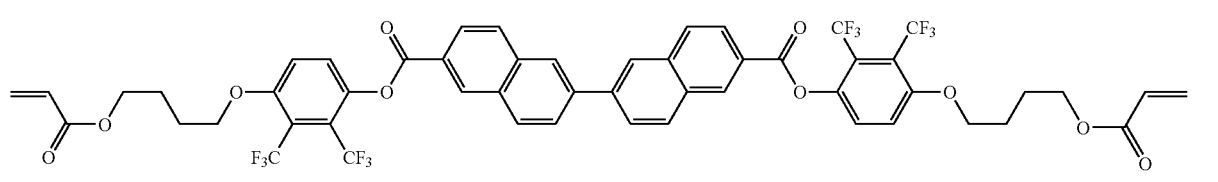
(MA-160)
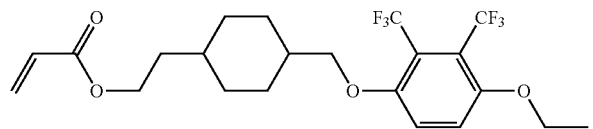

(MA-161)
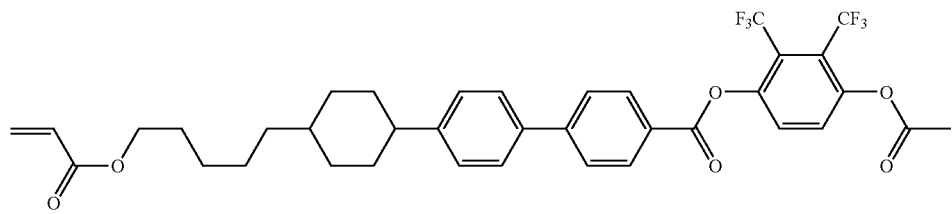
(MA-162)
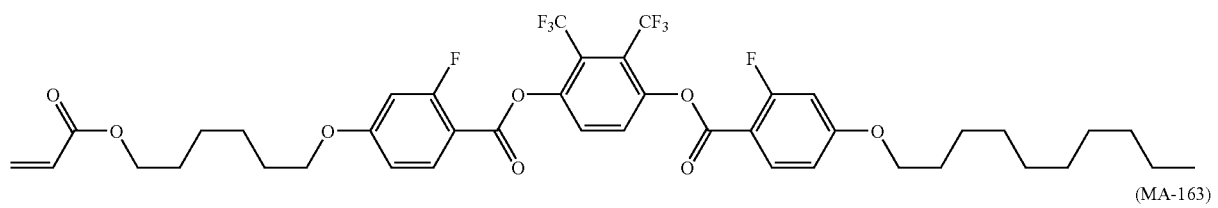
(MA-163)
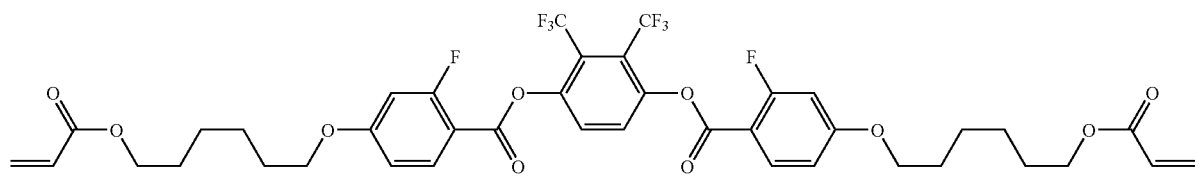
(MA-164)
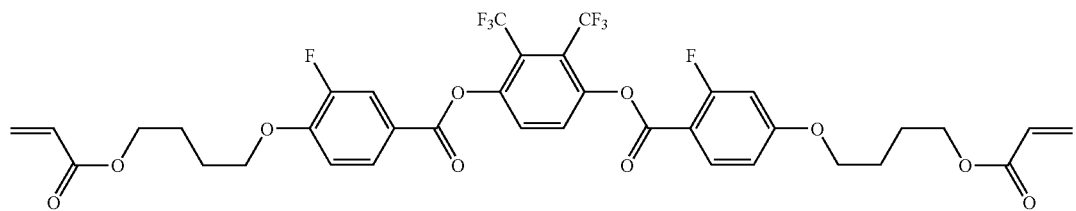
(MA-165)
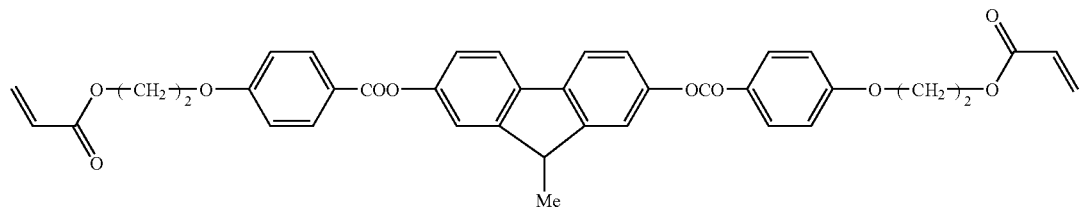
(MA-166)
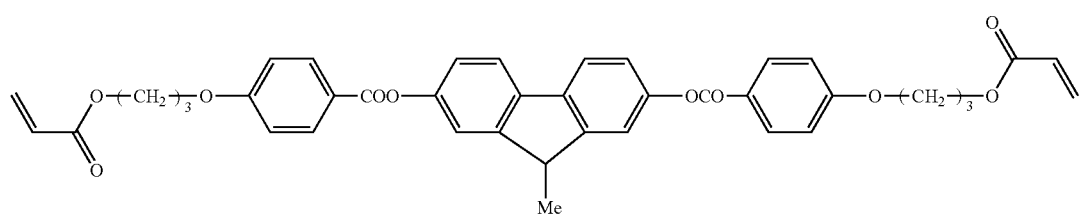
(MA-167)
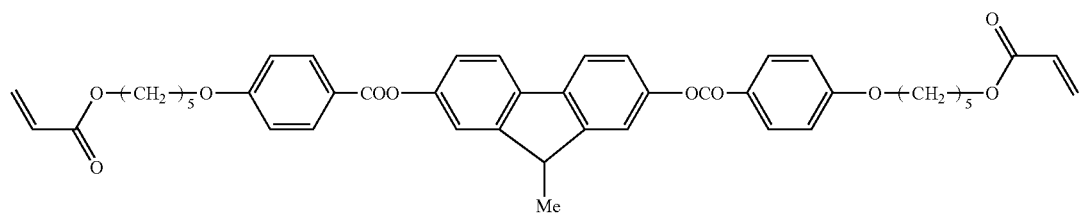

-continued
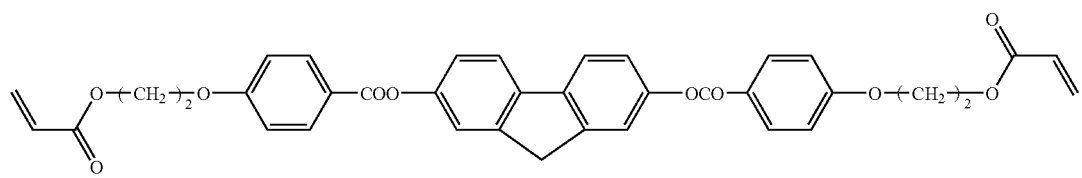
(MA-168)
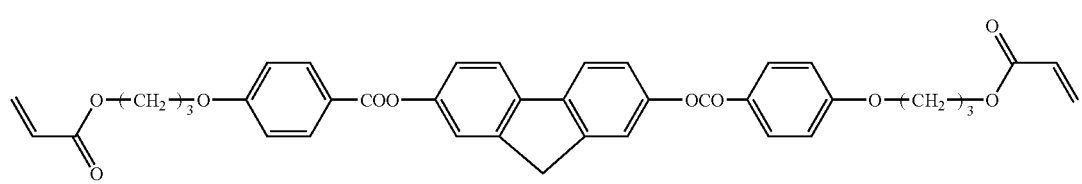
(MA-169)
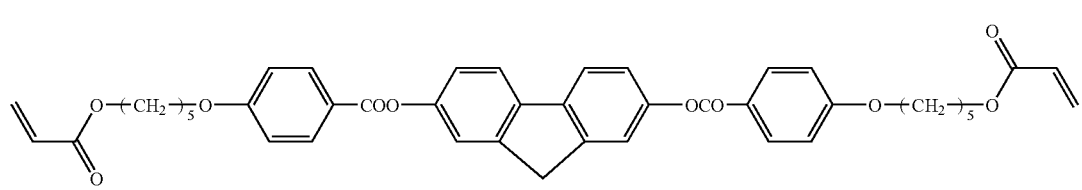
(MA-170)
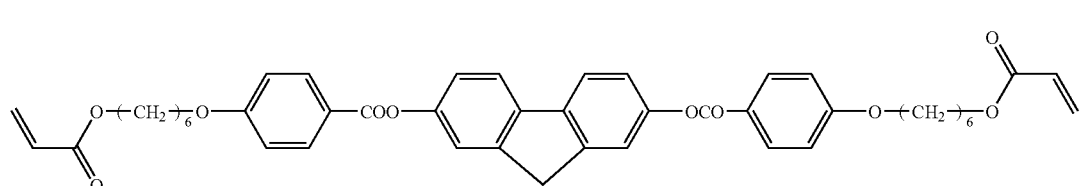
(MA-171)
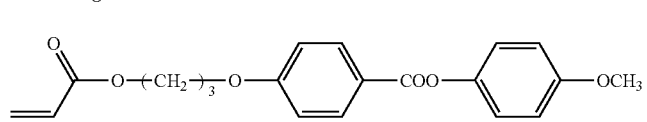
(MA-172)
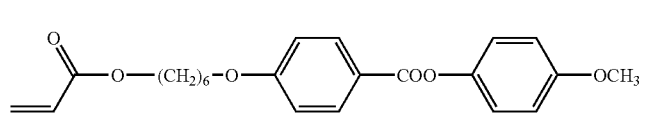
(MA-173)
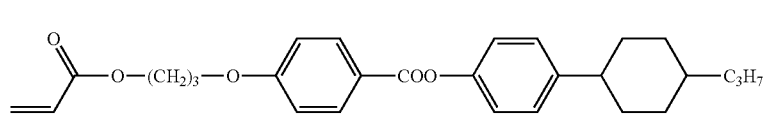
(MA-174)
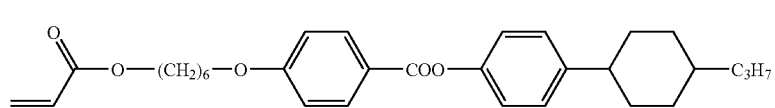
(MA-175)
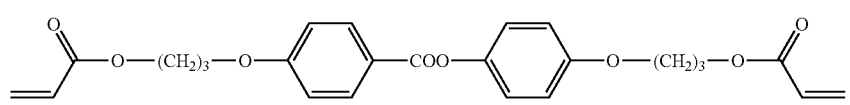
(MA-176)
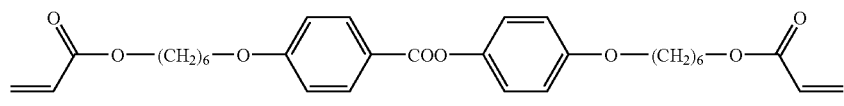
(MA-177)
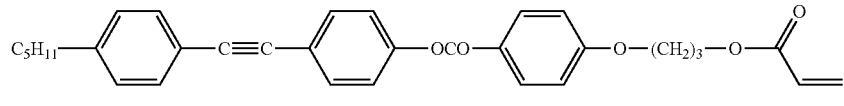
(MA-178)
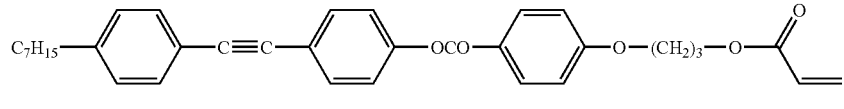
(MA-179)

-continued
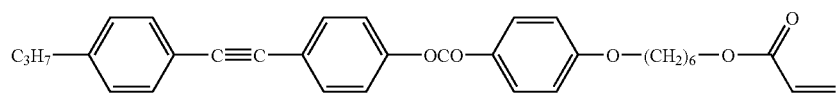
(MA-180)
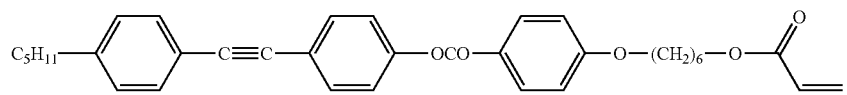
(MA-181)
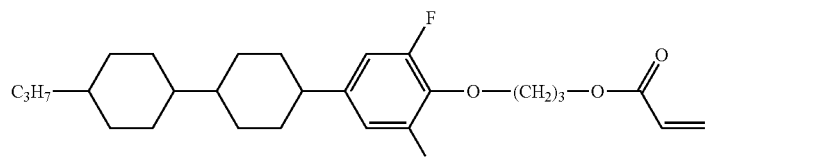
(MA-182)
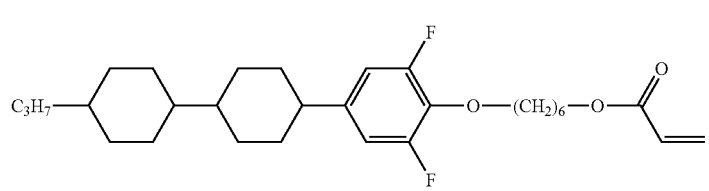
(MA-183)
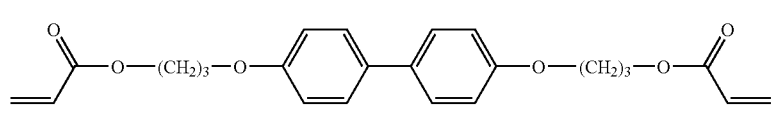
(MA-184)
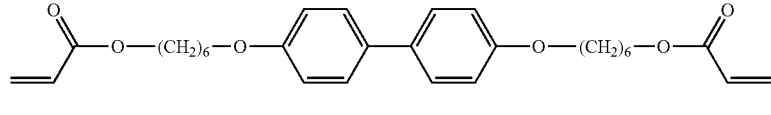
(MA-185)
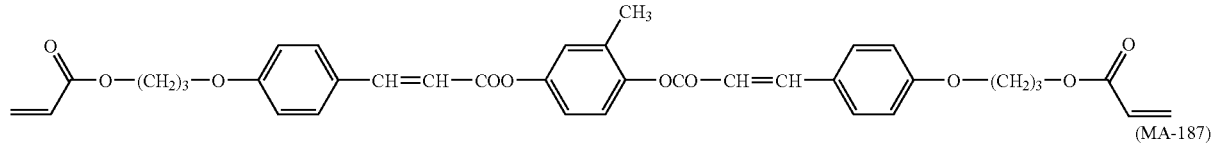
(MA-186)
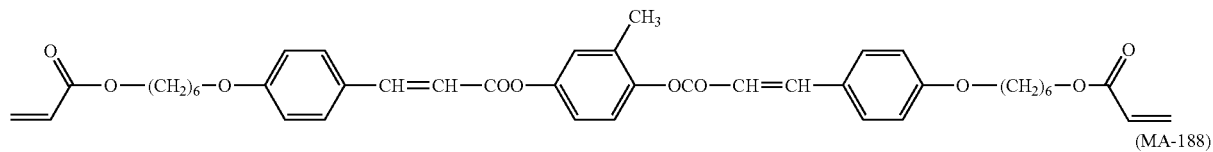
(MA-187)
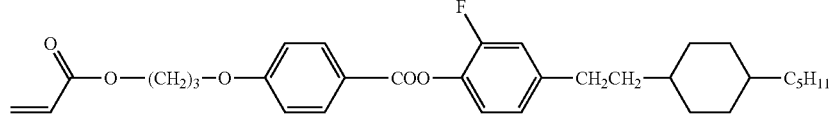
(MA-188)
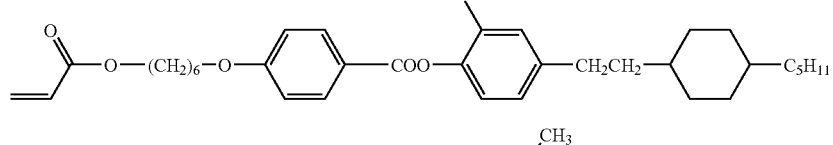
(MA-189)
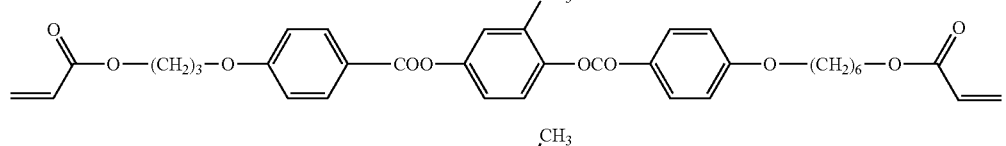
(MA-190)
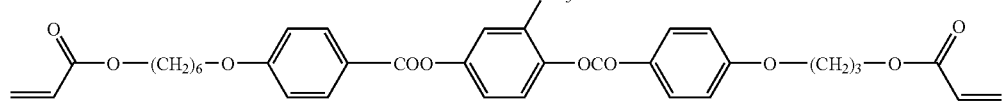
(MA-191)

-continued
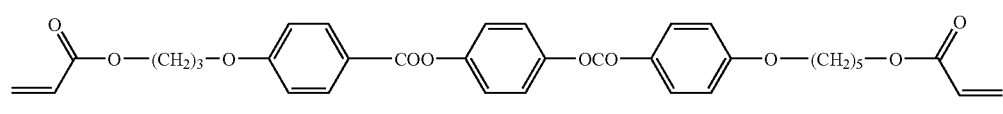 (MA-192)
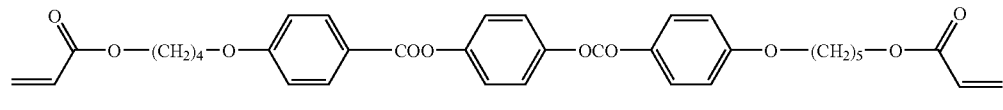 (MA-193)
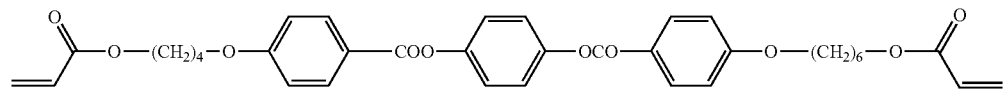 (MA-194)
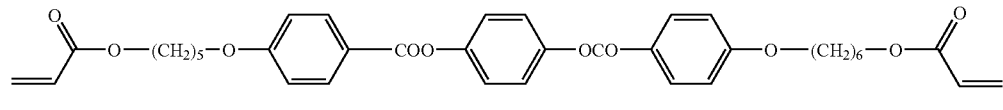 (MA-195)
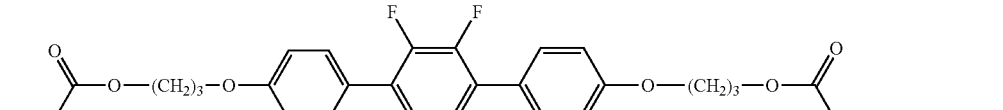 (MA-196)
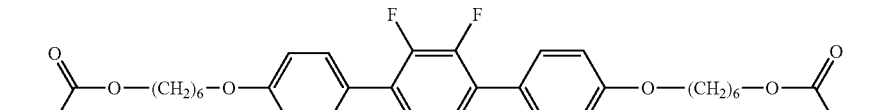 (MA-197)
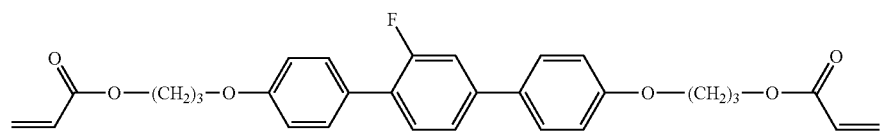 (MA-198)
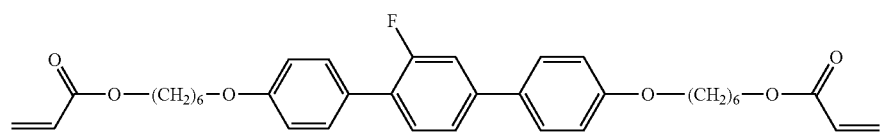 (MA-199)
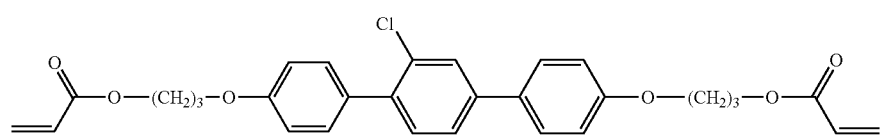 (MA-200)
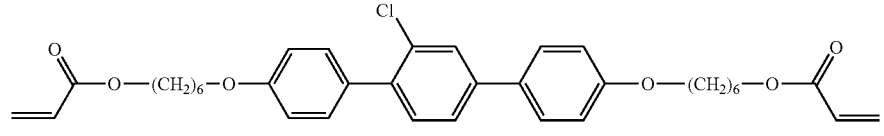 (MA-201)
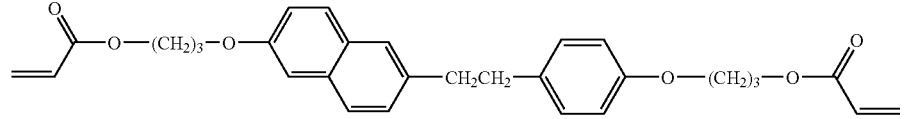 (MA-202)
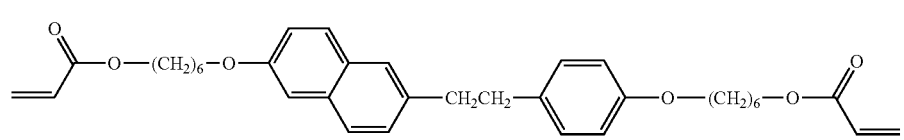 (MA-203)
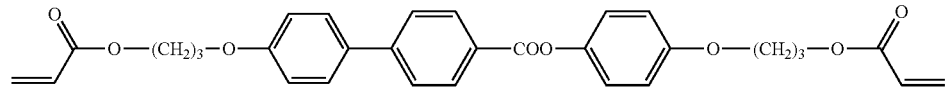 (MA-204)

-continued
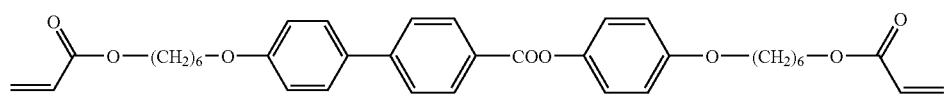
(MA-205)
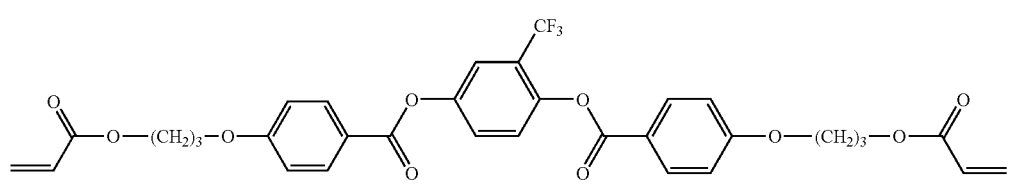
(MA-206)
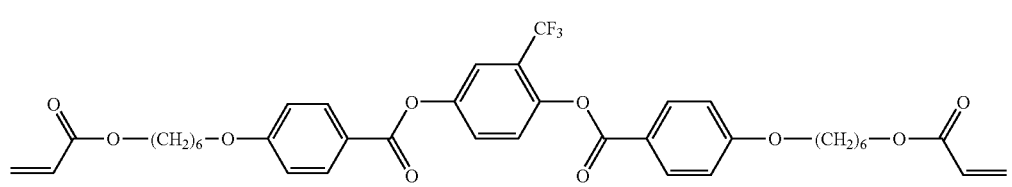
(MA-207)
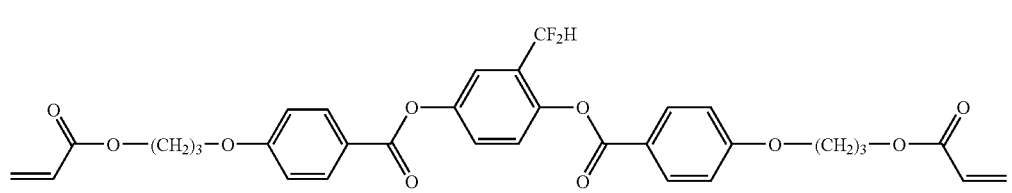
(MA-208)
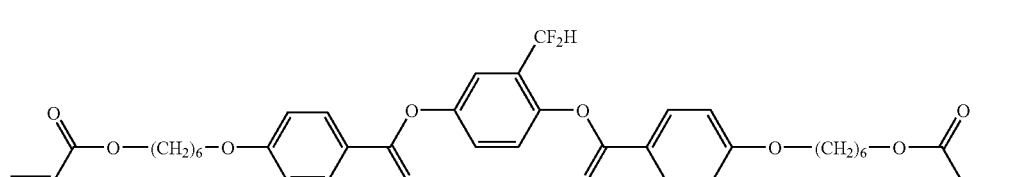
(MA-209)
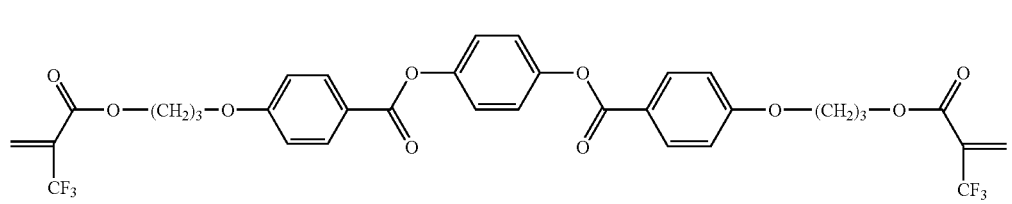
(MA-210)
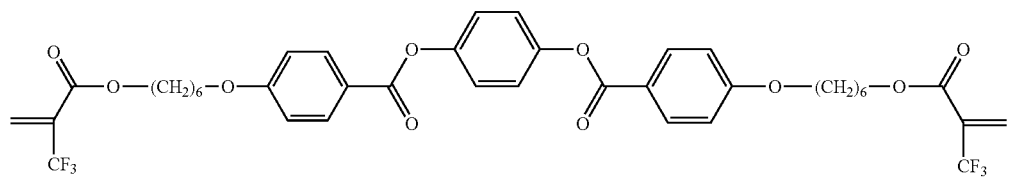
(MA-211)
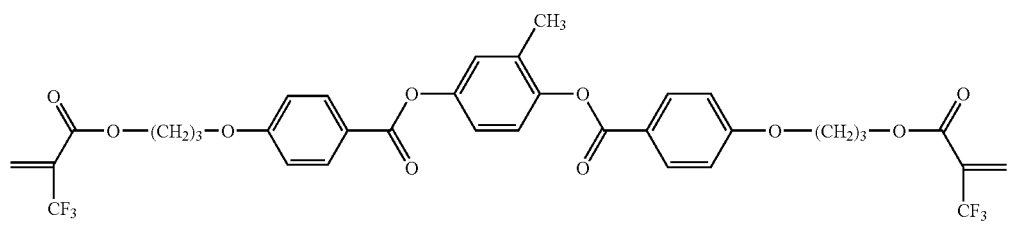
(MA-212)

-continued
(MA-213)
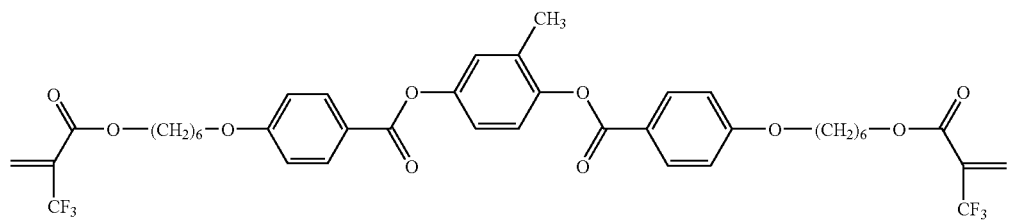
(MA-214)
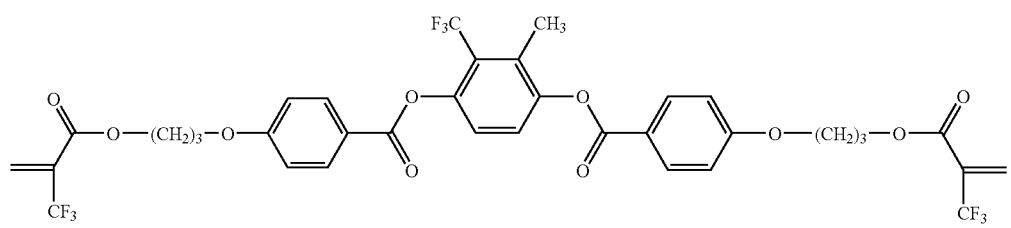
(MA-215)
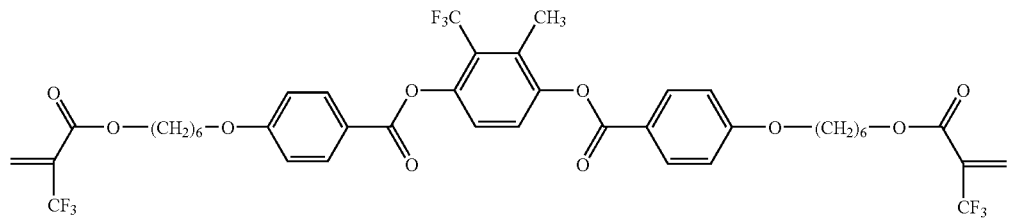
(MA-216)
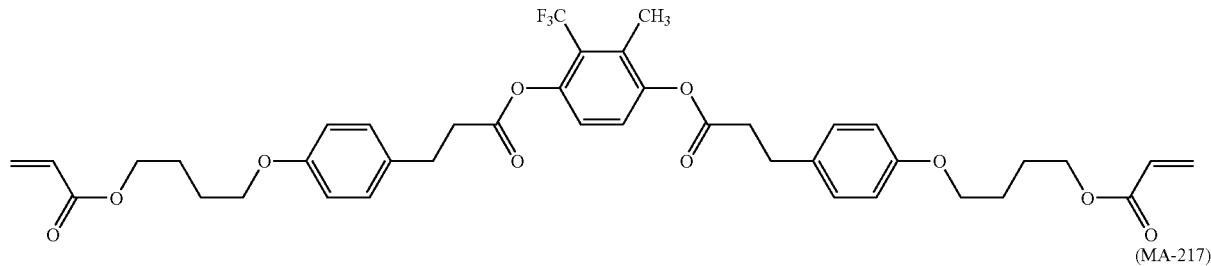
(MA-217)
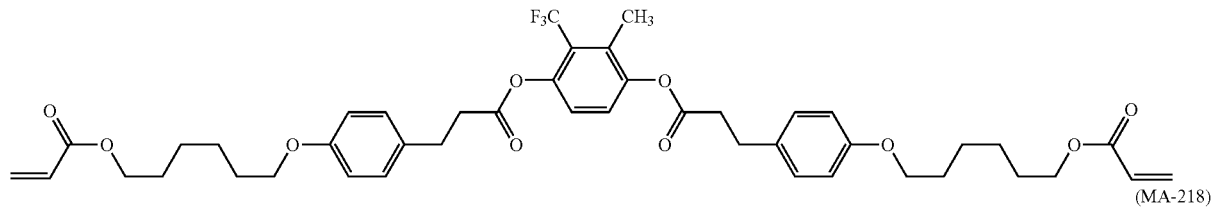
(MA-218)
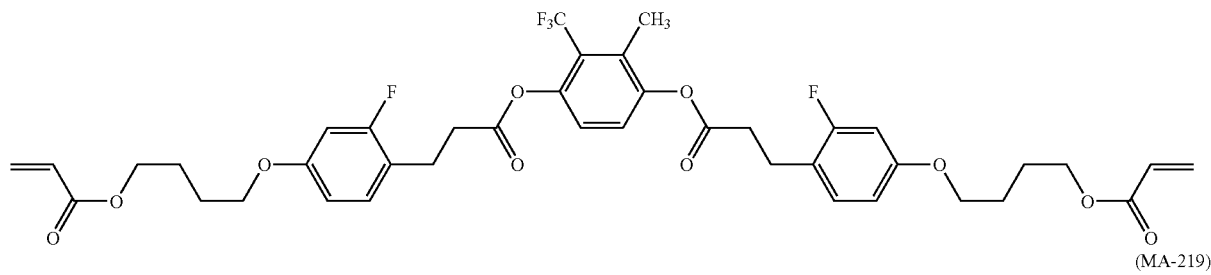
(MA-219)
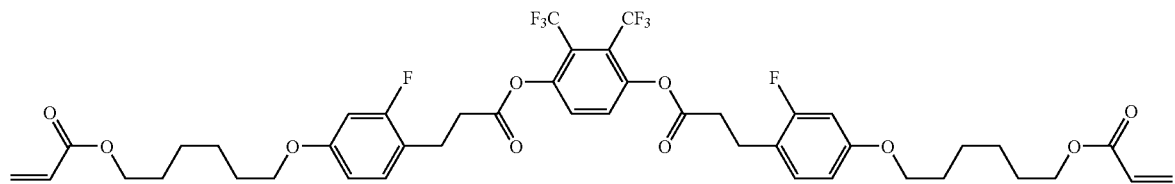

-continued
(MA-220)
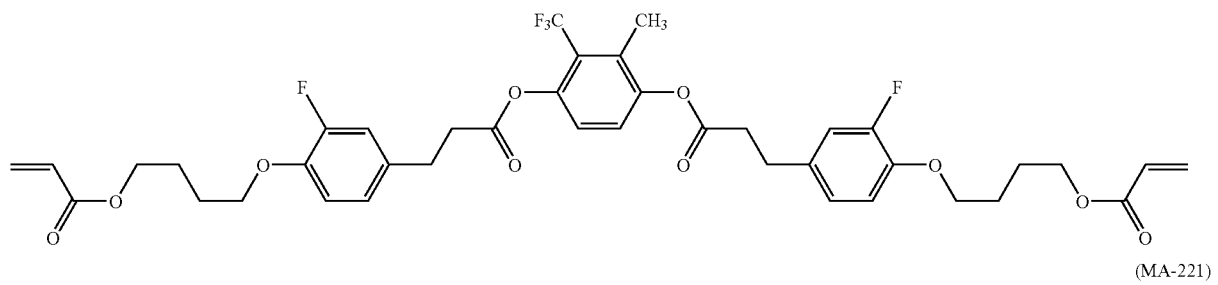
(MA-221)
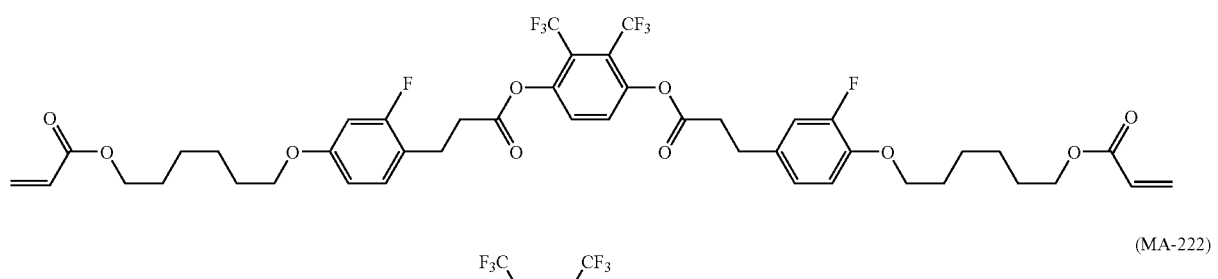
(MA-222)
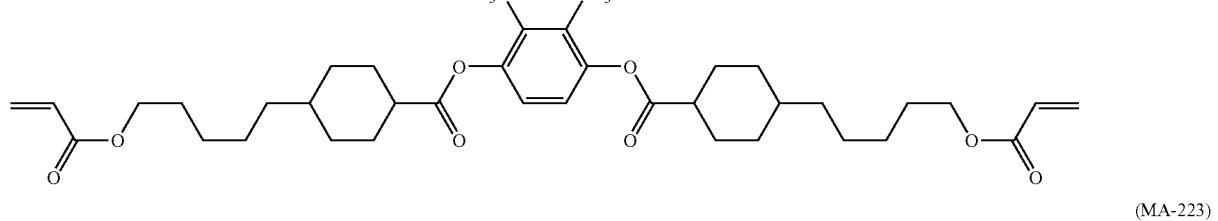
(MA-223)
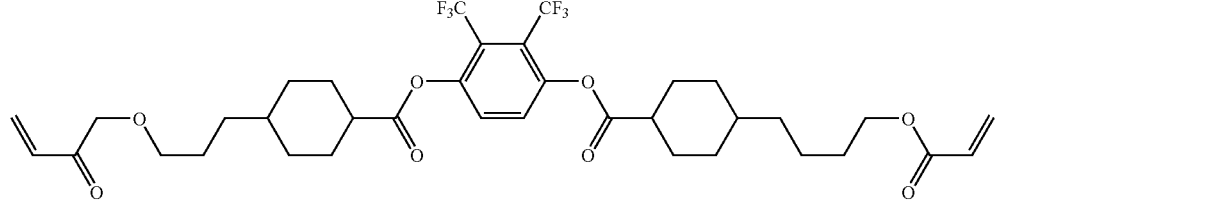
(MA-224)
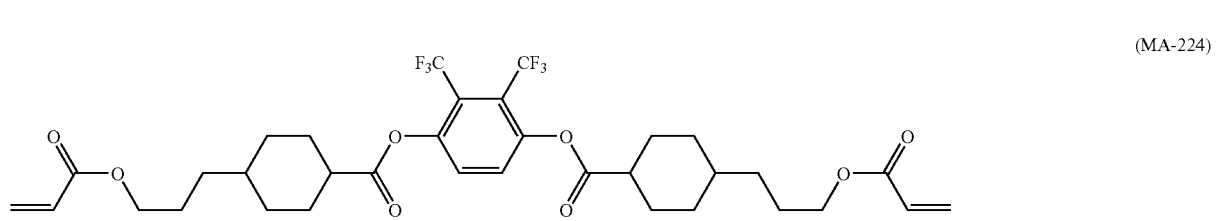
(MA-225)
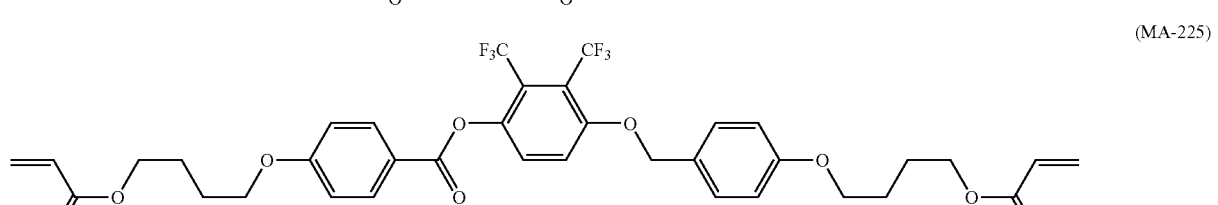
(MA-226)
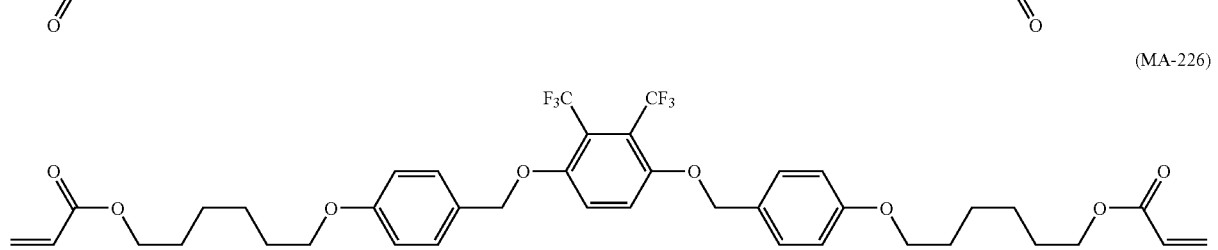

-continued
(MA-227)
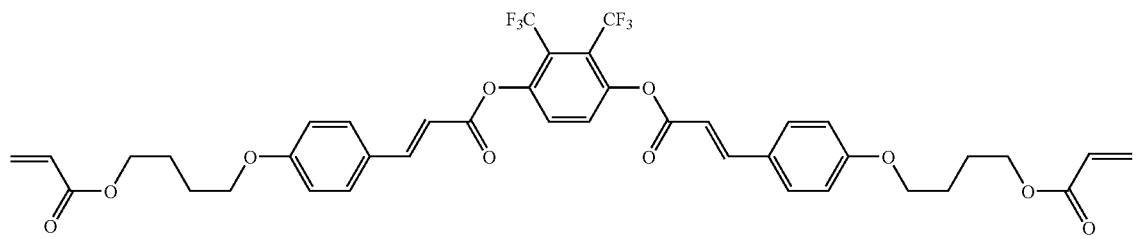
(MA-228)
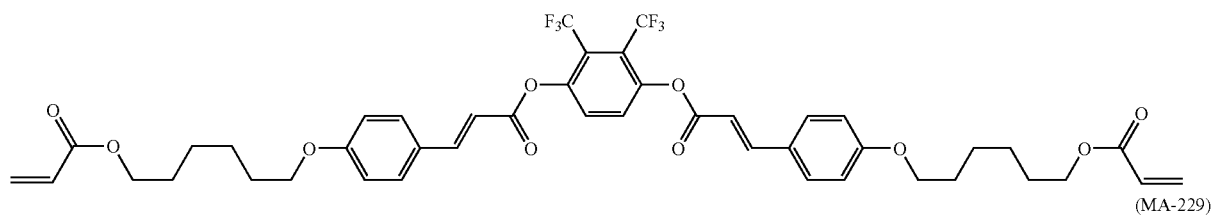
(MA-229)
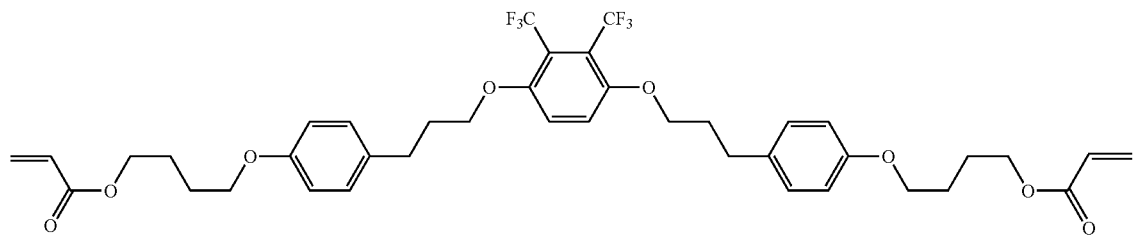
(MA-230)
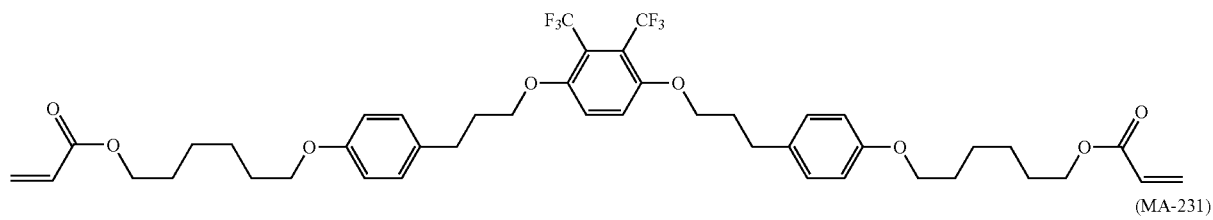
(MA-231)
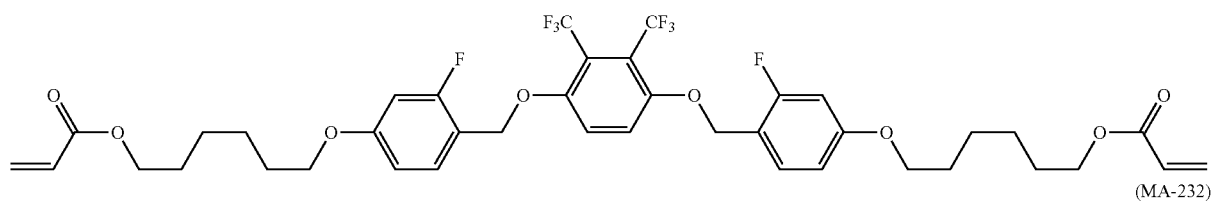
(MA-232)
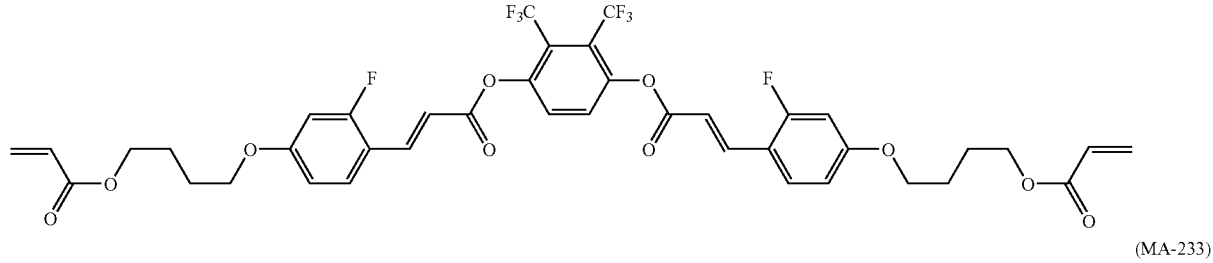
(MA-233)
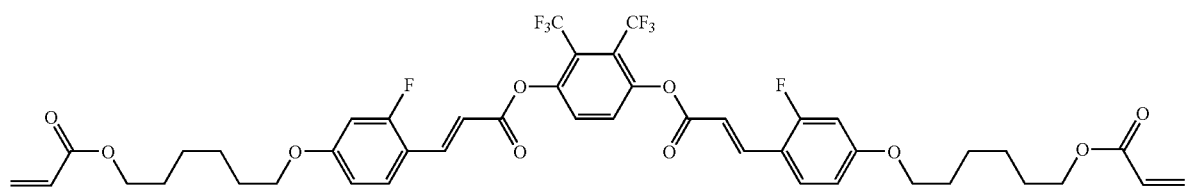

-continued
(MA-234)
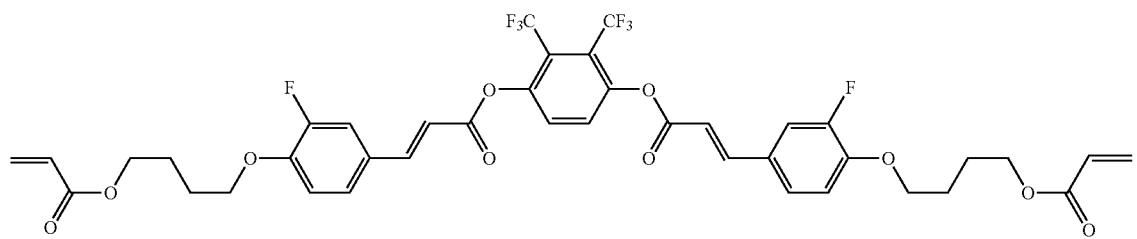
(MA-235)
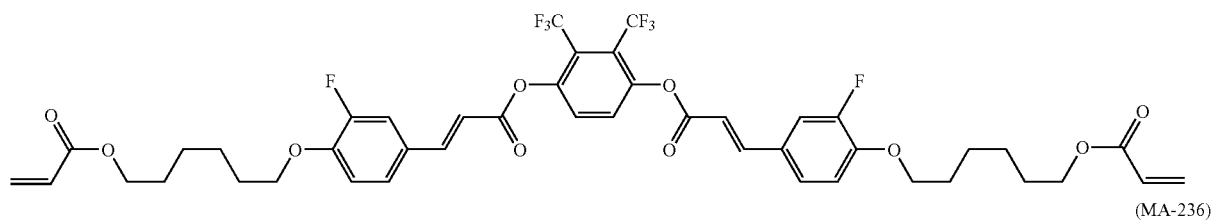
(MA-236)
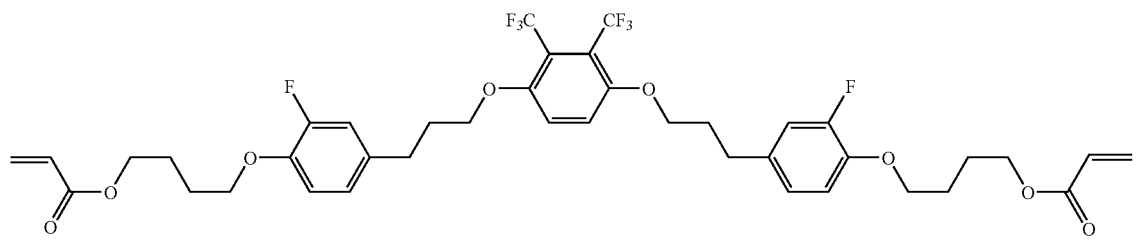
(MA-237)
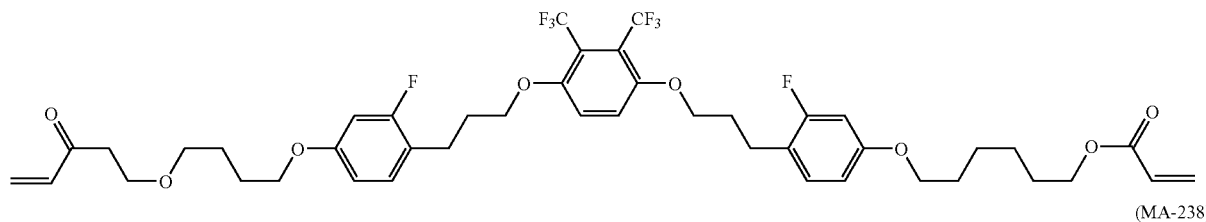
(MA-238)
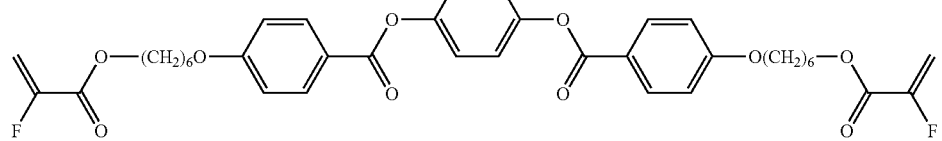
(MA-239)
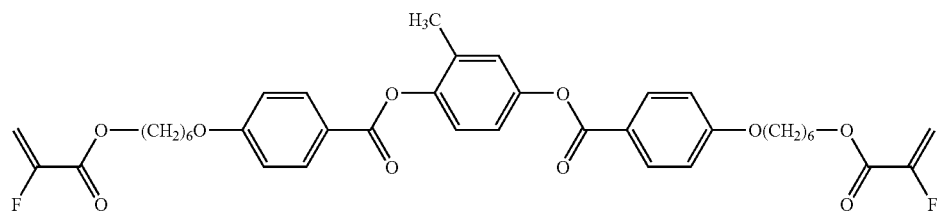
(MA-240)
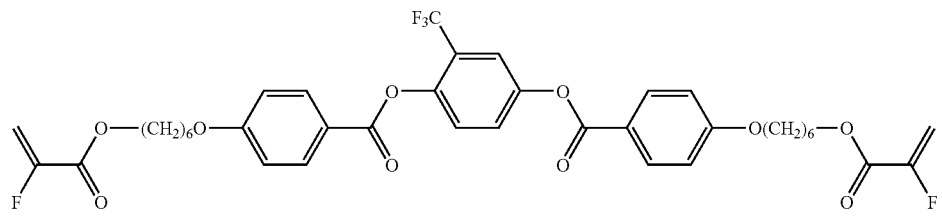

-continued
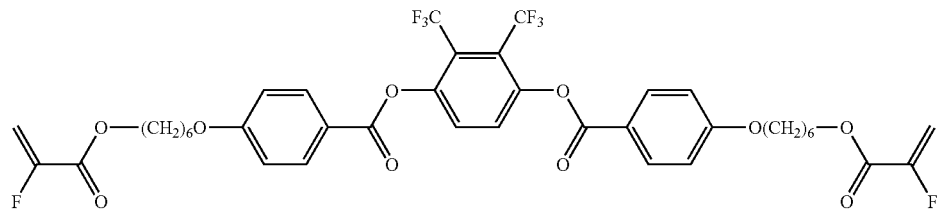
(MA-241)
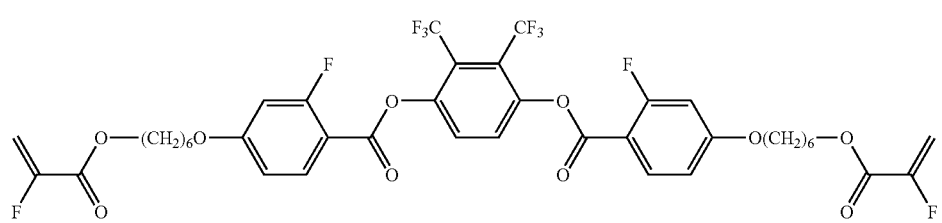
(MA-242)
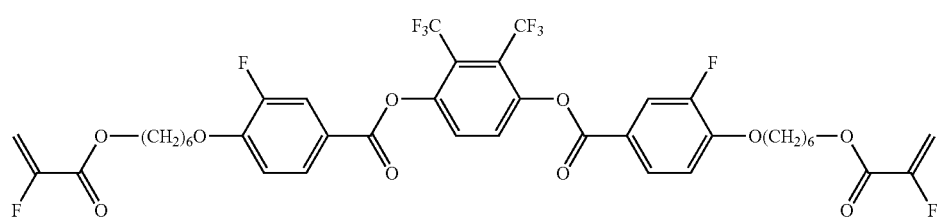
(MA-243)
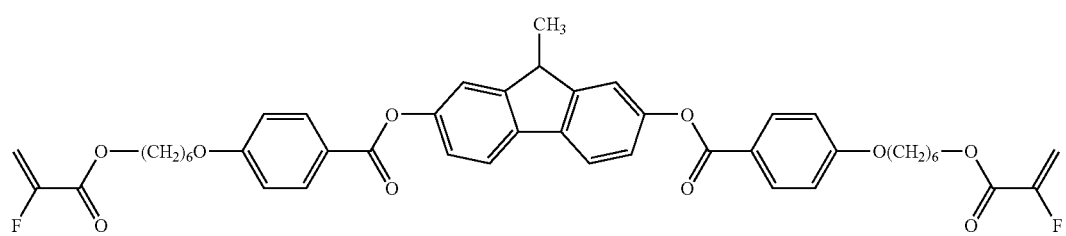
(MA-244)
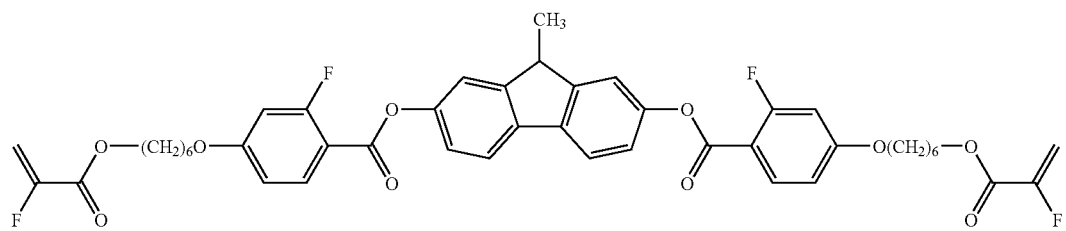
(MA-245)
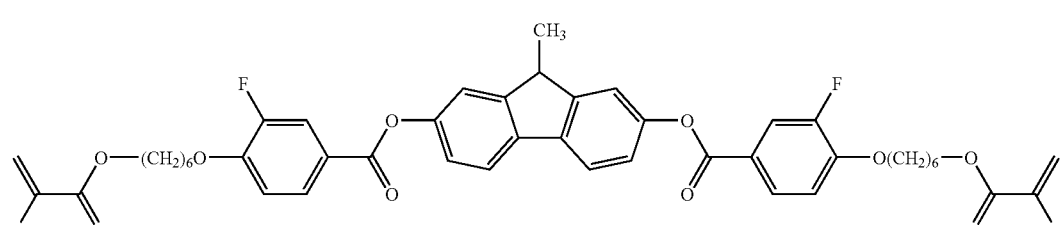
(MA-246)
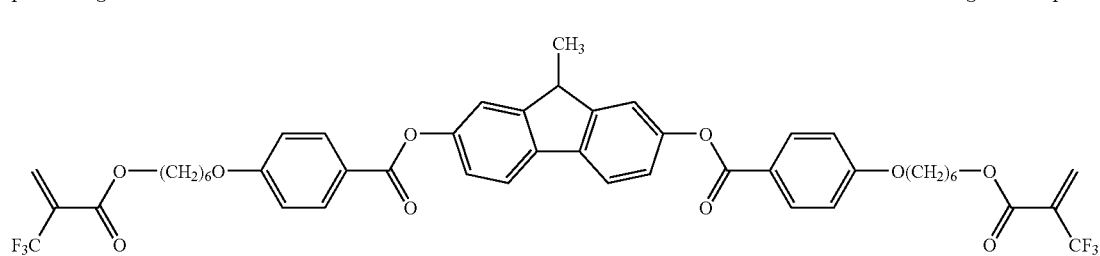
(MA-247)

-continued
(MA-248)
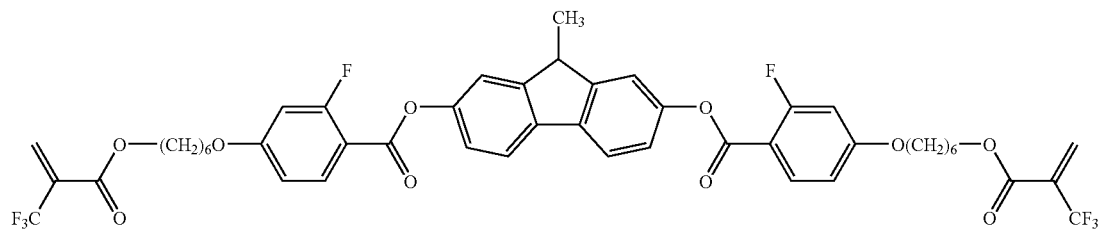
(MA-249)
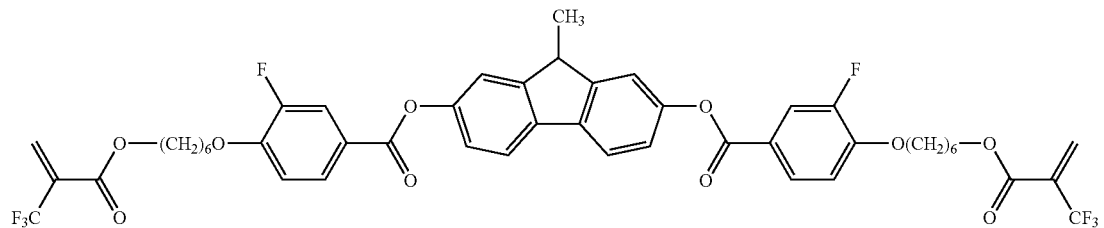
VE-1
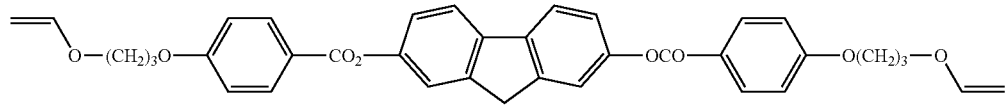
VE-2
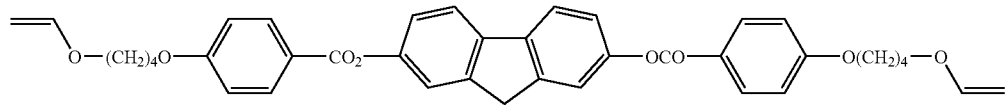
VE-3
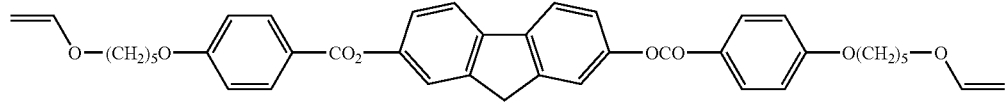
VE-4
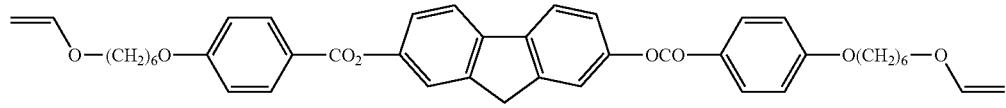
VE-5
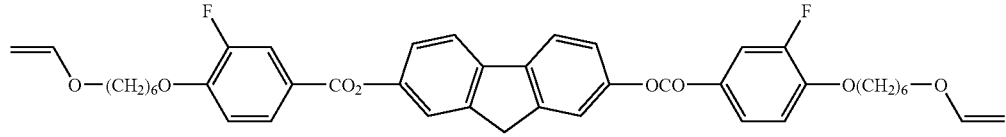
VE-6
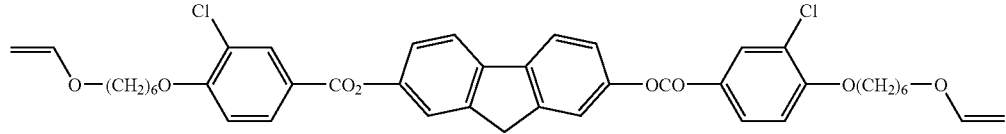
VE-7
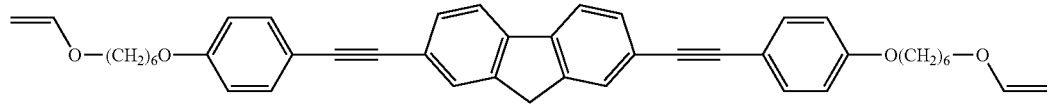
VE-8
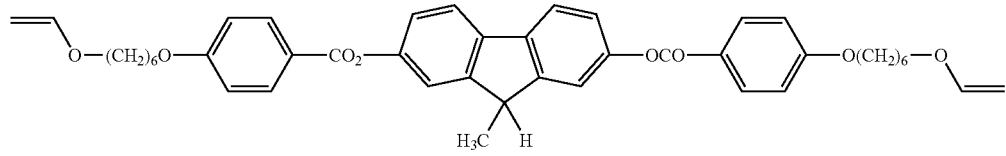

-continued
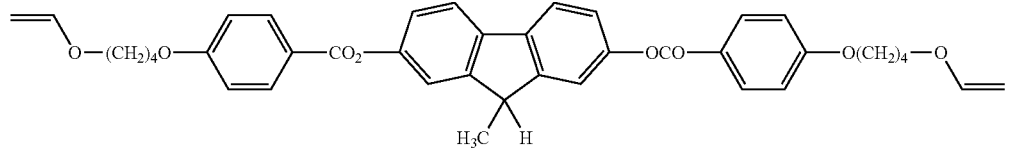
VE-9
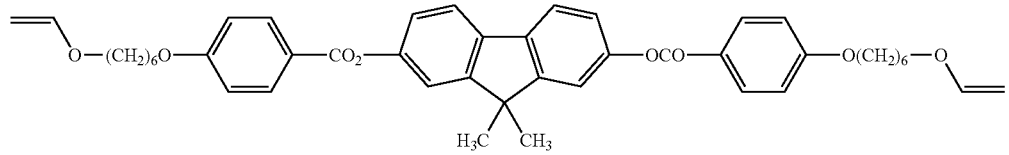
VE-10
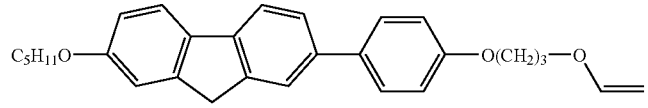
VE-11
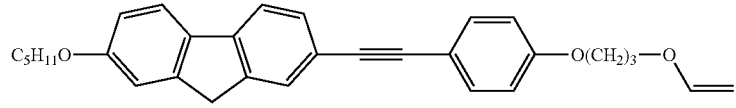
VE-12
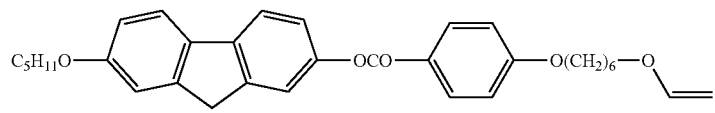
VE-13
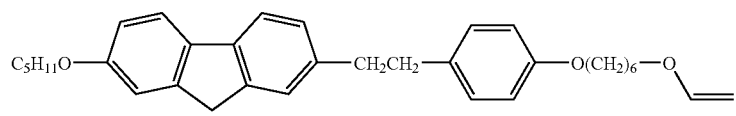
VE-14
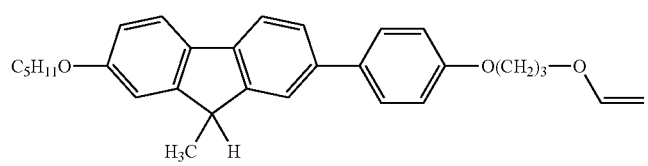
VE-15
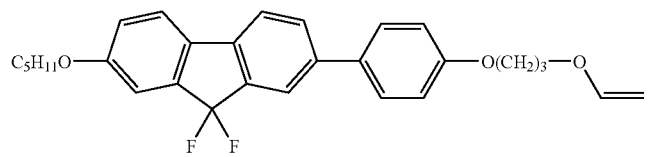
VE-16
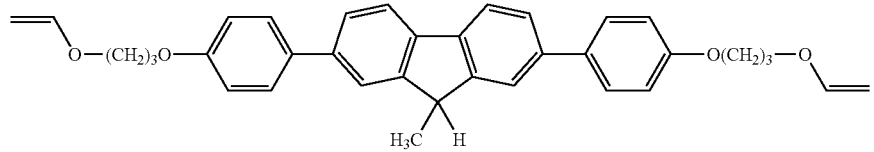
VE-17
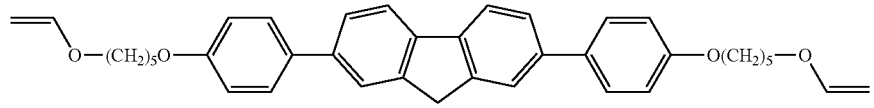
VE-18
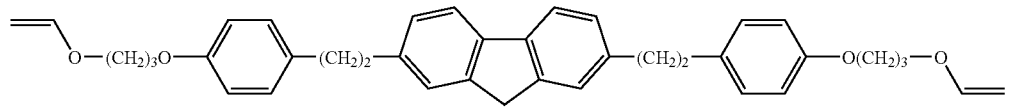
VE-19

-continued
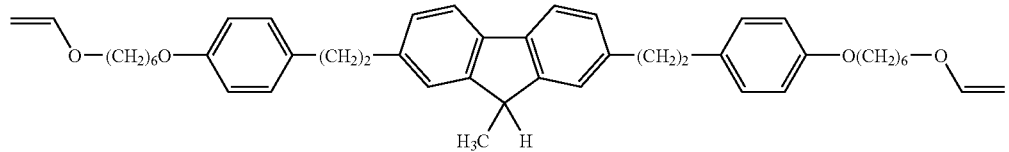
VE-20
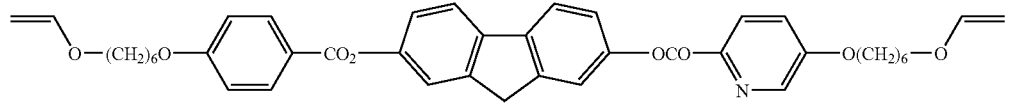
VE-21
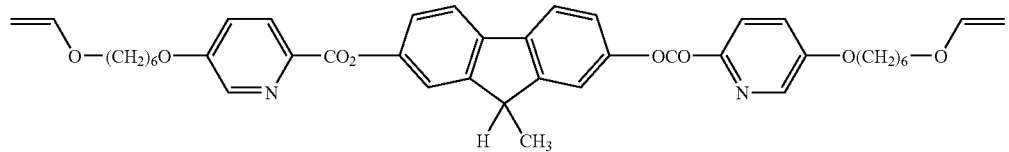
VE-22
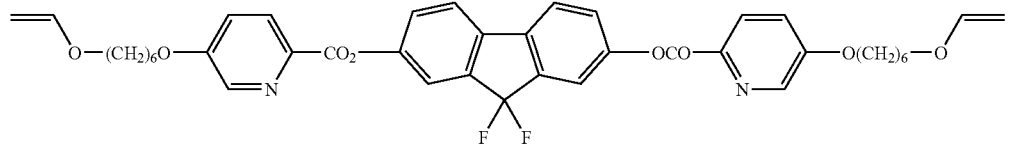
VE-23
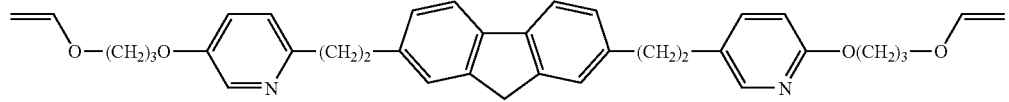
VE-24
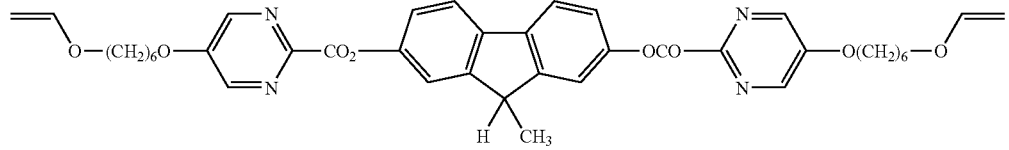
VE-25
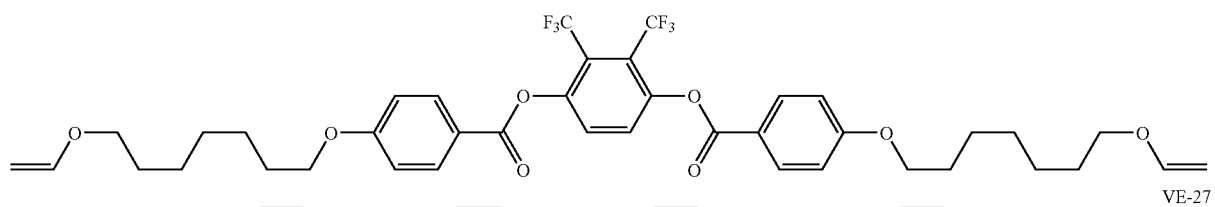
VE-26
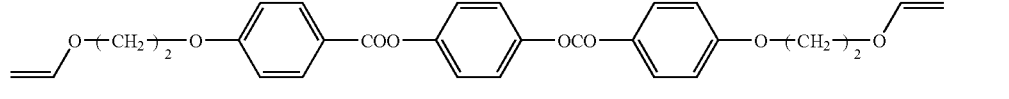
VE-27
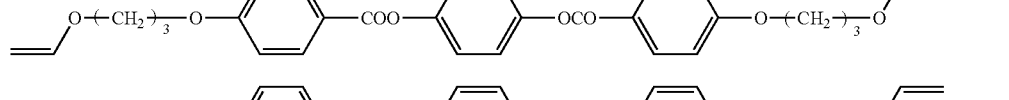
VE-28
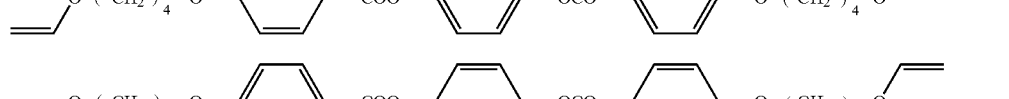
VE-29
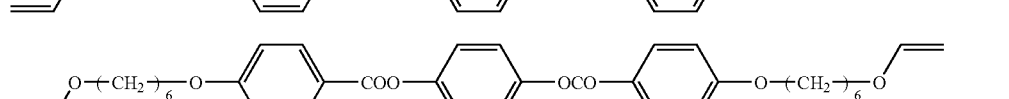
VE-30
VE-31

-continued
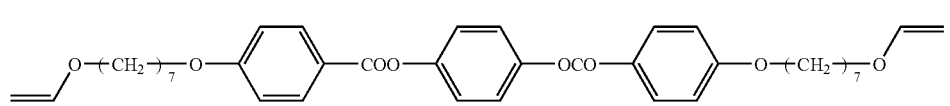
VE-32
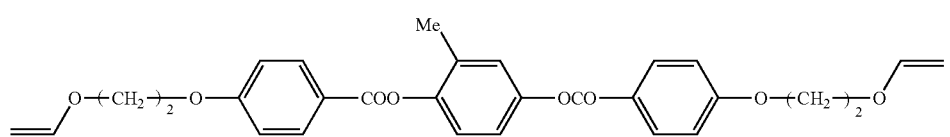
VE-33
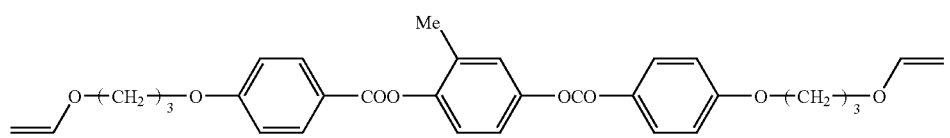
VE-34
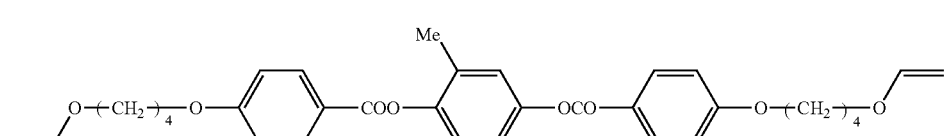
VE-35
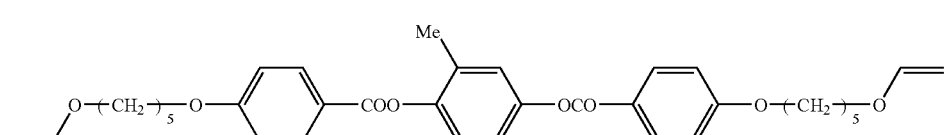
VE-36
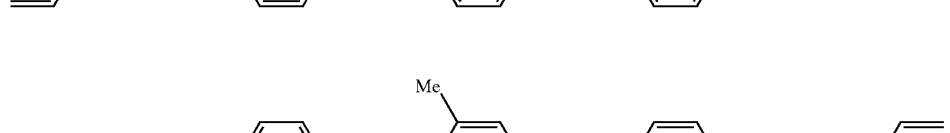
VE-37
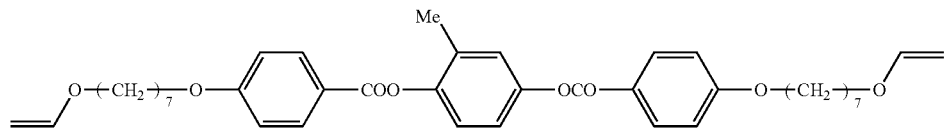
VE-38
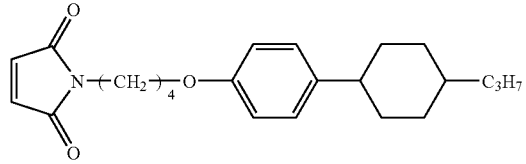
MI-1
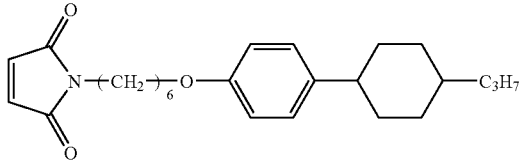
MI-2
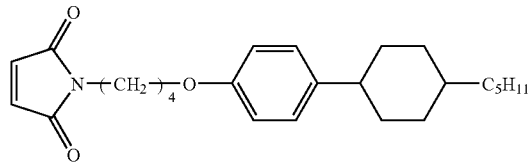
MI-3
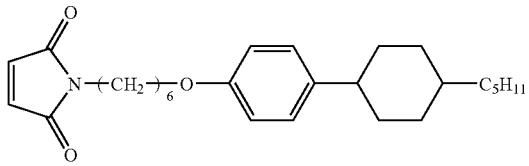
MI-4
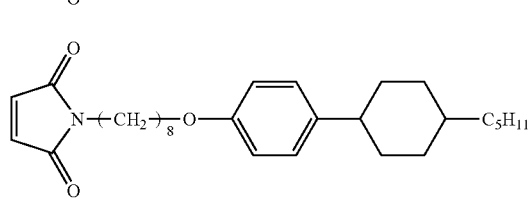
MI-5
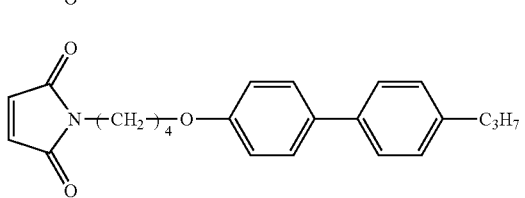
MI-6

-continued
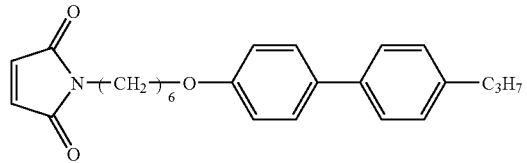
MI-7
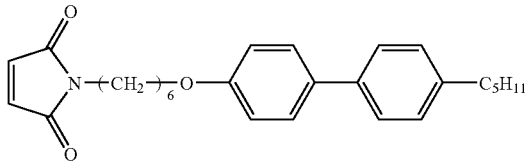
MI-8
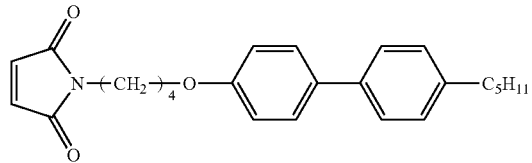
MI-9
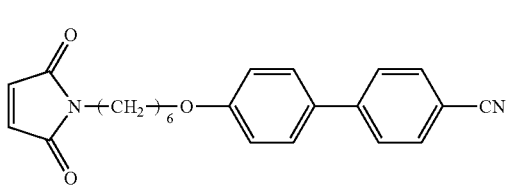
MI-10
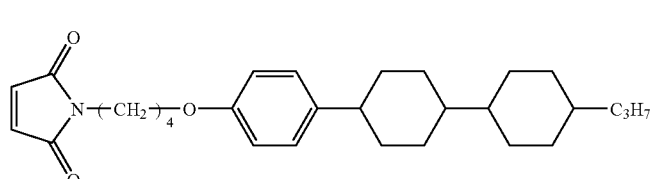
MI-11
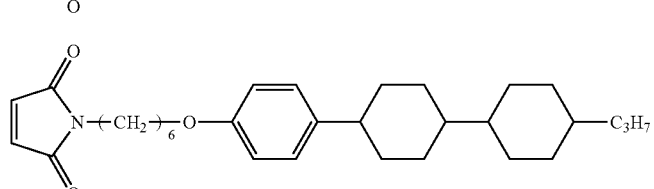
MI-12
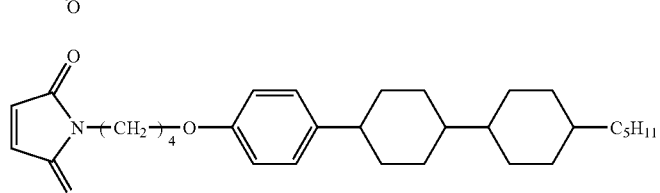
MI-13
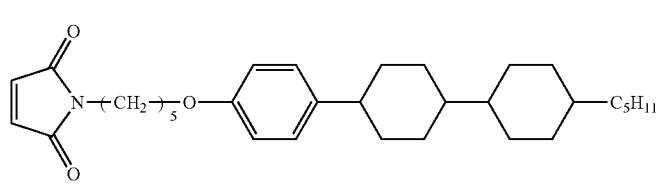
MI-14
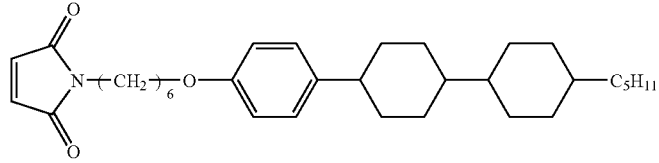
MI-15
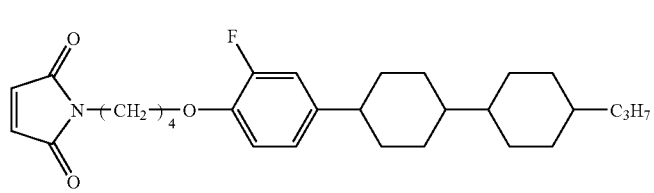
MI-16
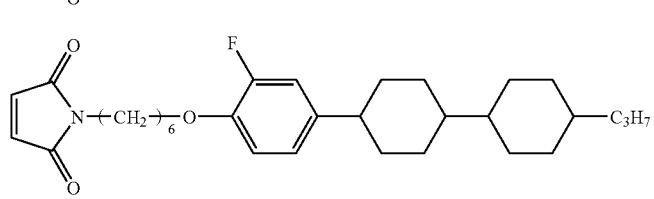
MI-17

-continued
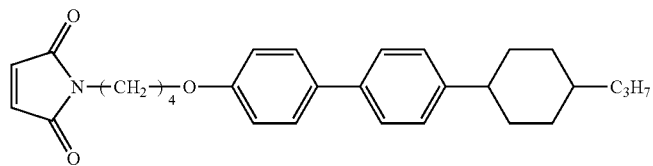
MI-18
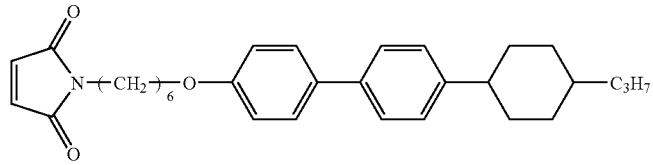
MI-19
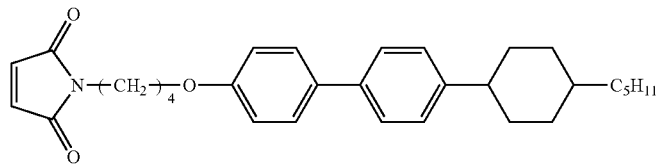
MI-20
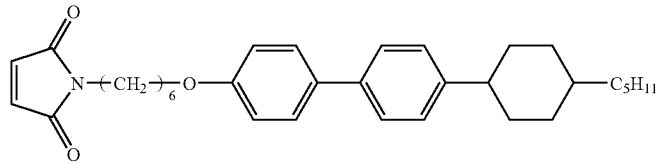
MI-21
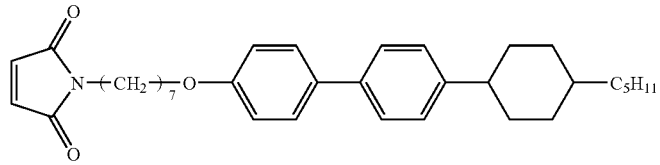
MI-22
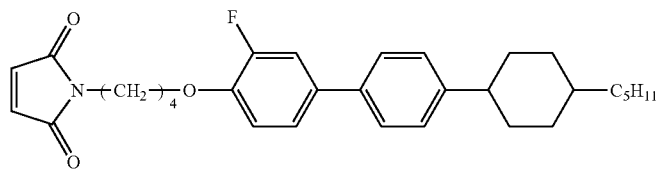
MI-23
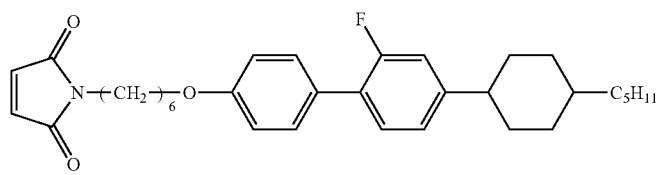
MI-24
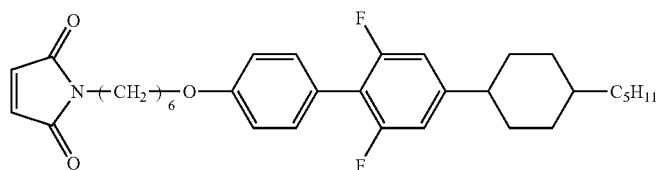
MI-25
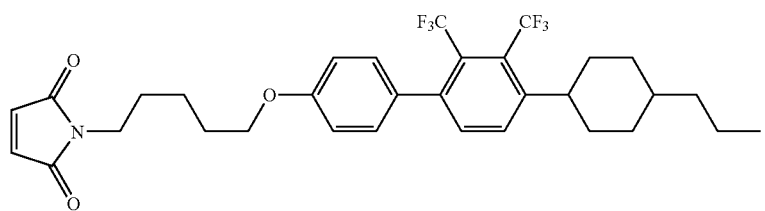
MI-26

-continued

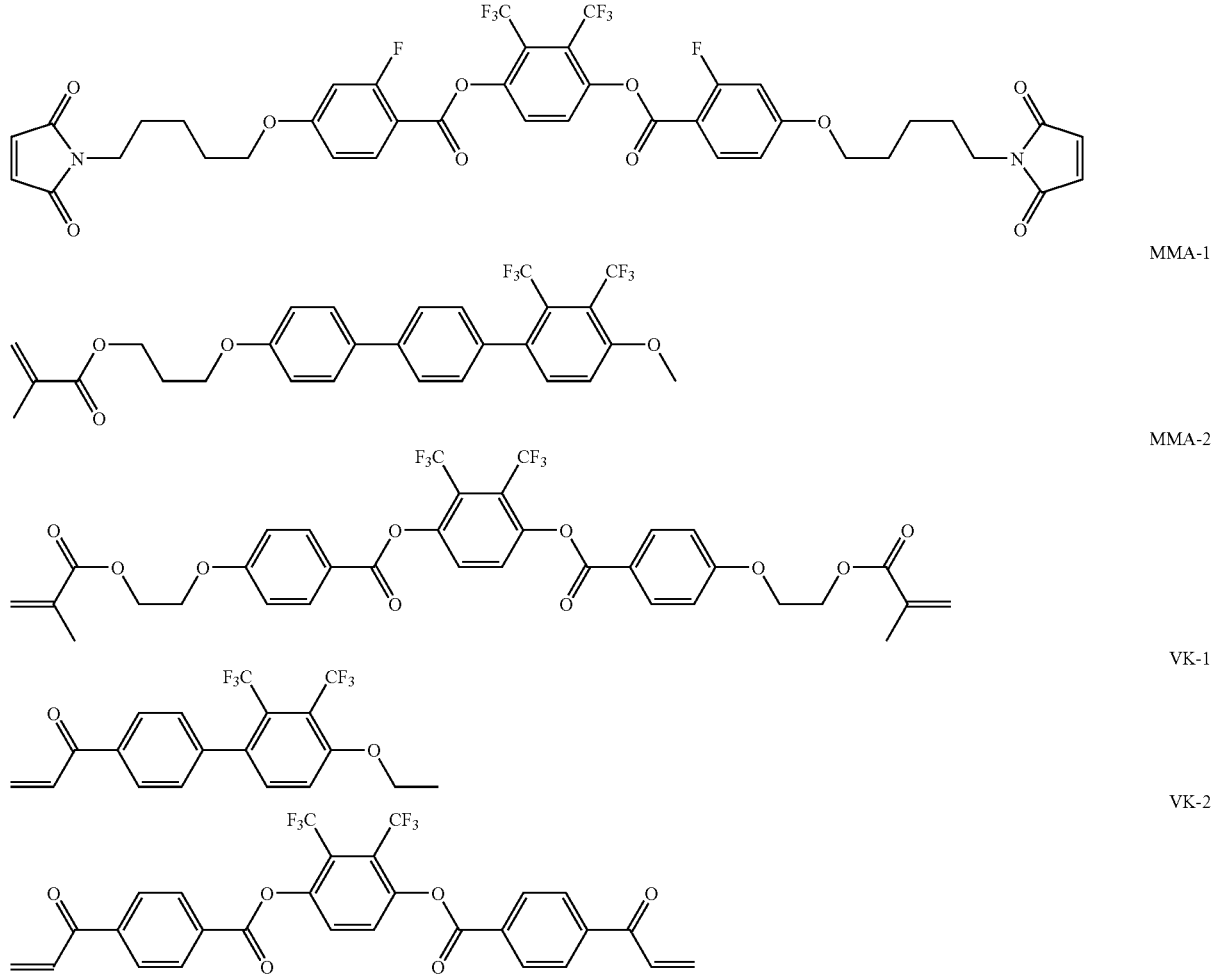

MI-27

MMA-1

MMA-2

VK-1

VK-2

In these examples, preferred configuration of 1,4-cyclohexylene and 1,3-dioxane-2,5-diyl is a trans form. The above-mentioned compounds may be produced by suitably combining known methods in organic synthetic chemistry. Methods of introducing the intended terminal groups, rings and bonding groups into the starting substances for them are described in Organic Syntheses, John Wiley & Sons, Inc.; Organic Reactions, John Wiley & Sons, Inc.; Comprehensive Organic Synthesis, Pergamon Press; New Experimental Chemistry Lecture (Maruzen), etc. In addition, production methods for them are described in the following references.

Polymer, Vol. 34, No. 8, pp. 1736-(1993): Compounds (VE group),
WO01/53248 A1 pamphlet: Compounds (MA group).

First preferred examples of the organosilicon compound having a primary amino group are compounds represented by Formula (3):

(3)

In Formula (3), $R^1$ is hydrogen, or a hydrocarbon group having 1 to 8 carbon atoms. $R^2$ is a hydrocarbon group having 1 to 8 carbon atoms. Preferred examples of the hydrocarbon group are alkyl, cycloalkyl, aryl and arylalkyl. Preferably, $R^1$ is hydrogen, or an alkyl having 1 to 3 carbon atoms. Also preferably, $R^2$ is alkyl having 1 to 4 carbon atoms.

In Formula (3), $R^3$ is alkylene having 1 to 20 carbon atoms. In the alkylene, optional —$CH_2$— may be replaced by —O—, —NH—, —CH=CH—, —CONH—, cycloalkylene having 3 to 8 carbon atoms, or arylene having 6 to 10 carbon atoms. In the arylene, optional hydrogen may be replaced by alkyl having 1 to 4 carbon atoms. Preferably, $R^3$ is alkylene having 1 to 12 carbon atoms, and in the alkylene, optional —$CH_2$— may be replaced by —O—, —NH—, —CONH—, or arylene having 6 to 10 carbon atoms, and in the arylene, optional hydrogen may be replaced by alkyl having 1 to 4 carbon atoms. More preferably, $R^3$ is alkylene having 1 to 12 carbon atoms, in which optional —$CH_2$— may be replaced by —O—, —NH— or phenylene. Even more preferably, $R^3$ is alkylene having 3 to 12 carbon atoms, in which optional —$CH_2$— may be replaced by —O— or —NH—. In $R^3$, —$CH_2$— directly bonding to Si should not be replaced by —O—. In Formula (3), n is an integer of 0 to 2. Specific examples of compound (3) are listed below.

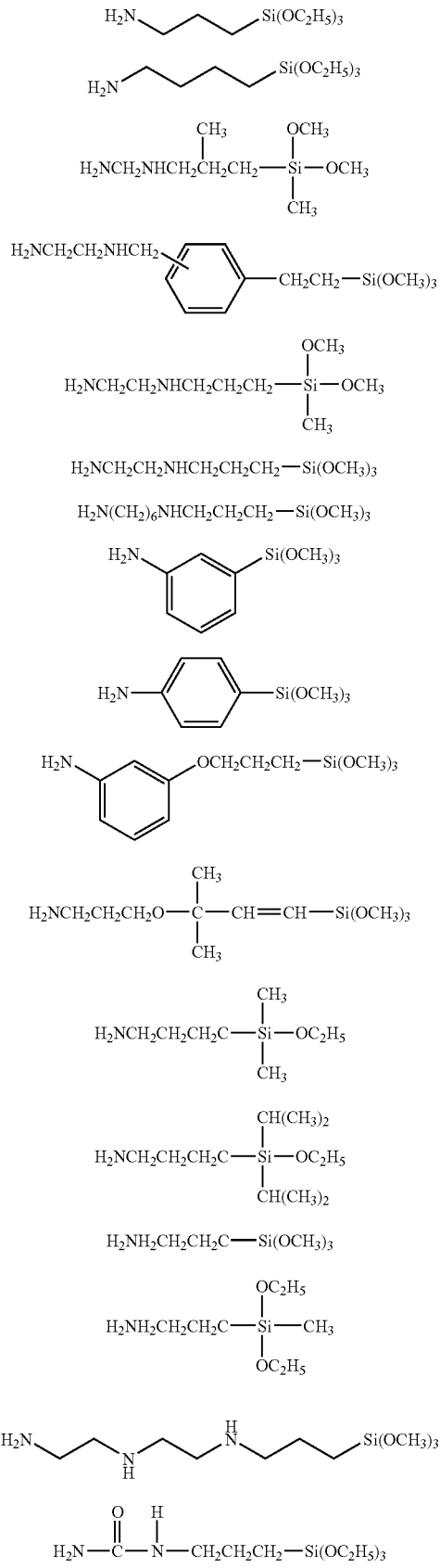

(3-1) through (3-17)

-continued

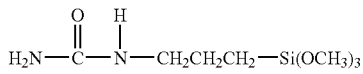
(3-18)

Of the above-mentioned examples, more preferred examples are compound (3-1) to compound (3-7) and compound (3-11) to compound (3-16).

Second preferred examples of the organosilicon compound having a primary amino group are compounds represented by Formula (4):

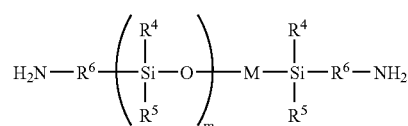
(4)

In Formula (4), $R^4$ and $R^5$ are independently alkyl having 1 to 4 carbon atoms, or phenyl. Preferably, $R^4$ and $R^5$ each are methyl, ethyl or phenyl. Even more preferably, $R^4$ and $R^5$ are methyl or ethyl. $R^6$ is alkylene having 1 to 10 carbon atoms. In the alkylene, optional —$CH_2$— may be replaced by —O— or phenylene. In the phenylene, optional hydrogen may be replaced by alkyl having 1 to 4 carbon atoms. Preferably, $R^6$ is alkylene having 1 to 10 carbon atoms, in which optional —$CH_2$— may be replaced by —O—. M is a single bond or phenylene; and m is an integer of 0 to 10.

Preferred examples of compound (4) are listed below. Each number of the examples listed below means the number of compound in which $R^4$ and $R^5$ are methyl, m is 1, M is a single bond, and $H_2N$—$R^6$— is each of the following groups.

| | |
|---|---|
| $H_2N$—$CH_2$— | (4-1-1) |
| $H_2N$—$(CH_2)_2$— | (4-1-2) |
| $H_2N$—$(CH_2)_3$— | (4-1-3) |
| $H_2N$—$(CH_2)_4$— | (4-1-4) |
| $H_2N$—$C_2H_4O(CH_2)_2$— | (4-1-5) |
| $H_2N$—$C_2H_4O(CH_2)_3$— | (4-1-6) |
| $H_2N$—$(CH_2)_3O(CH_2)_2$— | (4-1-7) |
| $H_2N$—$(CH_2)_3O(CH_2)_3$— | (4-1-8) |
| $H_2N$—$(CH_2)_4O(CH_2)_2$— | (4-1-9) |
| $H_2N$—$(CH_2)_4O(CH_2)_3$— | (4-1-10) |
| $H_2N$—$(CH_2)_5O(CH_2)_2$— | (4-1-11) |
| $H_2N$—$(CH_2)_5O(CH_2)_3$— | (4-1-12) |
| $H_2N$—$(CH_2)_6O(CH_2)_3$— | (4-1-13) |
| $H_2N$—$(CH_2)_6O(CH_2)_2$— | (4-1-14) |
| $H_2N$—Ph—O— | (4-1-15) |
| $H_2N$—Ph—$C_2H_4$— | (4-1-16) |
| $H_2N$—Ph—$O(CH_2)_2$— | (4-1-17) |

H₂N—Ph—O(CH₂)₃— (4-1-18)

H₂N—CH₂—Ph—O(CH₂)₂— (4-1-19)

H₂N—CH₂—Ph—O(CH₂)₃— (4-1-20)

H₂N—Ph—CH₂O(CH₂)₂— (4-1-21)

H₂N—Ph—CH₂O(CH₂)₃— (4-1-22)

H₂N—Ph—C₂H₄O(CH₂)₂— (4-1-23)

H₂N—Ph—C₂H₄O(CH₂)₃— (4-1-24)

H₂N—Ph(CH₃)—O(CH₂)₂— (4-1-25)

H₂N—Ph(CH₃)—O(CH₂)₃— (4-1-26)

In these groups, Ph is phenylene, and Ph(CH₃) is methylphenylene.

When $R^6$ is —(CH₂)₃—, $R^4$ and $R^5$ each are preferably methyl, ethyl or phenyl. When $R^4$ and $R^5$ are methyl and $R^6$ is —(CH₂)₃—, then compound (4) having a molecular weight of at most about 30,000 are also usable herein. Such polymers may be copolymers with dimethylsiloxane. When m is 0, M is a single bond and $R^4$ and $R^5$ are methyl, H₂N—$R^6$— is preferably H₂N-Ph-O—. When $R^4$ and $R^5$ are methyl, m is 1 and M is phenylene, the following compound (4-2-1) is preferred.

(4-2-1)

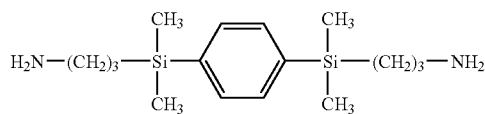

Of the above-mentioned examples, preferred examples are compound (4-1-1) to compound(4-1-14), and compound (4-2-1).

Third preferred examples of the organosilicon compound having a primary amino group are silsesquioxane derivatives having a constitutive unit represented by Formula (5). In the following description, silsesquioxane derivative(s) having a constitutive unit represented by Formula (5) may be referred to as compound (5).

(5)

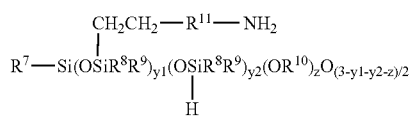

In Formula (5), $R^7$, $R^8$ and $R^9$ are independently alkyl having 1 to 18 carbon atoms, cycloalkyl having 3 to 8 carbon atoms, alkenyl having 2 to 6 carbon atoms, cycloalkenyl having 4 to 8 carbon atoms, aryl having 6 to 10 carbon atoms, or arylalkyl having 7 to 10 carbon atoms. $R^{10}$ is alkyl having 1 to 4 carbon atoms, CH₃CO—, CH₂=CHCO—, or CH₂=C(CH₃)CO—. z is 0, or 0.05 to 2.0. (y1+y2) is 0.1 to 2.0 when z=0, and is 0.05 to 2.0 when z≠0, and y2 is 0, or less than or equal to 3 times of y1. (y1+y2 +z) is 0.1 to 3.0, preferably 0.1 to 2.5, more preferably 0.1 to 2.0. $R^{11}$ is alkylene having 1 to 8 carbon atoms in which optional —CH₂— may be replaced by —O— or —NH—.

$R^{11}$ is preferably —CH₂—. Preferred examples of $R^8$ or $R^9$ are methyl, isopropyl, isobutyl, tert-butyl and phenyl. Most preferred example is methyl. R8 and $R^9$ may be a combination of different groups, but preferably they are the same groups. Preferred examples of $R^7$ are methyl, ethyl, propyl, isopropyl, butyl, isobutyl, tert-butyl, pentyl, hexyl, heptyl, octyl, nonyl, decyl, undecyl, tridecyl, tetradecyl, pentadecyl, hexadecyl, heptadecyl, octadecyl, vinyl, propenyl, 5-hexenyl, cyclopentyl, cyclohexyl, cyclooctyl, cyclohexenyl, cyclooctenyl, bicyclo[2.2.1]heptyl, bicyclo[2.2.1]hept-2-en-6-yl, phenyl, phenylmethyl, phenylethyl and methylphenyl. Preferably, $R^{10}$ is alkyl having 1 to 4 carbon atoms. Preferably, z is 0.

Compound (5) is ladder-structured polysilsesquioxane derivative. The compound is obtained by a reaction using Si—H group-containing polysilsesquioxane having a constitutive unit represented by Formula (5-H) shown below. Compound (5-H) are produced with reference to the method described in JP-A 2003-119288. Specifically, compound (5-H) can be produced by reacting a mixture of one mol of $R^7SiCl_3$ and y mols of H—Si($R^8R^9$)—Cl with z mols of $R^{10}$OH, and adding thereto (3+y−z)/2 molar times of water for hydrolytic condensation of the reaction product. In Formula (5-H), z is 0, or 0.05 to 2.0; y is 0.1 to 2.0 when z=0, and is 0.05 to 2.0 when z≠0. (y+z) is 0.1 to 3.0, preferably 0.1 to 2.5, more preferably 0.1 to 2.0. In Formula (5-H), the other symbols have the same meanings as those in Formula (5).

(5-H)

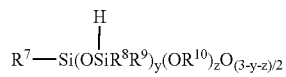

One or more of compound (3) to compound (5) may be used herein either singly or as combined. The amount of compound (3) to compound (5) to be used may be 0.0001 to 0.30 in term of the ratio by weight thereof to the polymerizable liquid-crystal compound in the polymerizable liquid-crystal composition. Even when the ratio of the organosilicon compound is extremely small as herein, the effect of the invention can be recognized. A preferred range of the ratio is 0.005 to 0.20, more preferably 0.01 to 0.20, even more preferably 0.015 to 0.15. And, particularly preferred range is 0.03 to 0.15. Using the organosilicon compound within the defined range makes it possible to form a liquid-crystal film having good adhesiveness to supporting substrates.

The polymerizable liquid-crystal composition of the invention may further contain an optically-active compound. The polymerizable liquid-crystal composition of the type has a chiral nematic phase. The optically-active compound is added for the purpose of inducing a helical structure. The condition for selecting the optically-active compound is that the compound may induce a helical structure and may be suitably mixed with the base, polymerizable liquid-crystal composition. Examples of the optically-active compound are the following (Op-1) to (Op-20):

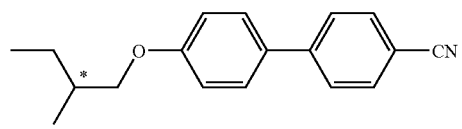

(Op-1)

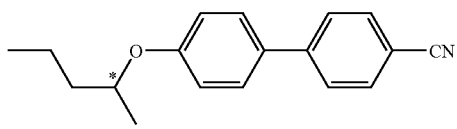

(Op-2)

-continued
(Op-3)
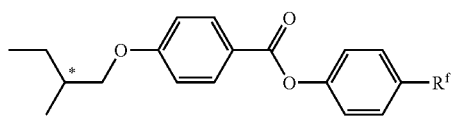
(Op-4)
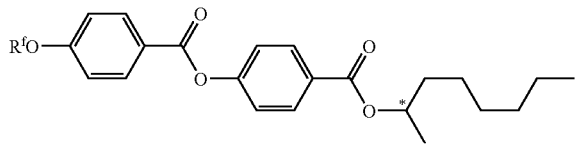
(Op-5)
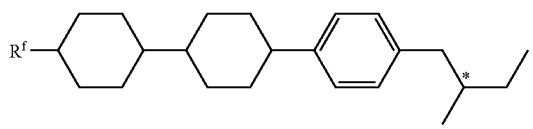
(Op-6)
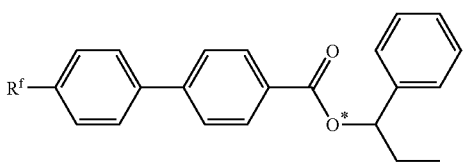
(Op-7)
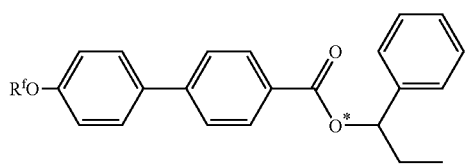
(Op-8)
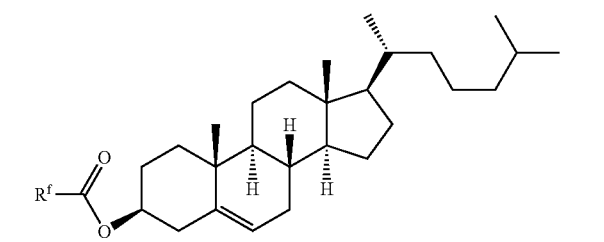
(Op-9)
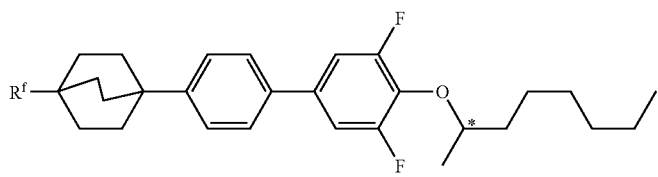
(Op-10)
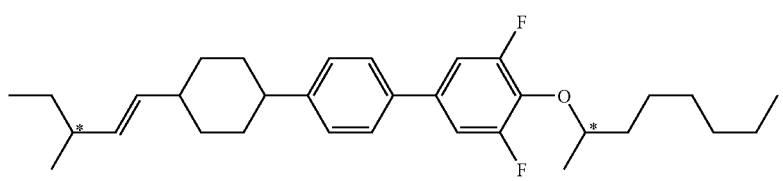
(Op-11)
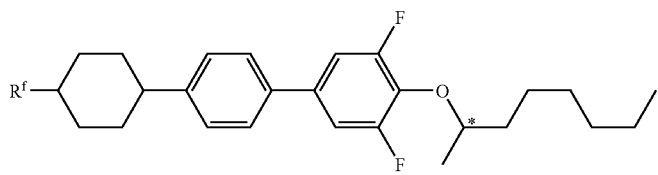
(Op-12)
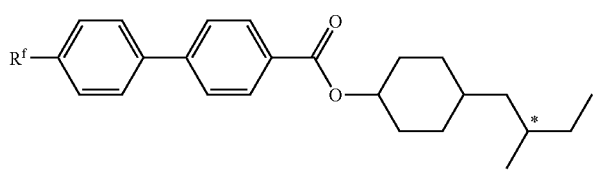
(Op-13)
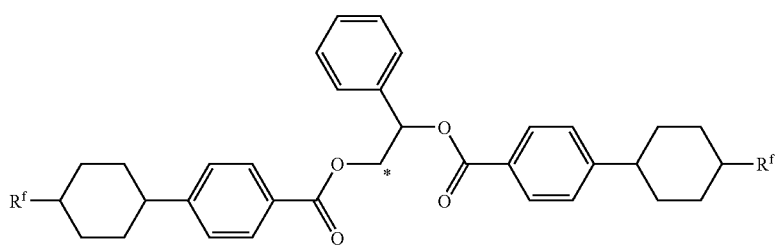

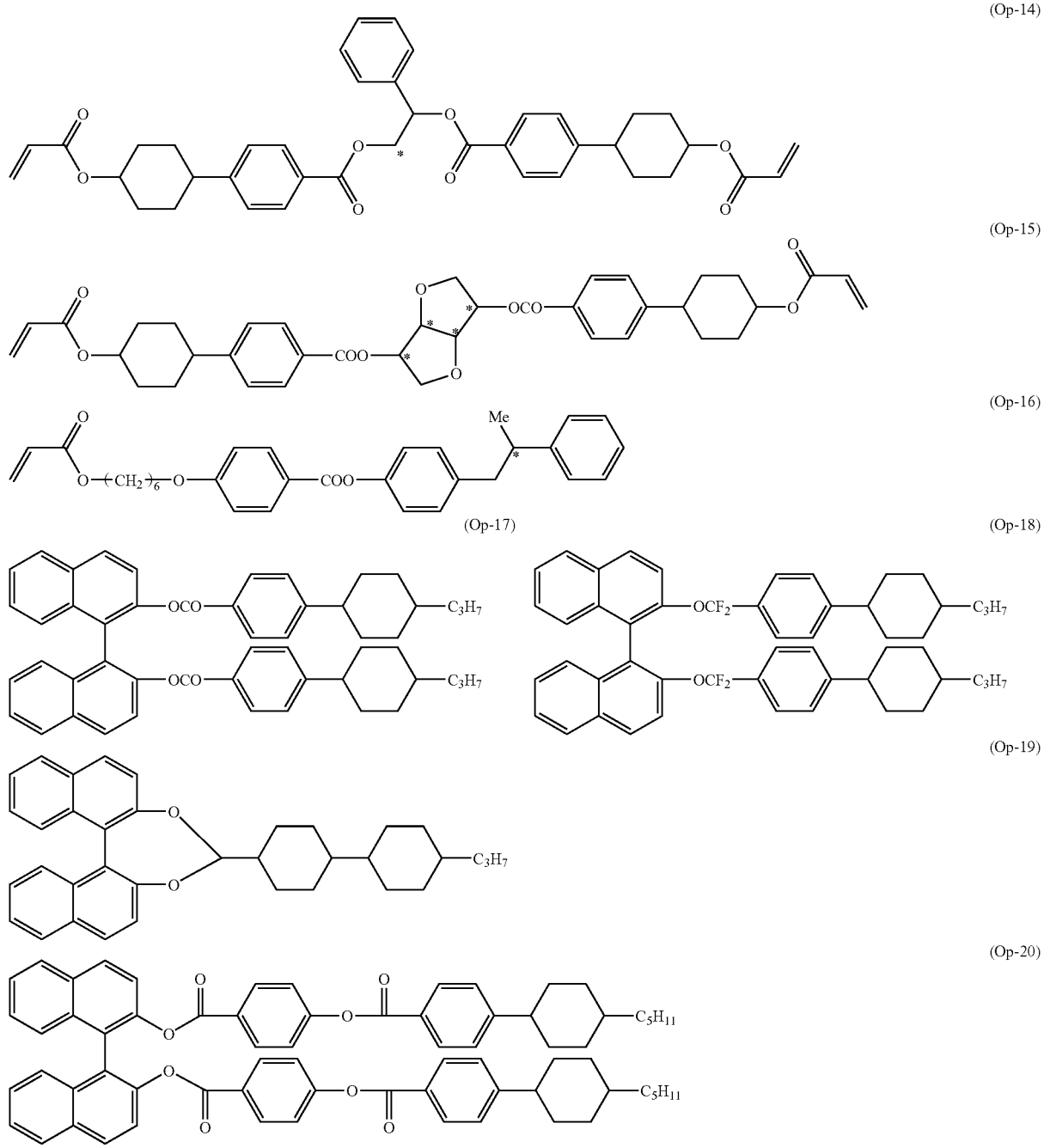

In these formulae, $R^f$ is alkyl having 1 to 10 carbon atoms; Me is methyl; and the carbon with * is a chiral carbon.

The optically-active compound may be any of a polymerizable compound or a non-polymerizable compound. In consideration of the heat resistance and solvent resistance of a liquid-crystal film obtained by polymerising the composition, the compound is preferably a polymerizable compound. In addition, optically-active compounds having a larger helical twisting power are preferred for shortening the helical pitch thereof. Typical examples of the compounds having a large helical twisting power are disclosed in DE 10221751. Especially preferred compounds are the above-mentioned compound (Op-14) to compound (Op-19). Compound (Op-14) to compound (Op-16) are polymerizable compounds; and compound (Op-1) to compound (Op-13), and compound (Op-17) to compound (Op-20) are non-polymerizable compounds. When a polymerizable group is introduced into the terminal —$CH_3H$ of compound (Op-17) to compound (Op-19), then the compounds may be useful, polymerizable optically-active compounds.

The polymerizable liquid-crystal composition of the invention may contain a non-polymerizable liquid-crystal compound. Adding the compound of the type may make the resulting polymers have temperature-dependent optical properties. Examples of such non-polymerizable liquid-crystal compounds are described in liquid-crystal compound data base, "LiqCryst" (trade name, LCI Publisher GmbH (Hamburg, Germany)).

Not detracting from the effect of the invention, the polymerizable liquid-crystal composition may contain any other polymerizable compound than the above-mentioned polymerizable liquid-crystal compound. The additional polymerizable compound may not be liquid-crystalline. A preferred amount of the non-liquid-crystalline polymerizable compound to be used is generally at most 40% by weight in terms of the ratio to the total amount of the composition. More preferably, the range is at most 30% by weight, even more preferably at most 20% by weight. In order that the composition may keep its liquid-crystalline property and in order that the liquid-crystal layer does not undergo layer separation, the ratio is preferably at most 40% by weight. Examples of the non-liquid-crystalline polymerizable compound are polyester (meth)acrylates, polyurethane (meth)acrylates, epoxy resins, etc. The polyester (meth)acrylates are obtained by reacting a polyester prepolymer of a polyalcohol and a monobasic or polybasic acid, with (meth)acrylic acid. The polyurethane (meth)acrylates are obtained by reacting a polyol with a compound having two isocyanate groups and further with (meth) acrylic acid. Examples of the epoxy resins are bisphenol A-type epoxy resins, bisphenol F-type epoxy resins, novolak-type epoxy resins, polyglycidyl polycarboxylates, polyol-polyglycidyl ethers, fatty acid-type epoxy resins, alicyclic epoxy resins, amine-epoxy resins, triphenolmethane-type epoxy resins, dihydroxybenzene-type epoxy resins.

Preferred examples of the non-liquid-crystalline polymerizable compounds are methyl (meth)acrylate, ethyl (meth) acrylate, butyl (meth)acrylate, 2-ethylhexyl (meth)acrylate, phenyl (meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-, m- or p-chloromethylstyrene, α-methylstyrene, ethyl vinyl ether, hydroxybutyl monovinyl ether, t-amyl vinyl ether, cyclohexanedimethanol-methyl vinyl ether, tetrafluoroethylene, and hexafluoropropene.

For further enhancing the film-forming capability of the polymer, a polyfunctional acrylate may be added to the composition. Preferred polyfunctional acrylates are 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloxyethyl phosphate, bisphenol A EO-added diacrylate, bisphenol A glycidyl diacrylate, and polyethylene glycol diacrylate.

For optimizing the polymerization speed of the polymerizable liquid-crystalline composition, a photopolymerization initiator may be added to the composition. A preferred amount of the photopolymerization initiator to be added is 0.01 to 10% by weight in terms of the ratio to the total amount of the composition. More preferably, the ratio is 0.1 to 5% by weight. Examples of the photopolymerization initiator are 2-hydroxy-2-methyl-1-phenylpropan-1-one (Dalocure 1173), 1-hydroxycyclohexyl phenyl ketone (Irgacure 184), 2,2-dimethoxy-1,2-diphenylethan-1-one (Irgacure 651), Irgacure 500, Irgacure 2959, Irgacure 907, Irgacure 369, Irgacure 1300, Irgacure 819, Irgacure 1700, Irgacure 1800, Irgacure 1850, Dalocure 4265, Irgacure 784, p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropan-1-one, benzyldimethyl ketal, 2-methyl-1-[4-(methylthio)phenyl]-2-morpholinopropan-1-one, and mixture of 2,4-diethylxanthone and methyl p-dimethylaminobenzoate. The above-mentioned Dalocure and Irgacure are all commercial products of Ciba Specialty Chemical.

For preventing polymerization initiation during storage thereof, a polymerization inhibitor may be added to the polymerizable liquid-crystal composition. Any known polymerization inhibitor may be used, and preferred examples thereof for use herein are 2,5-di(t-butyl)hydroxytoluene (BHT), hydroquinone, methyl blue, diphenylpicric acid hydrazide (DPPH), benzothiazine, 4-nitrosodimethylaniline (NIDI), o-hydoxybenzophenone, etc.

For improving the storage stability of the polymerizable liquid-crystal composition, an oxygen inhibitor may be added to the composition. The radical generated in the composition may react with oxygen in the atmosphere to give a peroxide radical, and it promotes undesirable reaction with the polymerizable compound. For the purpose of preventing it, an oxygen inhibitor is preferably added to the composition. Examples of the oxygen inhibitor are phosphates.

In the following description, the liquid-crystal film of the invention obtained from the polymerizable liquid-crystal composition may be simply referred to as liquid-crystal film. The liquid-crystal film may be formed as follows: First, the polymerizable liquid-crystal composition is applied onto a supporting substrate to form a coating film thereon. Next, the coating film is exposed to light so as to polymerize the polymerizable liquid-crystal composition, and the nematic alignment of the composition in a liquid-crystal state in the coating film is thereby fixed. Examples of the usable supporting substrates are plastic films of polyimide, polyamidimide, polyamide, polyetherimide, polyether-ether-ketone, polyether-ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose and its partially-saponified product, epoxy resin, phenol resin and norbornene resin. The preferred example of the norbornene resin is a thermoplastic saturated norbornene type resin. The resin has a main skeleton obtained from cycloalkene and contains no carbon-carbon double bond substantially. The examples of the thermoplastic saturated norbornene type resin are ZEONEX and ZEONOR manufactured by ZEON Corporation (Japan), and ARTON manufactured by JSR Corporation (Japan). A protective layer may be formed on the film, so that the film is not corroded by the solvent in the polymerizable liquid-crystal composition. Supporting substrates that may be corroded by the solvent in the polymerizable liquid-crystal composition may also be used in the invention, if such a protective layer is formed thereon. One example of the material usable for the protective layer is polyvinyl alcohol. Further, for enhancing the adhesiveness between the protective layer and the supporting substrate, an anchor-coat layer may be formed. The anchor-coat layer may be formed of any of inorganic or organic materials with no problem, so far as it enhances the adhesiveness between the protective layer and the supporting substrate.

The plastic film may be a monoaxially stretched film or a biaxially stretched film. The plastic film may be subjected to surface treatment, for example, to hydrophilic treatment such as corona treatment or plasma treatment, or to hydrophobic treatment. The plastic film may also be a laminate film. In place of the plastic film, also usable herein are metal substrates of aluminium, iron, copper or the like with slit-like grooves formed on their surface; and glass substrates of alkali glass, borosilicate glass, flint glass or the like that are slit-wise etched on their surface.

For controlling the alignment of the polymerizable liquid-crystal composition, the surface of the supporting substrate may be coated with a polymer. The polymer may be any one having at least one polar group selected from a carboxyl group, a hydroxyl group and an amino group in the molecular chain of the polymer. Preferably, the polymer is a polyimide-type polymer, or a hydrolyzed product of a trialkoxysilane having an amino group. A solution of a polyimide polymer may be referred to as a polyimide-type varnish. A hydrolyzed product of a trialkoxysilane having an amino group may be referred to as a water-soluble silsesquioxane.

When a polyimide-type varnish is applied onto a supporting substrate so as to treat the surface of the support, then the solvent is removed preferably at a temperature falling between 50° C. and 250° C. and a film of the polymer is thereby formed. The polyimide-type polymer film thus formed on the supporting substrate may be subjected to physical or mechanical surface treatment such as rubbing, prior to the film formation thereon from the polymerizable liquid-crystal composition. When a polymerizable liquid-crystal layer and a liquid-crystal film of homeotropic alignment are formed, then the substrate is not subjected to surface treatment such as rubbing in many cases. However, for preventing alignment defects, the substrate may be subjected to rubbing treatment. For the rubbing treatment, any method may be employable. Examples of the rubbing treatment are described. A rubbing cloth of rayon, cotton, polyamide or the like is wound around a meta roll, and the roll is rotated and moved while contacted with the supporting substrate or the polymer film; or the supporting substrate alone is moved not moving the position of the rotating roll.

The polyimide varnish capable of forming a polymer film on supporting substrates is a varnish composition of a polymer component such as polyamic acid, polyamic acid amide, polyamic ester, soluble polyimide or polyamidimide, dissolved in a solvent. The varnish composition is applied onto a supporting support and then dried to form a polymer film thereon. The polymer component to constitute the polymer film may be a copolymer such as random copolymer or block copolymer, and may be a mixture of different types of polymer components.

The polyimide-type polymer preferred for forming the polymer film is a polymer having an amido bond, an imido bond, a carboxyl group resulting from imidation, an amidated group of the carboxyl group, or an esterified group of the carboxyl group. Preferred examples of the polymer of the type are polyamic acid, polyamic acid amide, and polyamic acid ester. However, in the invention, soluble polyimide obtained by dehydration of polyamic acid, and polyamide-imide are also usable in addition to these preferred polymers. Of those, more preferred are polyamic acid and polyamic acid amide; and most preferred is polyamic acid.

Tetracarboxylic acid dianhydrides that are used for obtaining the above-mentioned polyamic acid, polyamic acid amide, polyamic acid ester, soluble polyimide or polyamidimide may belong to any of a group of aromatic compounds (including heterocyclic aromatic compounds) in which a dicarboxylic acid anhydride directly bonds to the aromatic ring; or a group of aliphatic compounds (including heterocyclic aliphatic compounds) in which a dicarboxylic acid anhydride does not directly bond to the aromatic ring.

Specific examples of the aromatic tetracarboxylic acid dianhydrides for use in the invention are listed below.

1
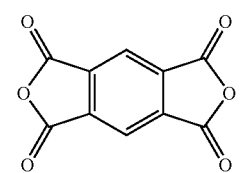

2
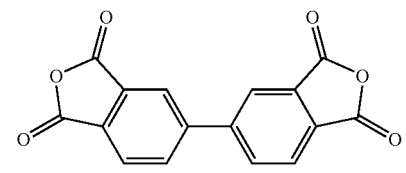

3
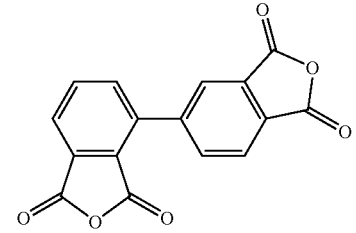

4
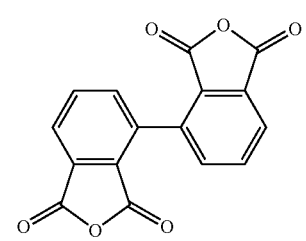

5
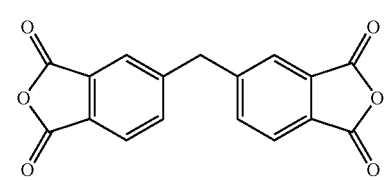

6
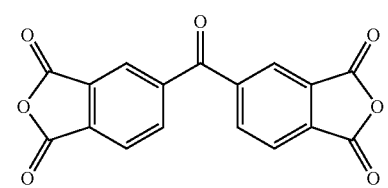

7
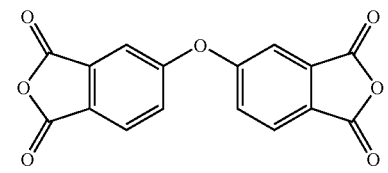

8
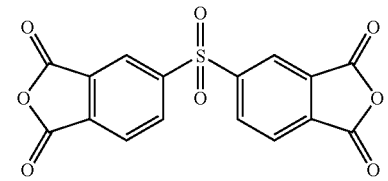

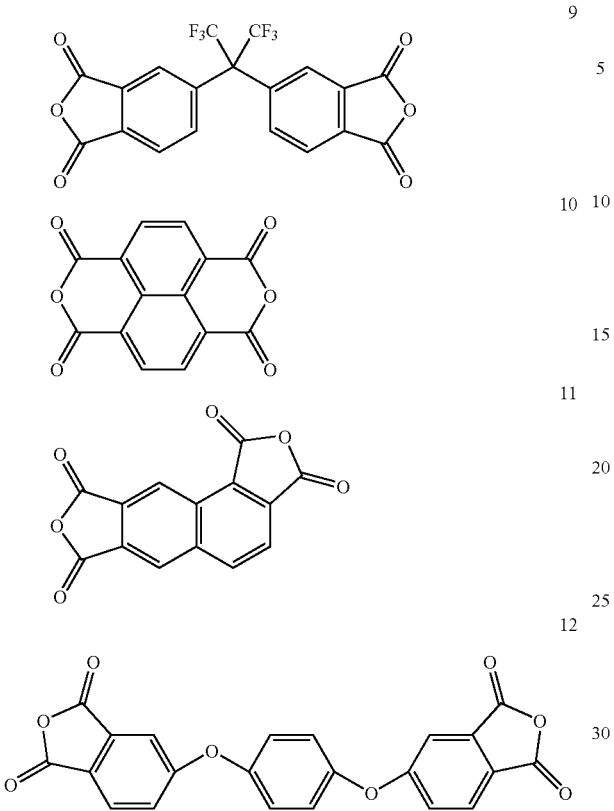
Specific examples of the aliphatic tetracarboxylic acid nhydrides for use in the invention are listed below.
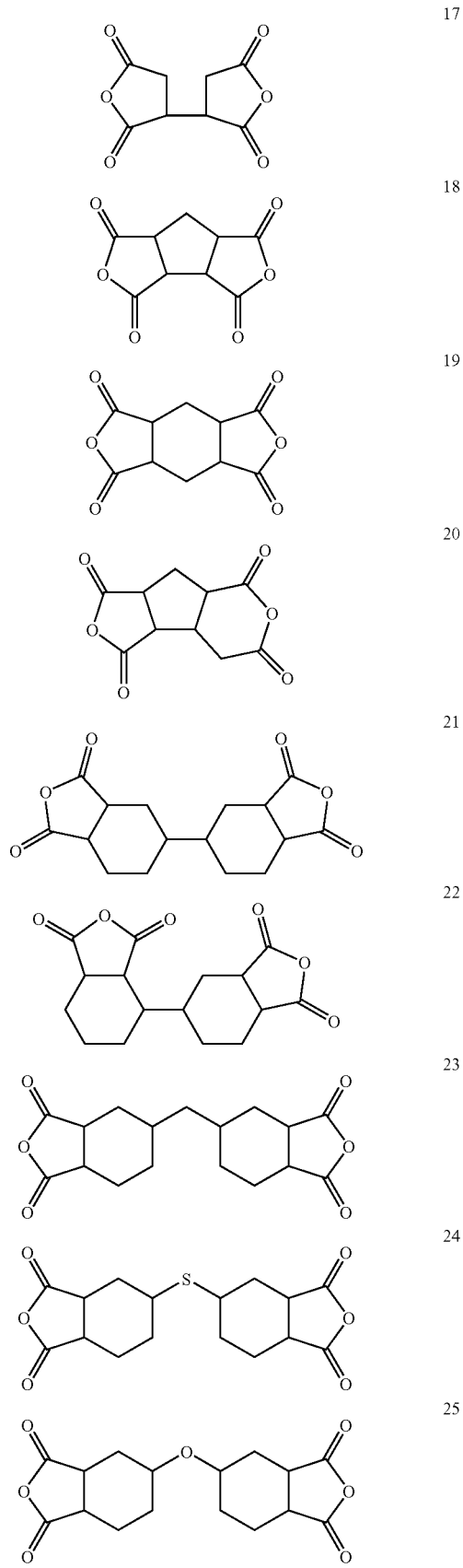

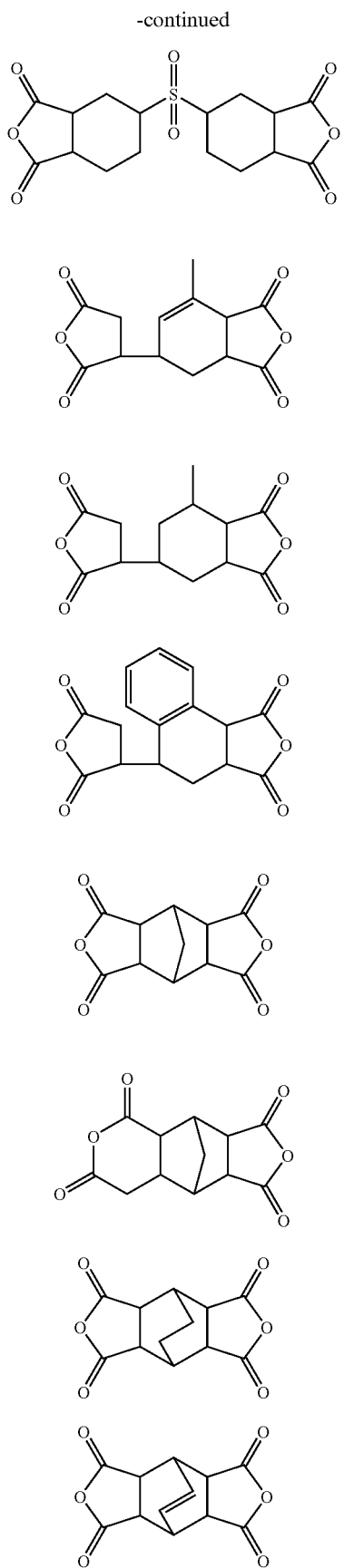

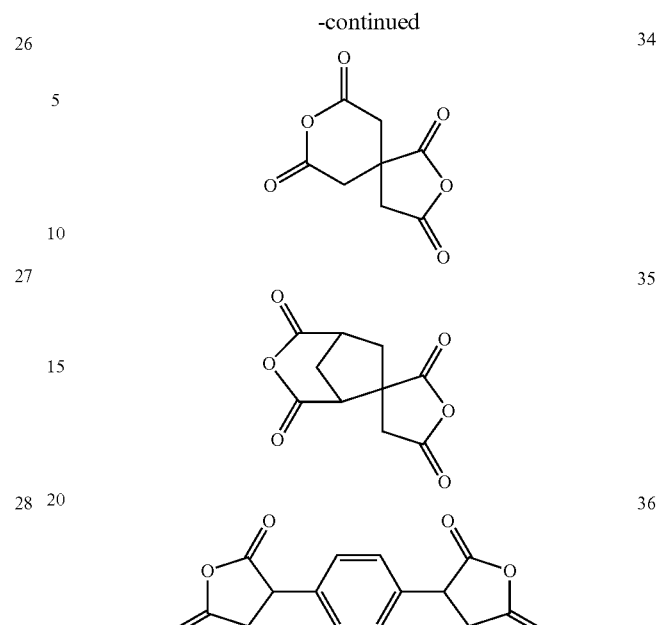

In these, tetracarboxylic acid dianhydrides of formula 1, formula 2, formula 13, formula 17, formula 18, formula 19, formula 20, formula 27, formula 28 and formula 29 are preferred. More preferred examples are tetracarboxylic acid dianhydrides of formula 1, formula 13, formula 17, formula 19, formula 20 and formula 29.

The tetracarboxylic acid dianhydrides usable in the invention are not limited to these. Any others than the above-mentioned tetracarboxylic acid dianhydrides may be selected for use herein, so far as they can attain the object of the invention. One or more of these tetracarboxylic acid dianhydrides may be used herein, either singly or as combined.

Specific examples of the diamines that are combined and reacted with the above-mentioned tetracarboxylic acid dianhydrides are listed below. In the following examples, n is an integer of 1 to 20. R is hydrogen or alkyl having 1 to 20 carbon atoms. In the alkyl, optional —$CH_2$— may be replaced by —O—, —CH=CH— or —C≡C—. Optional hydrogen of the cyclohexane ring and the benzene ring may be replaced by halogen, or alkyl having 1 to 5 carbon atoms.

$$H_2N\text{---}(CH_2)_n\text{---}NH_2 \qquad 1$$

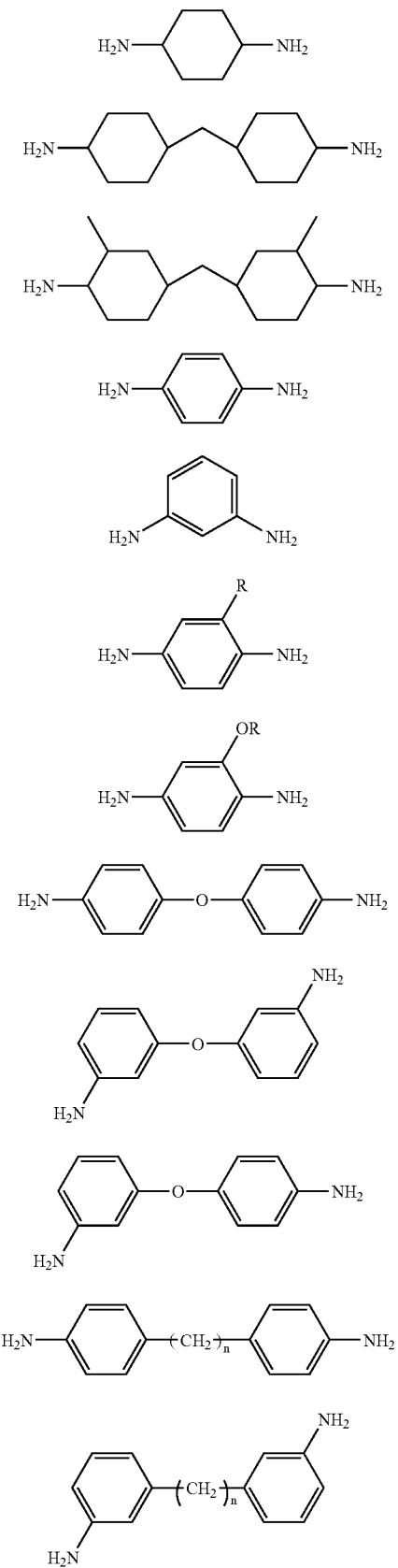
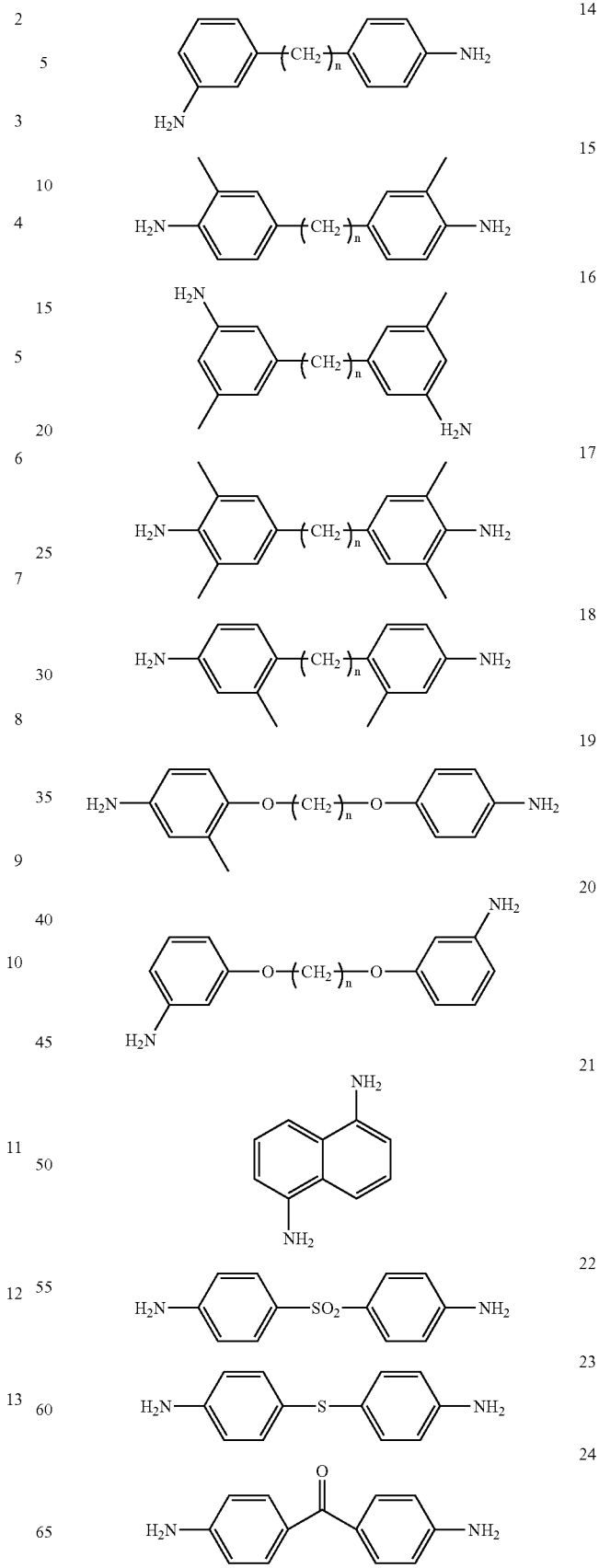

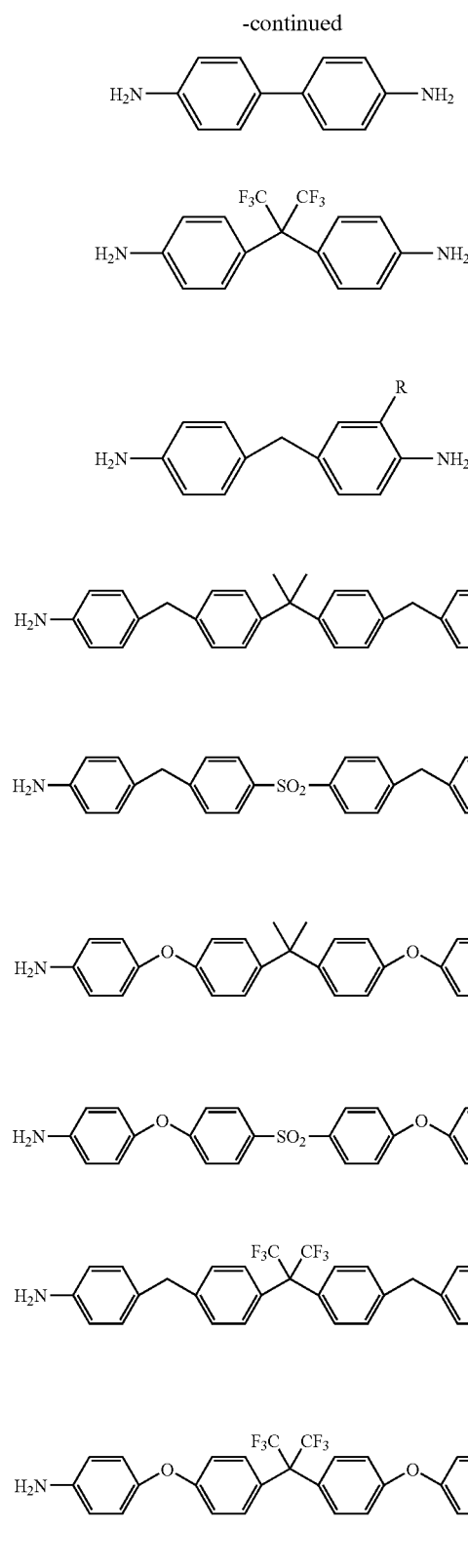
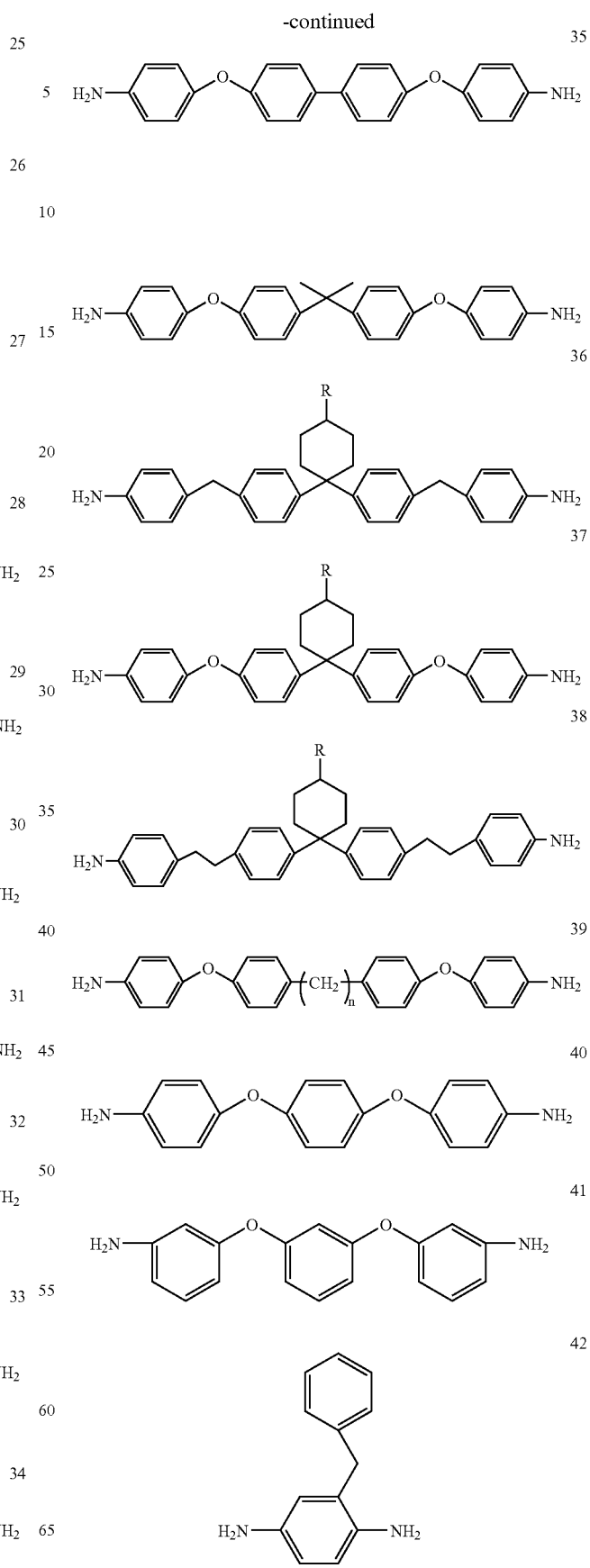

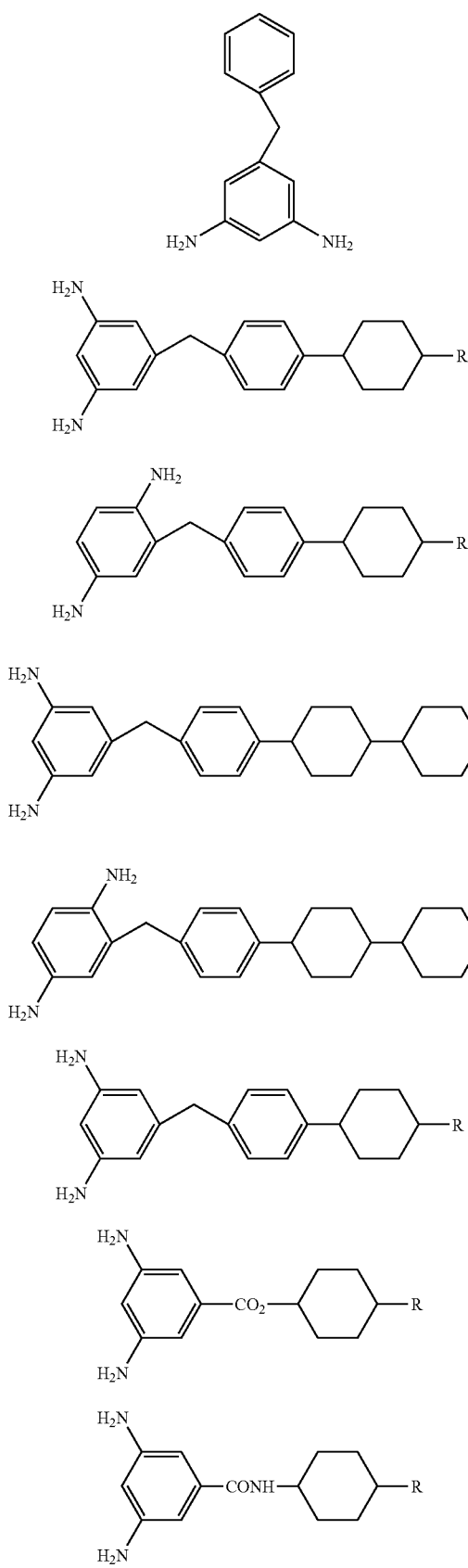
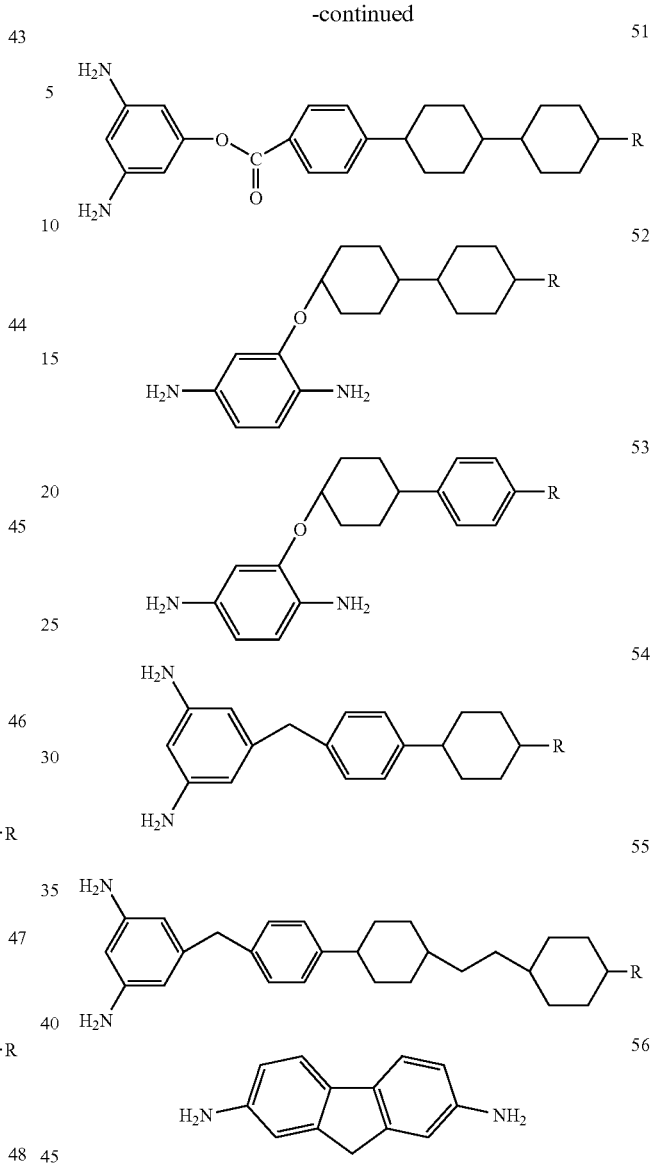

Of these, preferred examples are diamines represented by any of formula 5, formula 6, formula 9, formula 10, formula 11, formula 12, formula 13, formula 14, formula 15, formula 16, formula 17, formula 18, formula 19, formula 20, formula 30, formula 35, formula 39, formula 40, formula 41, formula 42, formula 43 and formula 56. Of the diamines having linear alkylene, more preferred examples are diamines represented by any of formula 12, formula 13, formula 14, formula 15, formula 16, formula 17, formula 18, formula 19 and formula 20. Of the aromatic diamines, more preferred example is the diamine represented by formula 39 in which n is 2 to 10; diamines represented by formula 6 or formula 43 having a meta-amino group on the benzene ring; diamines represented by any of formula 10, formula 13, formula 16 and formula 20 having an amino group at the 3,3'-position of the benzene ring; and diamines represented by formula 11 or formula 14 having an amino group at the 3,4'-position of the benzene ring. Using the diamines makes it easy to attain uniform homeotropic alignment and makes it easy to uniformly apply the polymerizable liquid crystal onto substrates.

Diamines having a steroid moiety at the side chain thereof are also usable herein. Examples of the diamines of the type are cholesteryl, androsteryl, β-cholesteryl, epiandrosteryl, ergosteryl, estryl, 11-α-hydroxymethylsteryl, 11-α-progesteryl, lanosteryl, methyltestosteryl, norethisteryl, pregnenonyl, β-cytosteryl, stigmasteryl, testosteryl, and cholesterol acetate.

Other diamines that may be combined with the above-mentioned diamines for use herein are siloxane-type diamines having a siloxane bond. Preferred examples of the siloxane-type diamines are those represented by Formula (A):

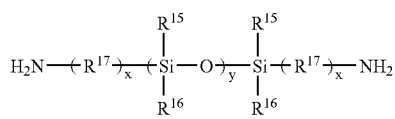

(A)

wherein $R^{15}$ and $R^{16}$ are independently alkyl having 1 to 3 carbon atoms, or phenyl; $R^{17}$ is methylene, phenylene, or alkyl-substituted phenylene; x is an integer of 1 to 6; and y is an integer of 1 to 10. The siloxane-type diamines usable in the invention are not limited to the above-mentioned examples.

Any others than the above-mentioned diamines may be selected for use herein so far as they may attain the object of the invention. One or more such diamines may be used herein either singly or as combined.

Like the above-mentioned tetracarboxylic acid dianhydrides, the diamines for use in the invention may belong to any of a group of aromatic compounds (including heterocyclic aromatic compounds) in which an amino group directly bonds to the aromatic ring; or a group of aliphatic compounds (including heterocyclic aliphatic compounds) in which an amino group does not directly bond to the aromatic ring.

Except these tetracarboxylic acid dianhydrides and diamines, any other monoamine compounds and/or monocarboxylic acid anhydrides may also be used herein which are for forming the reaction terminal of polyamic acid or soluble polyimides. For improving the adhesiveness thereof to supporting substrate of glass or the like, the composition may contain an aminosilicon compound.

Examples of the aminosilicon compound are p-aminophenyltrimethoxysilane, p-aminophenyltriethoxysilane, m-aminophenyltrimethoxysilane, m-aminophenyltriethoxysilane, aminopropyltrimethoxysilane, and aminopropyltriethoxysilane.

The molecular weight of the polyamic acids, the polyamic acid amides, the polyamic acid esters, the soluble polyimides and the polyamidimides usable in the invention is, for example, as the weight-average molecular weight (Mw) thereof in conversion to polystyrene as determined through gel permeation chromatography (GPC), preferably 10,000 to 500,000, more preferably 20,000 to 200,000.

The preferred concentration of the polymer component in the polyimide-type varnish for use in the invention is 0.1 to 40% by weight. When the varnish is applied to a supporting substrate, then an operation may be needed for previously diluting the polymer component with a solvent so as to control the thickness of the film to be formed. When the concentration of the polymer component is at most 40% by weight, then the viscosity of the varnish could be the best, and this is favorable since the varnish could be readily mixed with a solvent when it must be diluted for control of the film thickness. When a spinner method or a printing method is employed, then the concentration is generally controlled to be at most 10% by weight in many cases for good control of the film thickness. In other coating methods, for example, in a dipping method or in an inkjet method, the concentration may be lower. On the other hand, when the concentration of the polymer component is at least 0.1% by weight, the thickness of the polymer film could be readily the best. Accordingly, the concentration of the polymer component is at least 0.1% by weight, preferably 0.5 to 10% by weight in an ordinary spinner method or printing method. However, depending on the coating method with the varnish, the concentration of the polymer component may be further lower.

The solvent to be used along with the polymer component in the polyimide-type varnish for use in the invention may be any one having the ability to dissolve the polymer component. The solvent of the type widely covers those that are generally used in the field of production and use of polymer components such as polyamic acids, polyamic acid amides, polyamic acid esters, soluble polyimides, polyamidimides, and any one can be suitably selected from those in accordance with the object of using it. Examples of the solvent are described below.

Examples of aprotic polar organic solvents are N-methyl-2-pyrrolidone, dimethylimidazolidinone, N-methylcaprolactam, N-methylpropionamide, N,N-dimethylacetamide, dimethylsulfoxide, N,N-dimethylformamide, N,N-diethylformamide, diethylacetamide, and γ-butyrolactone. Examples of other solvents for improvement of coatability are alkyl lactate, 3-methyl-3-methoxybutanol, tetralin, isophorone, ethylene glycol monoalkyl ether, diethylene glycol monoalkyl ether, ethylene glycol monophenyl ether, triethylene glycol monoalkyl ether, propylene glycol monoalkyl ether, dialkyl malonate, dipropylene glycol monoalkyl ether, and organic acid esters of glycol monoether. Of those, especially preferred are N-methyl-2-pyrrolidone, dimethylimidazolidinone, γ-butyrolactone, ethylene glycol monobutyl ether, diethylene glycol monoethyl ether, propylene glycol monobutyl ether, dipropylene glycol monomethyl ether.

The polyimide-type varnish for use in the invention may optionally contain various additives. For example, it may contain a surfactant for improving the coatability thereof, an antistatic agent for improving static charge prevention, and a silane coupling agent or a titanium coupling agent for improving the adhesiveness to supporting substrates.

As coating methods with varnish, generally known are a spinner method, a printing method, a dipping method, a dropping method and an inkjet method. These methods are employable in the invention. As a process of drying and heating for dehydration and ring closure, generally known are a method of heating in an oven or an IR furnace, and a method of heating on a hot plate. These methods are also employable in the invention.

Regarding the dehydration and ring closure reaction (imidation) degree of the polyimide-type varnish, the imidation degree of the polyimide polymer is preferably 45% to 95%, more preferably 50% to 90%, even more preferably 50% to 80% in view of the mechanical strength of the polyimide polymer film formed when the film is subjected to rubbing treatment. When the film has homeotropic alignment and does not require rubbing treatment, the imidation degree of the polymer may be low, and may be 0% to 90%, preferably 0% to 60%, even more preferably 0% to 20%. When the varnish is applied onto plastics of which the heat-resisting temperature is relatively low as compared with that of glass, it is desirable that the drying step after the varnish application is attained at relatively low temperatures at which the solvent is vaporizable.

When a water-soluble silsesquioxane is applied onto supporting substrates for surface treatment thereof, a water-soluble silsesquioxane having an amino group is first applied onto a supporting substrate, and then dried at a temperature falling between 50° C. and 150° C. to form a polymer film thereon. When the resulting film is further subjected to rubbing treatment, then the drying temperature preferably falls between 80° C. and 150° C. in view of the mechanical strength of the film.

Water-soluble silsesquioxanes may be produced from following trialkoxysilanes having an amino group, according to the method described in International Laid-Open Pamphlet 02/26749. Briefly, one mol of an aminoalkyl (or alkoxy)-silane is reacted with 1.5 to 10 mols of water, and the volatile organic component that is formed as a by-product in the reaction is removed through evaporation to at most 4% by weight to obtain a water-soluble silsesquioxane. Preferred examples of aminoalkyltrialkoxysilane are 3-aminopropyltriethoxysilane, 3-aminopropyltrimethoxysilane, 2-aminoethyltriethoxysilane, 2-aminoethyltrimethoxysilane, 4-aminobutyltriethoxysilane, (aminoethylaminomethyl)phenethyltrimethoxysilane, N-(2-aminoethyl)-3-aminopropyltrimethoxysilane, N-(6-aminohexyl)aminopropyltrimethoxysilane, 3-aminopropyltris(methoxyethoxy)ethoxysilane, and 3-aminopropyltris(trimethylsiloxy)silane.

As a hydrolyzate of 3-aminopropyltriethoxysilane, Chisso's commercial product SF330 may also be used herein, and partial hydrolyzates of the compound, MS3301, MS3302, MS3201 and MS3202 may also be used. These are all Chisso's commercial products. As other similar compounds of aqueous silsesquioxane oligomer solutions, Chisso's commercial products, WSA-7011, WSA-9911 and WSA-7021 may also be used. From the viewpoint of the film formability thereof, a tetraalkoxysilane may be blended with them.

The polymerizable liquid-crystal composition of the invention may contain a surfactant for improvement of coatability and for controlling the alignment of liquid-crystal molecules, not detracting from the effect of the invention. Examples of the surfactant are imidazoline, quaternary ammonium salts, alkylamine oxides, polyamine derivatives, polyoxyethylene-polyoxypropylene condensates, polyethylene glycol and its esters, sodium laurylsulfate, ammonium laurylsulfate, laurylsulfate amines, alkyl-substituted aromatic sulfonic acid salts, alkylphosphate salts, aliphatic or aromatic sulfonic acid/formalin condensates, laurylamidopropylbetaine, laurylaminoacetylbetaine, polyethylene glycol fatty acid esters, polyoxyethylene alkylamines, perfluoroalkylsulfonic acid salts, perfluoroalkylcarboxylic acid salts, perfluoroalkyl ethyleneoxide adducts, perfluoroalkyltrimethylammonium salts, oligomers having a perfluoroalkyl and a hydrophilic group, oligomers having a perfluoroalkyl and an oleophilic group, and perfluoroalkyl-having urethanes. The amount of the surfactant to be in the composition falls between $2 \times 10^{-5}$ and 0.05, preferably between $1 \times 10^{-4}$ and 0.01 in terms of the ratio by weight thereof to the polymerizable liquid-crystal compound in the composition.

Before forming a coating film thereon, the supporting substrates may be subjected to mechanical surface treatment such as rubbing. When a polymerizable liquid-crystal layer of homeotropic alignment is formed and when the polymerizable liquid-crystal layer is polymerized to form a liquid-crystal film of homeotropic alignment, it does not require the surface treatment such as ordinary rubbing. In such cases, however, rubbing treatment may be effected for the purpose of preventing alignment defects. When a polymerizable liquid-crystal layer of homogeneous alignment, tilted alignment or twisted alignment is formed and when the polymerizable liquid-crystal layer is polymerized to form a liquid-crystal film with the respective alignment fixed therein, it generally requires rubbing treatment. The rubbing treatment may be applied directly to supporting substrates, or a polymer coating film may be previously formed on supporting substrates and it may be subjected to rubbing treatment. Examples of the polymer coating film are films of polyimide, polyamide, polyvinyl alcohol, etc. The rubbing treatment method may be the same as that mentioned hereinabove. Depending on the type of the supporting substrates, silicon oxide may be deposited thereon in a mode of inclined vapor deposition to thereby make the resulting substrates have an ability of alignment.

In forming the liquid-crystal film, the polymerizable liquid-crystal composition may be used directly as it is, but a solvent may be added to the composition and then the resulting composition may be applied to substrates or may be shaped and thereafter the solvent may be removed to produce thin films. Preferred examples of the solvent are benzene, toluene, heptane, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclohexanone, cyclopentanone, ethyl acetate, butyl acetate, methyl lactate, ethyl lactate, propyl lactate, butyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylsulfoxide, N,N-dimethylacetamide, N,N-dimethylacetamidodimethyl acetal, dimethylformamide, chloroform, dichloromethane, carbon tetrachloride, dichloroethane, tetrachloroethylene, trichloroethylene, tetrachloroethylene, chlorobenzene, THF, chloroform, 1,4-dioxane, bis(methoxyethyl) ether, γ-butyrolactone, tetramethylurea, trifluoroacetic acid, ethyl trifluoroacetate, hexafluoro-2-propanol, t-butyl alcohol, diacetone alcohol, ethanol, 2-propanol (isopropyl alcohol), glycerin, monoacetin, ethylene glycol, triethylene glycol, hexylene glycol, ethylene glycol monomethyl ether, ethyl cellosolve, butyl cellosolve, and PGMEA. One or more of these may be used either singly or as combined solvents.

Examples of the coating method for forming uniform films are a microgravure coating method, a gravure coating method, a wire bar coating method, a dipping method, a spraying method, a meniscus coating method, and a die coating method. In particular, a wire bar coating method in which shearing stress is imparted to the liquid-crystal composition while the composition is applied onto substrate may be employed, when the alignment of the liquid-crystal composition is controlled with no surface treatment such as rubbing of substrates.

The organosilicon compound may be diluted with a solvent in order that it may be uniformly dispersed in the polymerizable liquid-crystal composition. The solvent may be any one having the ability to dissolve the organosilicon compound, and may be suitably determined depending on the object. Preferred examples of the solvent are ethers (e.g., THF), ketones (e.g., acetone, methyl ethyl ketone), alcohols (e.g., ethyl alcohol, isopropyl alcohol, n-propyl alcohol, methoxymethyl alcohol), acetates (e.g., ethyl acetate, methyl acetate), chloroform, and acetonitrile.

When the solvent is used, it is removed after the application of the composition to supporting substrates to thereby form thereon a uniform polymerizable liquid crystal layer, that is, a uniform layer of the polymerizable liquid-crystal composition. The condition for solvent removal is not specifically defined. The coated substrates may be dried until the solvent is almost removed and until the coating layer of the polymerizable liquid-crystal composition loses its flowability. The solvent may be removed through air drying at room temperature, drying on a hot plate, drying in a drying furnace, or blowing with warm air or hot air. Depending on the type and the blend ratio of the compounds to be in the polymerizable liquid-crystal composition, the nematic alignment of the polymerizable liquid-crystal composition in the coating may be completed during the step of drying the coating film. Accordingly, after dried, the coating film may be directly subjected to the next polymerizing step, not via the heat-treatment step that will be mentioned hereinunder. However, in order that the alignment of the liquid-crystal molecules in the coating film is more uniformised, it is desirable that the coating film is, after dried, subjected to heat treatment and then to photopolymerization treatment.

The temperature and the time for heat treatment of the coating film, the wavelength of the light to be used for light irradiation, and the quantity of the light to be radiated by the light source used vary in point of their preferred ranges, depending on the type and the blend ratio of the compounds in the polymerizable liquid-crystal composition, the presence or absence of a photopolymerization initiator in the composition, and the amount of the initiator added to the composition. Accordingly, in the following description, the ranges of the temperature and the time for heat treatment of the coating film, the wavelength of the light to be used for light irradiation, and the quantity of the light to be radiated by the light source used are all rough ones.

The heat treatment of the coating film is effected at a temperature not lower than the liquid-crystal phase transition point of the polymerizable liquid-crystal composition. One example of the method of heat treatment comprises heating the coating film up to a temperature at which the polymerizable liquid-crystal composition shows a nematic liquid-crystal phase so as to form nematic alignment of the polymerizable liquid-crystal composition in the coating film. The nematic alignment may also be formed by changing the temperature of the coating film within a temperature range within which the polymerizable liquid-crystal composition shows a nematic liquid-crystal phase. The method comprises heating the coating film up to a high temperature falling within the above-mentioned temperature range to thereby almost complete nematic alignment in the coating film and then cooling it to thereby further regulate the alignment. In any case of the above-mentioned heat treatment methods, the temperature for the heat treatment may fall between room temperature and 120° C. Preferably, the temperature falls between room temperature and 80° C., more preferably between room temperature and 70° C. The heat treatment time may fall between 5 seconds and 2 hours. Preferably, the time falls between 10 seconds and 40 minutes, more preferably between 20 seconds and 20 minutes. For heating the layer of the polymerizable liquid-crystal composition up to a predetermined temperature, the heat treatment time is preferably at least 5 seconds. In order not to lower the productivity, the heat treatment time is preferably at most 2 hours. In that manner, the polymerizable liquid-crystal layer of the invention is obtained.

The nematic alignment state of the polymerizable liquid-crystal composition formed in the polymerizable liquid-crystal layer may be fixed by polymerizing the polymerizable liquid-crystal composition through exposure to light. The wavelength of the light to be used for the light irradiation is not specifically defined. Electron beams, UV rays, visible rays, IR rays (heat rays) and the like may be used. In general, UV rays or visible rays are used. The range of the wavelength of the light may fall between 150 nm and 500 nm, preferably between 250 nm and 450 nm, more preferably between 300 nm and 400 nm. Examples of the light source are low-pressure mercury lamp (sterilization lamp, fluorescent chemical lamp, black light), high-pressure discharge lamp (high-pressure mercury lamp, metal halide lamp), short arc discharge lamp (ultra-high-pressure mercury lamp, xenon lamp, mercury xenon lamp). Preferred examples of the light source are metal halide lamp, xenon lamp, and high-pressure mercury lamp. A filter through which a specific wavelength light may pass may be disposed between the light source and the polymerizable liquid-crystal layer so as to select the wavelength region of the light source to be applied to the layer. The quantity of light to be radiated by the light source may fall between 2 and 5000 mJ/cm$^2$, preferably between 10 and 3000 mJ/cm$^2$, more preferably between 100 and 200 mJ/cm$^2$. Preferably, the temperature in the light irradiation is the same as that in the heat treatment mentioned above.

When the polymerizable liquid-crystal layer of the invention, and the liquid-crystal film formed by polymerizing the layer through exposure to heat or light are used in various optical devices, or when they are used as optical compensation devices in liquid-crystal display devices, then the tilt angle distribution control in the thickness direction of the film is a matter of great importance.

One method of tilt angle control comprises controlling the type of the liquid-crystal compound in the polymerizable liquid-crystal composition and the blend ratio of the compounds in the composition. Any other component may be added to the polymerizable liquid-crystal composition for tilt angle control. The tilt angle of the liquid-crystal film may be controlled by controlling the type of the solvent to be added to the polymerizable liquid-crystal composition, the solute concentration in the polymerizable liquid-crystal composition, and the type and the amount of an additional component, surfactant in the composition. Further, the tilt angle of the liquid-crystal film may also be controlled by controlling the type of the supporting substrate or the polymer coating film, the rubbing condition for them, and the drying and heat treatment condition for the coating film of the polymerizable liquid-crystal composition. In addition, the light irradiation atmosphere and the light irradiation temperature in the photopolymerization step after the alignment treatment may have some influences on the tilt angle of the liquid-crystal film. Specifically, it may be considered that almost all the conditions in the process of producing the liquid-crystal film may have influences on the tilt angle of the film to some extent. Accordingly, the liquid-crystal film may have any desired tilt angle when the polymerizable liquid-crystal composition is optimized and when the conditions in the process of producing the liquid-crystal film are suitably selected.

Homeotropic alignment means that the tilt angle uniformly distributes between 85° and 90° from the substrate interface to the free interface. This alignment state can be attained when the polymerizable liquid-crystal composition of the invention that contains an organosilicon compound having a primary amino group added thereto is applied onto the surface of a supporting substrate with an alignment control film formed thereon. In the invention, when the surface of the supporting substrate has polarity, then the polymerizable liquid-crystal composition of the invention may be directly applied to it, not forming an alignment control film thereon, and the film formed on the surface may readily have homeotropic alignment. In particular, when an organosilicon compound having a primary amino group is added to the polymerizable liquid-crystal composition to stably obtain homeotropic alignment, it is desirable that the amount of the organosilicon compound to be added is 3 to 10% by weight or so. The organosilicon compound having a primary amino group may be any of alkoxysilanes, linear (poly)siloxanes or ladder-structured silsesquioxanes. For making uniform alignment and good coatability, especially preferred are alkoxysilanes and linear (poly)siloxanes, and more preferred are alkoxysilanes.

Preferred examples of alkoxysilanes are compound (3-1) to compound (3-7) and compound (3-11) to compound (3-16). Preferred examples of linear (poly)siloxanes are compound. (4-1-1) to compound (4-1-14) and compound (4-2-1). Preferred examples of ladder-structured silsesquioxane are compounds represented by Formula (5) in which $R^{11}$ is $-CH_2-$, $R^8$ and $R^9$ are methyl, $R^7$ is methyl, ethyl, propyl, isopropyl, butyl, isobutyl, tert-butyl, pentyl, hexyl, heptyl, octyl, nonyl, decyl, undecyl, tridecyl, tetradecyl, pentadecyl, hexadecyl, heptadecyl, octadecyl, vinyl, propenyl, 5-hexenyl, cyclopentyl, cyclohexyl, cyclooctyl, cyclohexenyl, cyclooctenyl, bicyclo[2.2.1]heptyl, bicyclo[2.2.1]hept-2-en-6-yl, phenyl, phenylmethyl, phenylethyl or methylphenyl, and z is 0.

For satisfying both the uniformity of homeotropic alignment and the adhesiveness to supporting substrates, one or more different types of organosilicon compounds may be used herein either singly or as combined. The organosilicon compound may be added to the polymerizable liquid-crystal composition, either directly thereto or after diluted with a solvent or the like. Depending on the type of the polymerizable liquid-crystal compound and on the blend ratio of the components of the polymerizable liquid-crystal composition, stable homeotropic alignment may be difficult to obtain in some cases even though the above-mentioned methods are employed. In such cases, it may be considered that the composition has a strong tendency to homogeneous alignment or to tilted alignment. Accordingly, in these cases, stable homeotropic alignment may be obtained through optimization of increasing the amount of the organosilicon compound to be added or reducing the polymerizable compound to the necessary but minimum amount thereof. The homeotropic alignment of the type may be obtained even when the surface of the supporting substrate is not processed by rubbing or the like treatment. When alignment defects occur in the coating film formed without rubbing treatment, the supporting substrates may be subjected to rubbing treatment before the coating operation and uniform homeotropic alignment may be obtained.

On the other hand, when a vertical alignment agent is formed on supporting substrates, any of silane coupling agent such as octadecyltriethoxysilane, lecithin, chromium complex, or polyimide-type alignment film for vertical alignment may be utilized. Further, the tilt angle may be controlled in an electric field or a magnetic field. For obtaining homeotropic alignment with no alignment defect, the surface of supporting substrates may be aligned through mechanical treatment such as rubbing.

Tilted alignment may be obtained when the surface of substrates is aligned through mechanical treatment such as rubbing, and then coated with the polymerizable liquid-crystal composition of the invention in which the amount of the organosilicon compound is reduced. In this alignment state, the tilt angle increases from one interface to the other interface, and at the other interface, this is 45° to 90°. For obtaining stable tilt alignment, it is desirable that the amount of the organosilicon compound falls between 0.01 and 0.03 or so in terms of the ratio by weight thereto to the polymerizable liquid-crystal compound in the composition. On the other hand, for example, when a branched polyimide-type or polyamic acid-type alignment film-forming agent is used and the composition is applied to the substrates processed in the same manner as above, then the same tilt alignment may be obtained.

Homogeneous alignment is obtained when the surface of substrates is oriented through mechanical treatment such as rubbing, and then coated with the polymerizable liquid-crystal composition of the invention in which the amount of the organosilicon compound is further more reduced. For obtaining stable homogeneous alignment, it is desirable that the amount of the organosilicon compound falls between 0.001 and 0.03 or so in terms of the ratio by weight thereto to the polymerizable liquid-crystal compound in the polymerizable liquid-crystal composition. On the other hand, for example, when a non-branched polyimide-type or polyamic acid-type alignment agent is used and the composition is applied to the substrates processed for alignment in the same manner as above, then the same homogeneous alignment may be obtained.

The heat resistance of the liquid-crystal films of each alignment state as above may be improved by suitably selecting the structure of the polymerizable liquid-crystal compound to constitute the film. In the invention, it is recognized that the heat resistance of the films is improved especially when the typical bonding group, ester group in the mesogen moiety of bifunctional polymerizable liquid-crystal compound is modified to an alkyl ester group, an alkyl ether group, a fluoroalkyl ether group, an alkyl group or the like. For this, preferred are MA-66 to MA-70, MA-88, MA-113, MA-122, MA-128, MA-132, MA-145, MA-147, MA-152, MA-154, MA-155, MA-202, MA-203, MA-216 to MA-237, VE-19 to VE-20, and VE-24.

The suitable thickness of the liquid-crystal film varies depending on the retardation for the intended devices and on the birefringence of the liquid-crystal film. Accordingly, the range could not be strictly defined. Preferably, however, the thickness of the liquid crystal film may fall between 0.05 and 50 µm, more preferably between 0.1 and 20 µm, further preferably between 0.5-10 µm. Also preferably, the haze value of the liquid-crystal film is at most 1.5%, and the transmittance thereof is at least 80%. More preferably, the haze value is at most 1.0%, and the transmittance is at least 95%. It is desirable that the condition of the transmittance is satisfied within the visible light range.

The liquid-crystal film is effective for optical compensation devices that are applied to liquid-crystal display devices (especially active matrix-type and passive matrix-type liquid-crystal display devices). Examples of the liquid-crystal display devices suitable for use of the liquid-crystal film as an optical compensation film therein are TN (twisted nematic)-type, STN (super-twisted namatic)-type, ECB (electrically-controlled birefringence)-type, OCB (optically-compensated birefringence)-type, DAP (deformation of aligned phase)-type, CSH (color super-homeotropic)-type, VAN/VAC (vertically-aligned nematic/cholesteric)-type, OMI (optical mode interference)-type, and SBE (super-birefringence effect)-type devices. Further, the liquid-crystal film may also be used as a phase retarder for display devices such as guest-host-type, IPS (in-plane-switching)-type, ferroelectric type, and antiferroelectric type. The optimum values of the necessary parameters of the liquid-crystal film such as the distribution of the tilt angle in the thickness direction thereof and the thickness of the film significantly depend on the type and the optical parameters of the liquid-crystal display devices that are to be compensated by the film, and therefore vary depending on the type of the devices.

Optionally integrated with a polarizer, the liquid-crystal film may be used as an optical device. In this case, the film is disposed outside a liquid-crystal cell. However, when the liquid-crystal film serves as an optical compensation device, then the liquid crystal filled in a cell is not contaminated with impurities or is contaminated with few impurities. Therefore, it may be disposed inside a liquid crystal cell. When photolithography is applied to the polymerizable liquid-crystal composition, then optical compensation layers of liquid-crystal films having different optical parameters may be disposed for each pixel of a liquid-crystal display device having different wavelength range of colors of blue, green and red or in predetermined regions partitioned by dividing one pixel in predetermined regions. For example, according to the method described in JP-A 2001-222009, one pixel may be divided into a reflection display part and a transmission display part having a 1/4λ plate of the liquid-crystal film disposed therein, and a semi-transmission reflection-type liquid-crystal display device having an improved light utilization efficiency can be thereby constructed. To that effect, the display performance of the liquid-crystal display device can be further improved.

A mixture prepared by adding a non-polymerizable low-molecular liquid crystal to the polymerizable liquid-crystal composition can be formed into a polymer dispersion-type liquid-crystal display device or a holographic polymer dispersion-type liquid-crystal display device. A mixture prepared by adding a ferroelectric liquid crystal or an antiferroelectric liquid crystal to the photopolymerizable composition can be formed into a polymer-stabilized ferroelectric liquid-crystal display device or a polymer-stabilized antiferroelectric liquid-crystal device. Concrete methods of constructing these devices are described in the following references:

JP-A 6-340587,
IDW '98, p. 105, 1998,
J. of Photopoly. Sci. Technol., 295-300, 13(2), (2000).

The polymerizable liquid-crystal composition containing an optically-active compound is so aligned that the director of liquid-crystal molecules thereof is regularly helically twisted. Depending on the length of the helical pitch, the function of the composition varies. When the length of the helical pitch is a few μm or so, then the composition may have a function as a rotator, and may be applied to TN (twisted nematic)-type or STN (super-twisted nematic)-type optical compensation devices.

When the length of the helical pitch is within around the visible light range and, for example, when the twisting direction of the helical structure is in a right-handed direction, then the liquid-crystal film selectively reflects only the right-handed circularly-polarized light having a wavelength λ falling within a range of no×P<λ<ne×P (where no represents the refractive index to ordinary light of the liquid-crystal layer, ne represents the refractive index to extraordinary light of the liquid-crystal layer, and P represents the length of the helical pitch), but transmits all any others including the right-handed circularly-polarized light having a wavelength not falling within the above-mentioned range and all left-handed circularly-polarized light. Specifically, the liquid-crystal film can selectively separate right-handed circularly-polarized light having a specific wavelength range and all left-handed circularly-polarized light. Further, since the reflection wavelength range depends on the effective helical pitch that interacts with the incident light, the coloration with reflected light and transmitted light varies depending on the viewing angle.

When the coloration with reflected light and transmitted light is utilized, then the liquid-crystal film can be applied to the field of decoration such as decorative structures. In addition, it can also be applied to color filters to be used in liquid-crystal display devices. Further, in consideration of the fact that the reflected light and the transmitted light have a peculiar metallic gloss, that the color tone varies depending on the viewing angle and that such optical properties could not be duplicated by the use of ordinary duplicators, the liquid-crystal film can be applied to the field of forgery prevention.

Based on the circularly-polarized light separation function thereof, the liquid-crystal film can be used for improving the light utilization efficiency in liquid-crystal display devices. For example, the liquid-crystal film having a helical structure and capable of expressing a circularly-polarized light separation function is sandwiched between a backlight and a polarizer, and a 1/4λ plate is inserted between the liquid-crystal film and the polarizer. In the display device of the type, the non-polarized light emitted from the backlight is efficiently converted into linearly-polarized light within the entire wavelength range of visible light, and the light absorption by the polarizer may be reduced, and therefore the brightness of the liquid-crystal display device is thereby increased as the light utilization efficiency thereof is improved.

The liquid-crystal film of which the director of liquid-crystal has a helical structure and which therefore expresses a circularly-polarized light separation function may be disposed inside a liquid crystal cell. One example of an application of the method described in a reference, Asia Display/IDW '01, p. 129, 2001 is shown below. A liquid crystal cell capable of shifting the incident light thereinto to a degree of 1/2λ in accordance with the voltage applied thereto is first prepared. A liquid-crystal film is disposed on the inner face of one side of the cell. Next, the liquid-crystal cell is sandwiched between two circularly-polarizing plates that are contradictory to each other in their direction, and a backlight is disposed on the side of the liquid-crystal film. Accordingly, this liquid-crystal display device comprises the first circularly-polarizing plate, the liquid-crystal cell, the liquid-crystal film (this is inside the liquid-crystal cell), the second circularly-polarizing plate and the backlight laminated in that order. In this, when the helical direction of the liquid-crystal moiety of the liquid-crystal film and the number of the liquid-crystal film layers are so designed that a half of the circularly-polarized light in the same direction as that of the circularly-polarizing plate on the side of the backlight could reflect but the other half thereof could transmit, then it realizes a semi-transmission reflection liquid-crystal display devices of high transmittance and high reflectance.

In the above-mentioned application, expression of a circularly-polarized light separation function may be desired in the entire region of visible light (in the region having a wavelength of 350 nm to 750 nm). To realize it, the polymerizable liquid-crystal composition or the liquid-crystal film formed by polymerizable it may be so designed that the helical pitch could continuously vary in the direction of the film thickness. One method for solving it comprises continuously varying the concentration distribution of the optically-active compound in the direction of the film thickness. Concretely, an optically-active compound that differs from the polymerizable liquid-crystal composition in point of the reactivity thereof with UV rays is added to the composition, and the mixture is exposed to UV light and polymerized. Through this, the concentration distribution of the optically-active compound occurs in the direction of the film thickness, and the helical pitch can be thereby varied. Another method comprises controlling the concentration distribution of the optically-active compound by varying the intensity of the UV light to which the mixture is exposed or by adding UV-absorbing dye to the mixture. Further, when liquid-crystal films formed through polymerization of photopolymerizable compositions that differ in the helical pitch are laminated, then the helical pitch of the resulting laminate may be continuously varied. The circularly-polarized light separation function may be applied not only to a visible light range but also to a UV range (100 nm to 350 nm) or a near-IR range (750 nm to 1500 nm). The invention is applicable also to UV or near-IR reflection filters having the circularly-polarized light separation function.

When the length of the helical pitch is sufficiently shorter than visible light, for example, when it is at most 250 nm or so, then the refractive index in the visible light range relative to the plane vertical to the helical axis may be represented by $((ne^2+no^2)/2)^{0.5}$, and the refractive index in the visible light range in the direction of the helical axis is equal to no, and the optical film having the optical properties is referred to as a negative C-plate. The film can be an optical compensation film suitable to display devices such as VAN-type, VAC-type and OCB-type devices.

The amount of the optically-active compound to be used must be so defined that the helical pitch of the polymerizable liquid-crystal containing the compound is suitable to the above-mentioned object. The content of the compound shall be determined depending on the defined helical pitch and helical twisting power of the optically-active compound, but may be generally at most 0.50 in terms of the ratio by weight to the polymerizable liquid-crystal compound in the polymerizable liquid-crystal composition. Preferably, the ratio is at most 0.30. Even to the system of the type, the organosilicon compound of the invention may be added, and when the adhesiveness of the composition to supporting substrates is improved, the amount of the compound is preferably 0.1% to 10% by weight of the solid content of the polymerizable liquid-crystal compound in the polymerizable liquid-crystal composition.

EXAMPLES

The invention is described in detail with reference to the following Examples, to which, however, the invention should not be limited. Evaluation methods employed in the Examples are described below.
(1) Polymerization condition: In air or in a nitrogen atmosphere, the sample is exposed to light having an intensity of 30 mW/cm² (365 nm) for 30 seconds, using a 250-W ultra-high-pressure mercury lamp at room temperature.
(2) Adhesiveness between substrate and polymer film: The adhesiveness is determined according to a cross-cut tape peeling test of JIS K5400, 8.5.2. Briefly, 100 crosscuts of 1 mm each are formed on the sample, and the sample is tested according to a peeling test with Cellotape (registered trade name). The peeled condition of the crosscuts is observed, and the sample is evaluated according to the following condition.
excellent: From 91 to 100 crosscuts did not peel.
goodish: From 51 to 90 crosscuts did not peel.
bad: From 0 to 50 crosscuts did not peel.
(3) Confirmation of liquid-crystal alignment state: Using an optical system in which a rotary/inclined stage is sandwiched between a rotary polarizing element and a rotary analyzer, the liquid-crystal film obtained is set on the rotary/inclined stage, and the degree of retardation thereof is determined and confirmed while the sample is inclined from the vertical direction to the film surface. Regarding the uniformity of homeotropic alignment and twisted alignment, two polarizers are set in a cross-Nicol condition, and the liquid-crystal film is put between them and observed from its front surface. When there is visually found no light pass (dark field) resulting from the alignment defects of the liquid crystal, then the sample is in a uniform alignment state.

Regarding the uniformity of homogeneous alignment and tilted alignment, two polarizers are set in a cross-Nicol condition, and the liquid-crystal film is put between them, rotated in plane to dark field, and observed. When there is visually found no light pass resulting from the alignment defects of the liquid crystal, then the sample is in a uniform alignment state. The supporting substrate is formed of a saponified TAC film, a non-saponified TAC film or glass. The sample to be tested is formed by applying the composition onto a non-rubbed saponified TAC film or a rubbed saponified TAC film, and aligned and polymerizing it under the condition mentioned below. In Examples 2 to 14, the composition is directly applied to the supporting substrate, and the alignment state and the adhesiveness of the film formed are evaluated; and in Examples 16 to 20, the composition is applied onto the supporting substrate after the substrate is coated with a polymer film, and the alignment of the film of the composition is evaluated.
(4) To measure the molecular weight of the polyimide-type varnish, GPC is employed for which polystyrene is used as a standard sample and DMF is an eluent. The meanings of the symbols used in the Examples are mentioned below, and Me in the chemical formulae is methyl.
DDM: 4,4'-diaminodiphenylmethane,
CBDA: cyclobutanetetracarboxylic acid dianhydride,
PMDA: pyromellitic acid dianhydride,
NMP: N-methyl-2-pyrrolidone,
BD: butyl cellosolve.

Example 1

<Preparation of Polymerizable Liquid-crystal Composition (1)>

[MIX1]

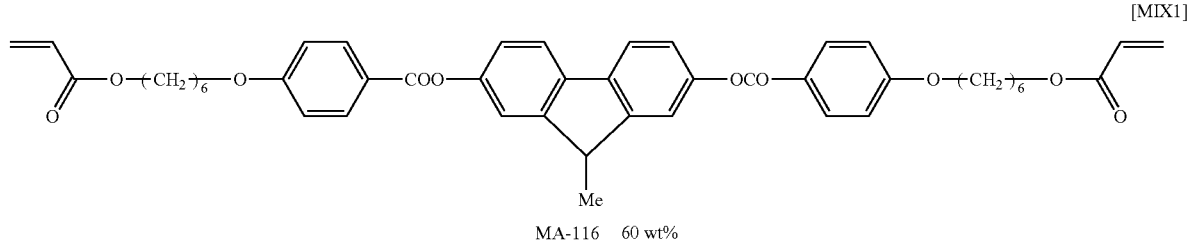

MA-116  60 wt%

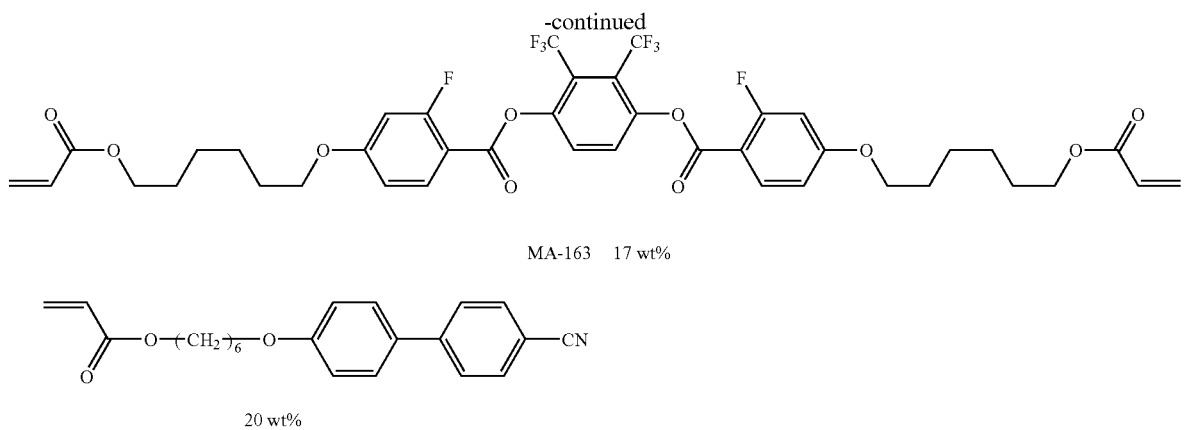

MA-163 17 wt%

20 wt%

To the above-mentioned composition MIX1, added were a polymerization initiator Irgacure 907 in a ratio by weight of 0.03 to the composition and compound (3-1) in a ratio by weight of 0.06 thereto. Toluene was added to the composition to prepare a 75 wt. % solution in toluene.

$$NH_2-CH_2CH_2CH_2-\underset{\underset{OC_2H_5}{|}}{\overset{\overset{OC_2H_5}{|}}{Si}}-OC_2H_5 \quad (3\text{-}1)$$

Example 2

The polymerizable liquid-crystal composition obtained in Example 1 was applied onto a saponified TAC film not subjected to surface treatment such as rubbing, according to a spin-coating method, and heated at 60° C. for 3 minutes to remove the solvent. Then, this was polymerized through exposure to UV rays in a nitrogen flow to obtain an optical film having uniform homeotropic alignment. The retardation of the optical film was determined while it was inclined from the vertical direction to the film face, and the result is given in FIG. 1. The evaluation in the peeling test of the film was "excellent", and the adhesiveness of the film to the supporting substrate, saponified TAC film was good.

Example 3

A polymerizable liquid-crystal composition was prepared in the same manner as in Example 1, except that the amount of compound (3-1) added thereto was 0.1 in terms of the ratio by weight of the compound to MIX1. Using the thus-obtained polymerizable liquid-crystal composition, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the saponified TAC film was good.

Example 4

A polymerizable liquid-crystal composition was prepared in the same manner as in Example 1, except that the amount of compound (3-1) added thereto was 0.1 in terms of the ratio by weight of the compound to MIX1. Using the thus-obtained polymerizable liquid-crystal composition, an optical film having uniform homeotropic alignment was obtained in the same manner as in Example 2, except that the saponified TAC film was subjected to rubbing treatment. The tilt angle dependency of the retardation of the optical film was the same as in Example 2. The evaluation in the peeling test of the film was "excellent", and the adhesiveness of the film to the saponified TAC film was good.

Example 5

A polymerizable liquid-crystal composition was prepared in the same manner as in Example 1, except that the amount of compound (3-1) added thereto was 0.01 in terms of the ratio by weight of the compound to MIX1. Using the thus-obtained polymerizable liquid-crystal composition, an optical film having uniform tilted alignment was obtained in the same manner as in Example 2, except that the saponified TAC film was subjected to rubbing treatment. The retardation of the film was determined while it was inclined from the vertical direction relative to the film face toward the rubbing direction, and the result is given in FIG. 2. The evaluation in the peeling test of the film was "excellent", and the adhesiveness of the film to the saponified TAC film was good.

Example 6

A polymerizable liquid-crystal composition was prepared in the same manner as in Example 1, except that the amount of compound (3-1) added thereto was 0.005 in terms of the ratio by weight of the compound to MIX1. Using the thus-obtained polymerizable liquid-crystal composition, an optical film having uniform homogeneous alignment was obtained in the same manner as in Example 2, except that the saponified TAC film was subjected to rubbing treatment. The retardation of the film was determined while it was inclined from the vertical direction relative to the film face toward the rubbing direction, and the result is given in FIG. 3. The evaluation in the peeling test of the film was "excellent", and the adhesiveness of the film to the saponified TAC film was good.

Example 7

A polymerizable liquid-crystal composition was prepared in the same manner as in Example 1, except that organosilicon compound (4-1-3) mentioned below was used and its amount was 0.1 in terms of the ratio by weight of the compound to MIX1. Using the thus-obtained composition, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the supporting substrate, saponified TAC film was good.

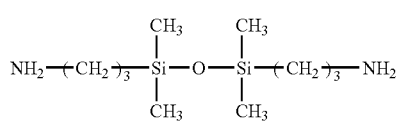

(4-1-3)

Example 8

An optical film having tilted alignment was obtained in the same manner as in Example 7, except that the saponified TAC film was subjected to rubbing treatment. The tilt angle dependency of the retardation of the optical film was the same as in Example 5. The evaluation in the peeling test of the film was "excellent", and the adhesiveness of the film to the saponified TAC film was good.

Example 9

An organosilicon compound having a structural unit represented by Formula (5-1) and having a number-average molecular weight Mn of 1600 (this is hereinafter referred to as compound (5-1)) was dissolved in THF to prepare a 50 wt. % solution thereof. A polymerizable liquid-crystal composition was obtained in the same manner as in Example 1, except that the THF solution was added to MIX1 in a ratio by weight of the compound (5-1) to MIX1 of 0.1. Using this composition, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the saponified TAC film was good.

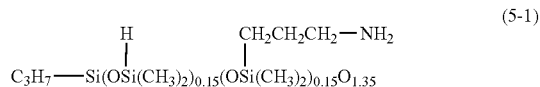

(5-1)

Example 10

An optical film having uniform tilted alignment was obtained in the same manner as in Example 9, except that the ratio of compound (5-1) was 0.01 and the saponified TAC film was subjected to rubbing treatment. The tilt angle dependency of the retardation of the optical film was the same as in Example 5. The evaluation in the peeling test of the film was "excellent", and the adhesiveness of the film to the saponified TAC film was good.

Comparative Example 1

A polymerizable liquid-crystal composition was prepared in the same manner as in Example 1, except that the organosilicon compound was not added thereto. Using the composition, an optical film having uniform homogeneous alignment was obtained in the same manner as in Example 2, except that the surface of the saponified TAC film was subjected to rubbing treatment. The tilt angle dependency of the retardation of the optical film was the same as in Example 6. The evaluation in the peeling test of the film was "bad", and the adhesiveness of the film to the supporting substrate, saponified TAC film was problematic.

Example 11

<Preparation of Polymerizable Liquid-crystal Composition-2>

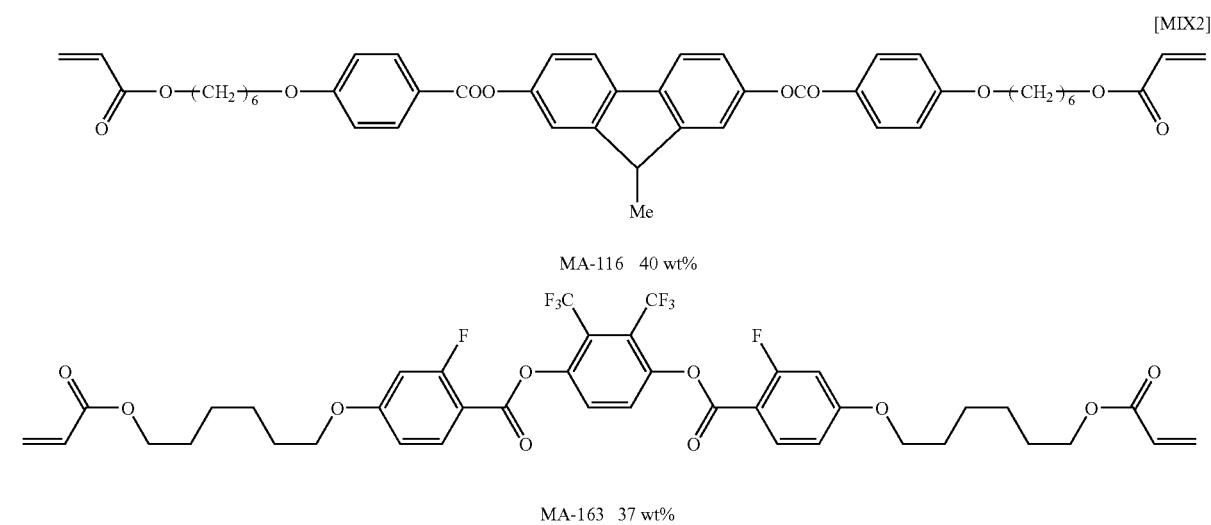

-continued

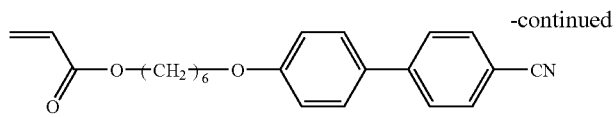

MA-92 10 wt%

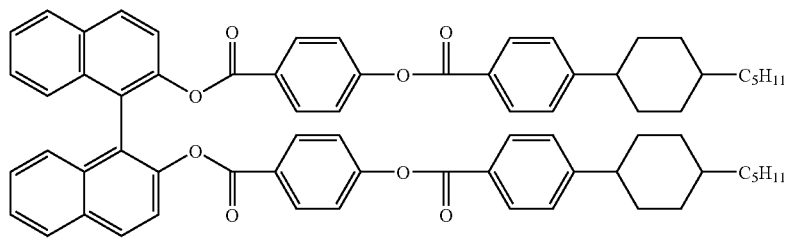

Op-20 10 wt%

To the above-mentioned composition MIX2, added were a polymerization initiator Irgacure 907 in a ratio by weight of 0.03 to the composition and organosilicon compound (3-1) in a ratio by weight of 0.03 thereto. Toluene was added to the composition to prepare a 75 wt. % solution in toluene. Using the thus-obtained polymerizable liquid-crystal composition, an optical film having uniform twisted alignment was obtained in the same manner as in Example 2, except that the saponified TAC film was rubbed. The retardation of the optical film was determined while it was inclined from the vertical direction to the film face, and the result is given in FIG. 4. The evaluation in the peeling test of the film was "excellent", and the adhesiveness of the film to the saponified TAC film was good.

Comparative Example 2

An optical film having twisted alignment was obtained in the same manner as in Example 11, except that the organosilicon compound (3-1) was not added to MIX2. The tilt angle dependency of the retardation of the optical film was the same as in Example 11. The evaluation in the peeling test of the film was "bad", and the adhesiveness of the film to the saponified TAC film was problematic.

Example 12

<Preparation of Polymerizable Liquid-crystal Composition-3>

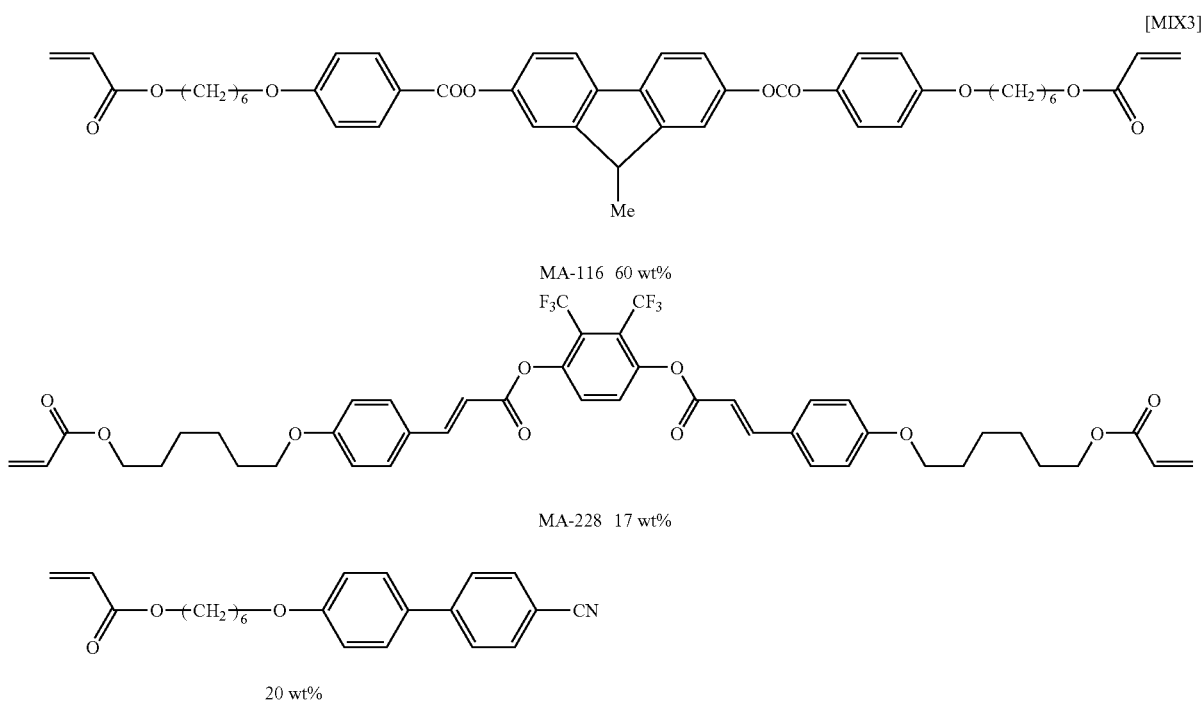

[MIX3]

MA-116 60 wt%

MA-228 17 wt%

20 wt%

To the above-mentioned composition MIX3, added were a polymerization initiator Irgacure 907 in a ratio by weight of 0.03 to the composition and organosilicon compound (3-1) in a ratio by weight of 0.1 thereto. Toluene was added to the composition to prepare a solution containing 75 wt. % of toluene. Using the thus-obtained polymerizable liquid-crystal composition, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the saponified TAC film was good.

Example 13

<Preparation of Polymerizable Liquid-crystal Composition-4>

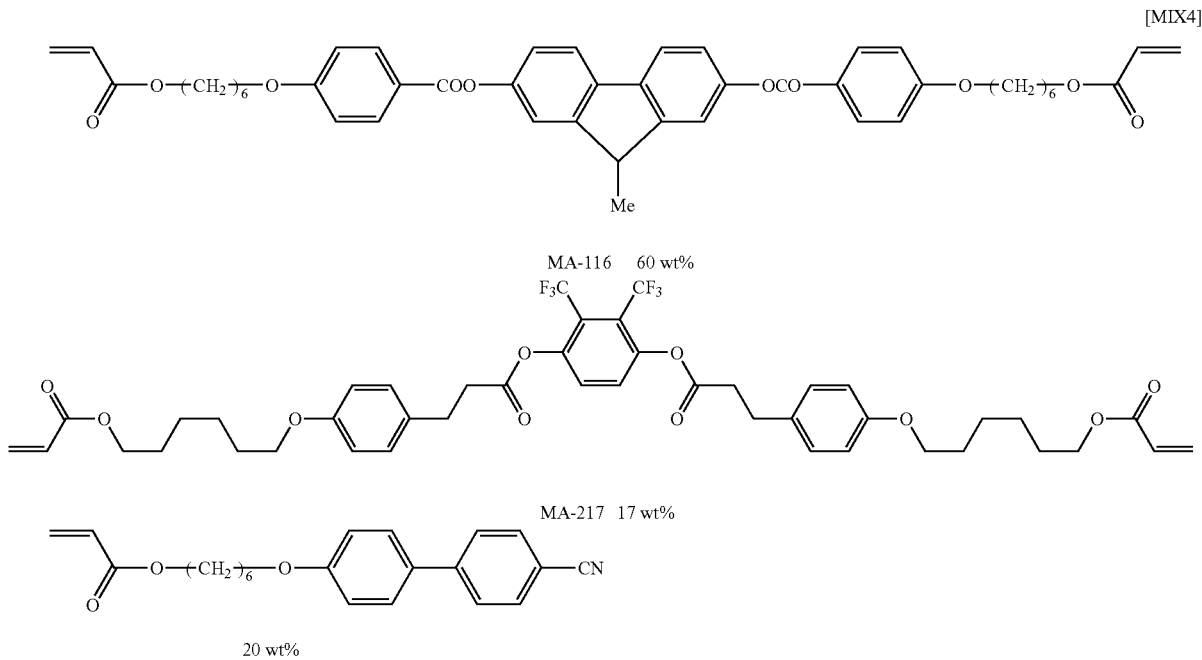

[MIX4]

MA-116  60 wt%

MA-217  17 wt%

20 wt%

To the above-mentioned composition MIX4, added were a polymerization initiator Irgacure 907 in a ratio by weight of 0.03 to the composition and organosilicon compound (3-1) in a ratio by weight of 0.1 thereto. Toluene was added to the composition to prepare a solution containing 75 wt. % of toluene. Thus obtained, the polymerizable liquid-crystal composition is referred to as polymerizable liquid-crystal composition-4. Using the polymerizable liquid-crystal composition-4, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the saponified TAC film was good.

Example 14

<Preparation of Polymerizable Liquid-crystal Composition-5>

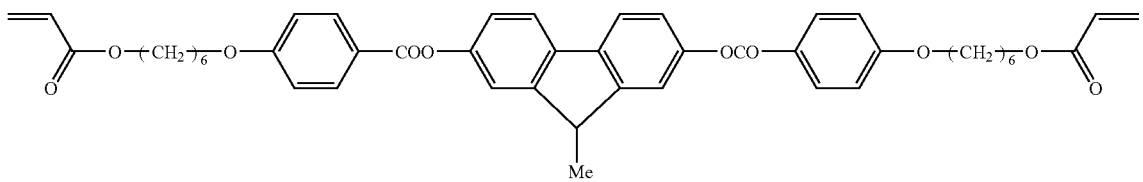

MA-116  60 wt%

-continued

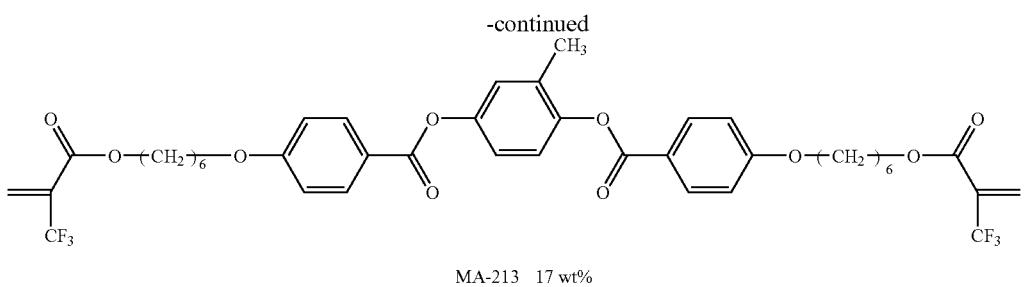

MA-213  17 wt%

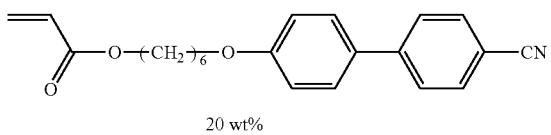

20 wt%

To the above-mentioned composition MIX5, added were a polymerization initiator Irgacure 907 in a ratio by weight of 0.03 to the composition and organosilicon compound (3-1) in a ratio by weight of 0.1 thereto. Toluene was added to the composition to prepare a solution containing 75 wt. % of toluene. Using the thus-obtained polymerizable liquid-crystal composition, an optical film having uniform homeotropic alignment was obtained in the same manner as in Example 2. The tilt angle dependency of the retardation of the optical film was the same as in Example 2. The evaluation in the peeling test of the film was "excellent", and the adhesiveness of the film to the saponified TAC film was good.

Comparative Examples 3 to 5

Polymerizing liquid-crystal compositions were prepared in the same manner as in Examples 12 to 14, except that the organosilicon compound (3-1) was not added thereto. Using the compositions, optical films having homogeneous alignment were obtained in the same manner as in Examples 12 to 14, except that the surface of the saponified TAC film was subjected to rubbing treatment. The tilt angle dependency of the retardation of the optical films was the same as in Example 6. The evaluation in the peeling test of the films was "bad", and the adhesiveness of the films to the saponified TAC film was problematic.

Examples 2 to 14 and Comparative Examples 1 to 5 were summarized in Table 1.

TABLE 1

| Example No. | Liquid-Crystal Composition No. | Organosilicon Compound Compound No. | Amount Added | Surface Treatment | Condition of Liquid Crystal Alignment | Result of Peeling Test |
|---|---|---|---|---|---|---|
| 2 | MIX1 | 3-1 | 0.06 | — | homeotropic | excellent |
| 3 | MIX1 | 3-1 | 0.10 | — | homeotropic | excellent |
| 4 | MIX1 | 3-1 | 0.10 | rubbed | homeotropic | excellent |
| 5 | MIX1 | 3-1 | 0.01 | rubbed | tilted | excellent |
| 6 | MIX1 | 3-1 | 0.005 | rubbed | homogeneous | excellent |
| 7 | MIX1 | 4-1-3 | 0.10 | — | homeotropic | excellent |
| 8 | MIX1 | 4-1-3 | 0.01 | rubbed | tilted | excellent |
| 9 | MIX1 | 5-1 | 0.10 | — | homeotropic | excellent |
| 10 | MIX1 | 5-1 | 0.01 | rubbed | tilted | excellent |
| Comparative Example 1 | MIX1 | — | — | rubbed | homogeneous | bad |
| 11 | MIX2 | 3-1 | 0.03 | rubbed | twisted | excellent |
| 12 | MIX3 | 3-1 | 0.10 | — | homeotropic | excellent |
| 13 | MIX4 | 3-1 | 0.10 | — | homeotropic | excellent |
| 14 | MIX5 | 3-1 | 0.10 | — | homeotropic | excellent |
| Comparative Example 2 | MIX2 | — | — | rubbed | twisted | bad |
| Comparative Example 3 | MIX3 | — | — | rubbed | homogeneous | bad |
| Comparative Example 4 | MIX4 | — | — | rubbed | homogeneous | bad |
| Comparative Example 5 | MIX5 | — | — | rubbed | homogeneous | bad |

Note: The amount of the organosilicon compound is in terms of the ratio by weight to the polymerizable liquid-crystal compound.

Example 15

<Preparation (1) of Polyamic Acid Varnish>

DDM (3.02 g; 1.52×10$^{-2}$ mols) and dewatered NMP (54.0 g) were fed into a 200-ml four-neck flask, and dissolved with stirring in a dry nitrogen atmosphere, and the solution temperature was lowered to 5° C. To this, added was CBDA (2.98 g; 1.52×10$^{-2}$ mols) and reacted for 30 hours. In this stage, the temperature of the reaction system was not specifically controlled. Last, BC (40.0 g) was added to it to prepare a polyamic acid varnish having a polymer component content of 6.0% by weight. This is referred to as polyamic acid varnish A1. In the Examples of the invention, the viscosity-increasing reaction was promoted while the viscosity of the reaction system was monitored. At the time when the viscosity increase became small, BC was added and the viscosity-increasing reaction was stopped. After the addition of BC, the viscosity of the varnish was controlled by heating, and when it became from 55 to 65 mPa·s, the heating operation was stopped. An E-type viscometer was used for the measurement of the viscosity, and the viscosity was measured at 25° C. The varnish obtained was stored at a low temperature. The weight-average molecular weight of the thus-obtained polyamic acid was 50,000. The weight-average molecular weight was measured with a Shimadzu's GPC device (Chromatopack C-RA7) at a column temperature of 50° C.

Example 16

The polyamic acid varnish A1 obtained in Example 15 was applied onto a glass substrate according to a spin-coating process, and pre-baked at 80° C. for 3 minutes, and then heated at 90° C. for 5 minutes to form a polymer film thereon. Next, the polymerizable liquid-crystal composition-4 was applied onto the polymer film not subjected to surface treatment such as rubbing, according to a spin-coating process, and cured in the same manner as in Example 2 to obtain an optical film. Two polarizers were set in a cross-Nicol condition, and the optical film obtained herein was sandwiched between them. In that condition, the optical film had uniform homeotropic alignment in the dark field. When the retardation of the optical film was determined while the film was inclined from the vertical direction to the film face, it gave the same result as in FIG. 1.

Example 17

An optical film having uniform homeotropic alignment was obtained in the same manner as in Example 16, except that the baking condition of the polyamic acid varnish for it was at 210° C. for 30 minutes. When the retardation of the optical film was determined while the film was inclined from the vertical direction to the film face, it gave the same result as in FIG. 1.

Comparative Examples 6 and 7

Cured films were formed from polymerizable liquid-crystal compositions in the same manner as in Examples 16 and 17, except that the organosilicon compound (3-1) was not added to them. In these, however, the liquid crystal was not aligned.

Example 18

Chisso's commercial product, SF330 was diluted to prepare an aqueous 25% solution. This was applied onto a supporting substrate, saponified TAC film according to a spin-coating process, and then dried at 100° C. for 3 minutes to form an alignment control film. Next, the polymerizable liquid-crystal composition-4 was applied onto the polymer film not subjected to surface treatment such as rubbing, according to a spin-coating process, and then cured in the same manner as in Example 2 to obtain an optical film. Two polarizers were set in a cross-Nicol condition, and the optical film obtained herein was sandwiched between them. In that condition, the optical film had uniform homeotropic alignment in the dark field. When the retardation of the optical film was determined while the film was inclined from the vertical direction to the film face, it gave the same result as in FIG. 1.

Example 19

An optical film having uniform homeotropic alignment was obtained in the same manner as in Example 18, except that a non-saponified TAC film was used for it in place of the saponified TAC film. When the retardation of the optical film was determined while the film was inclined from the vertical direction to the film face, it gave the same result as in FIG. 1.

Comparative Example 8

A cured film was formed from a polymerizable liquid-crystal composition in the same manner as in Example 19, except that the organosilicon compound (3-1) was not added to it and SF330 was not applied to the non-saponified TAC film. In this, however, the liquid crystal was not aligned.

Examples 16 to 19 and Comparative Examples 6 to 8 were summarized in Table 2.

TABLE 2

| Example No. | Liquid-Crystal Composition No. | Organosilicon Compound | | | Film on Supportig Substrate | | Condition of |
| --- | --- | --- | --- | --- | --- | --- | --- |
| | | Compound No. | Amount Added | Supporting Substrate | Film Material | Baking Condition | Liquid Crystal Alignment |
| 16 | MIX4 | 3-1 | 0.10 | glass | Polyamic acid | 90° C., 5 min | homeotropic |
| 17 | MIX4 | 3-1 | 0.10 | glass | Polyamic acid | 210° C., 30 min | homeotropic |
| Comparative Example 6 | MIX4 | — | — | glass | Polyamic acid | 90° C., 5 min | not aligned |
| Comparative Example 7 | MIX4 | — | — | glass | Polyamic acid | 210° C., 30 min | not aligned |

TABLE 2-continued

| Example No. | Liquid-Crystal Composition No. | Organosilicon Compound | | Film on Supporting Substrate | | Condition of |
| | | Compound No. | Amount Added | Supporting Substrate | Film Material | Baking Condition | Liquid Crystal Alignment |
|---|---|---|---|---|---|---|---|
| 18 | MIX4 | 3-1 | 0.10 | TAC-1 | SF-330 | 100° C., 3 min | homeotropic |
| 19 | MIX4 | 3-1 | 0.10 | TAC-2 | SF-330 | 100° C., 3 min | homeotropic |
| Comparative Example 8 | MIX4 | — | — | TAC-2 | — | — | not aligned |

Note 1: The amount of the organosilicon compound is in terms of the ratio by weight to the polymerizable liquid-crystal compound.

Note 2: In the column of supporting substrate, TAC-1 means a saponified TAC film, and TAC-2 means a non-saponified TAC film.

From the results in the above-mentioned Examples and Comparative Examples, it is understood that the optical films obtained from the polymerizable liquid-crystal compositions of the invention have good adhesiveness to the supporting substrate, saponified TAC film. In addition, it is further understood that the presence or absence of the alignment treatment of the supporting substrate and the control of the amount of the organosilicon compound in the composition as well as the coating treatment of the surface of the supporting substrate with a specific resin may control the alignment state of the liquid-crystal of the optical films, irrespective of the type of the supporting substrate.

INDUSTRIAL APPLICABILITY

The invention provides a liquid-crystal film having good adhesiveness, good heat resistance and good alignment uniformity, and it simplifies the surface treatment of the supporting substrates, films and glass substrates for improving the adhesiveness of the film to them. The invention may be applied to supporting substrates subjected to mechanical surface treatment such as rubbing. By controlling the presence or absence of the surface treatment of supporting substrate and the content of the organosilicon compound in the composition, the alignment state of the liquid-crystal in the film can be controlled.

Figure 1:
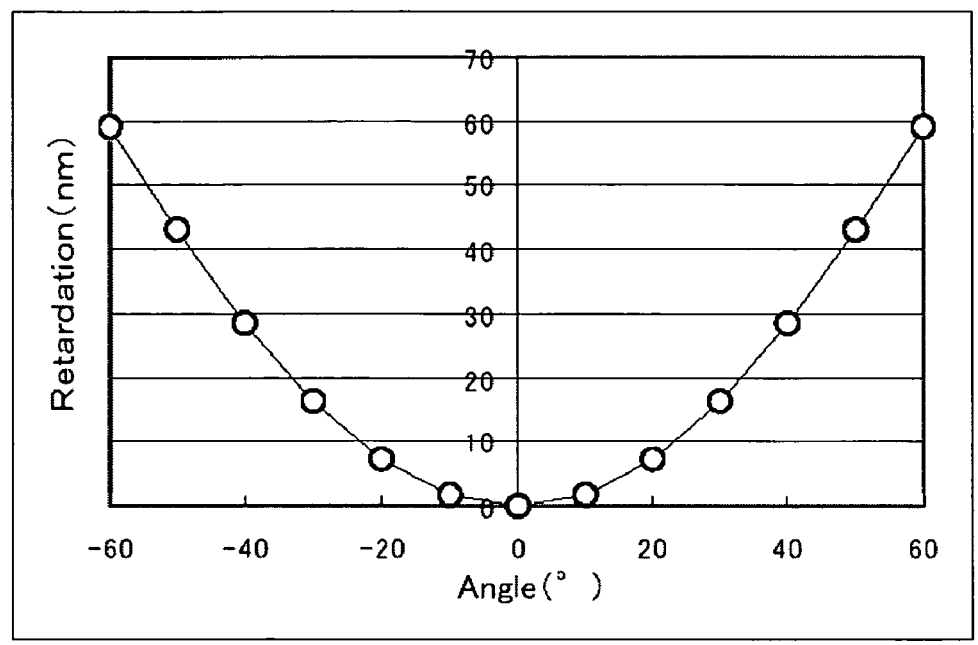
FIG. 1: Result of measurement of the retardation of the optical film obtained in Example 2 with the film being inclined from the vertical direction to the film face.
Figure 2:
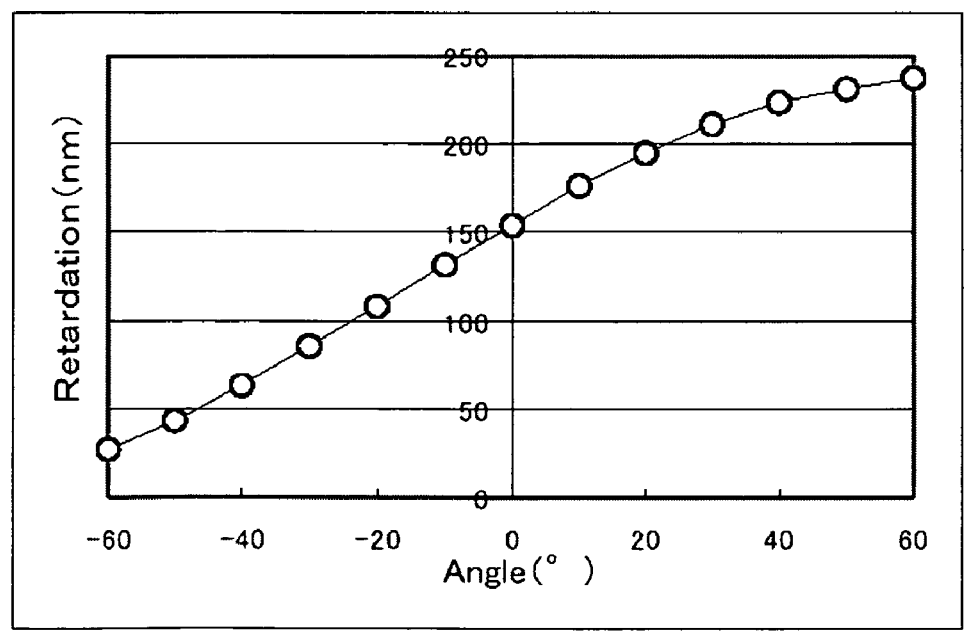
FIG. 2: Result of measurement of the retardation of the optical film obtained in Example 5 with the film being inclined from the vertical direction relative to the film face toward the rubbing direction.
Figure 3:
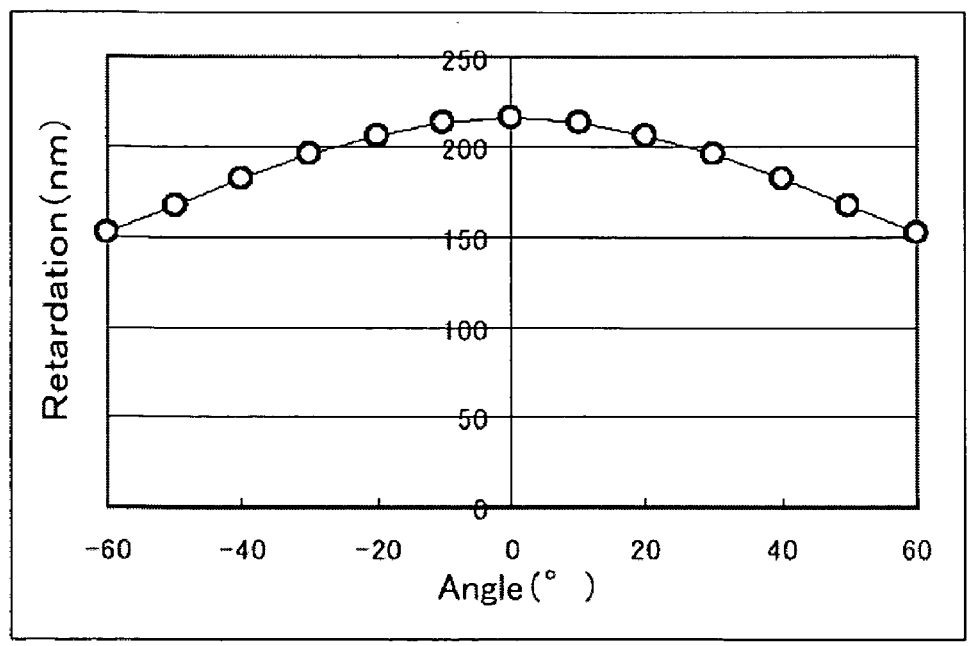
FIG. 3: Result of measurement of the retardation of the optical film obtained in Example 6 with the film being inclined from the vertical direction relative to the film face toward the rubbing direction.
Figure 4:
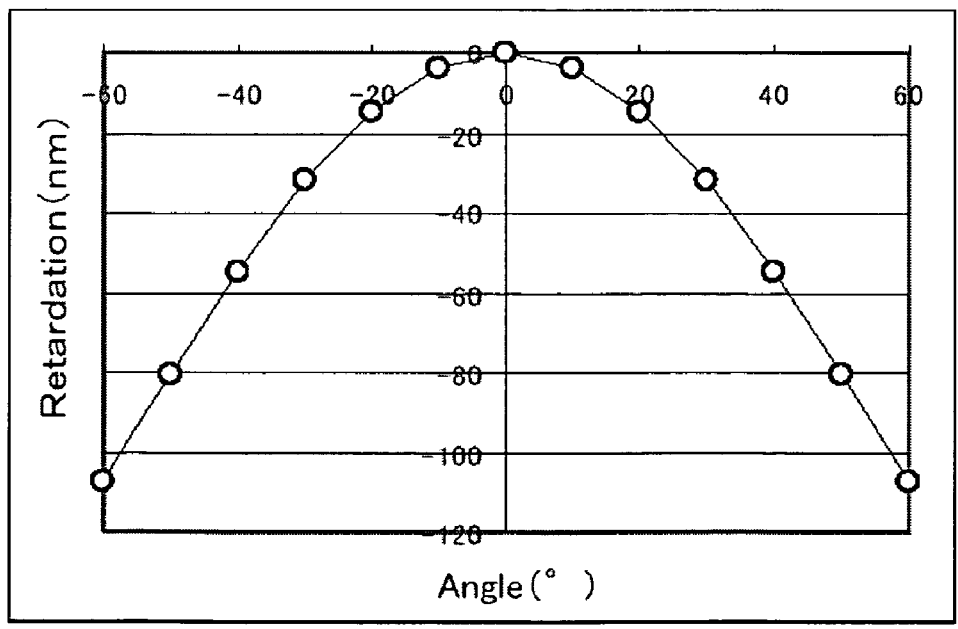
FIG. 4: Result of measurement of the retardation of the optical film obtained in Example 11 with the film being inclined from the vertical direction to the film face.

What is claimed is:

1. A polymerizable liquid-crystal composition containing a polymerizable liquid-crystal compound represented by Formula (1) and an organosilicon compound having a primary amino group:

(1)

wherein W is hydrogen, alkyl having 1 to 25 carbon atoms, alkenyl having 2 to 6 carbon atoms, halogen, —CN, or -(G-SP)$_r$-P; in these alkyl and alkenyl, optional —CH$_2$— may be replaced by —O—, —S—, —NH—, —N(CH$_3$)—, —CO—, —COO—, —OCO—, —OCO—O—, —S—CO—, —CO—S— or —C≡C—, and optional hydrogen may be replaced by halogen; P is a polymerizable group; Sp is an alkylene having 1 to 20 carbon atoms, and in the alkylene, when the number of carbon atoms is 2 or more, optional —CH$_2$— may be replaced by —O—, —CH=CH— or —C≡C—; G is a single bond, —O—, —S—, —CO—, —COO—, —OCO—, —O—COO—, —SO$_2$—O—, —O—SO$_2$—, —CH$_2$O—, —OCH$_2$—, —CF$_2$O—, —OCF$_2$—, —CH=CH—COO—, —OCO—CH=CH—, —C≡C—COO—, —OCO—C≡C—, —(CH$_2$)$_3$O—, —O(CH$_2$)$_3$—, —CH=CH—CH$_2$O—, —OCH$_2$—CH=CH—, —(CH$_2$)$_2$—CF$_2$O— or —OCF$_2$—(CH$_2$)$_2$—; r is 0 or 1; and MG is a mesogen skeleton represented by Formula (2):

(2)

wherein T$^1$ and T$^2$ are independently 1,4-phenylene in which optional —CH= may be replaced by —N=, 1,4-cyclohexylene in which optional —CH$_2$— may be replaced by —O— or/and —S— and two carbon atoms not adjacent to each other may be crosslinked, 1,4-cyclohexenylene, naphthalene-2,6-diyl or fluorene-2,7-diyl; optional hydrogen in these rings may be replaced by halogen, —CN, —CF$_3$, —CF$_2$H, —NO$_2$, or alkyl having 1 to 7 carbon atoms; in the alkyl having 1 to 7 carbon atoms, optional —CH$_2$— may be replaced by —O—, —CH=CH— or —C≡C—, and optional hydrogen may be replaced by halogen; G$^1$ is a single bond, —O—, —CO—, —COO—, —OCO—, —SO$_2$—O—, —O—SO$_2$—, —OCF$_2$—, —CF$_2$O—, —CF=CF—, —CF$_2$CF$_2$—, —CH=CH—, —C≡C—, —CH=CH—COO—, —OCO—CH=CH—, —CH=CH—CH$_2$O—, —OCH$_2$—CH=CH—, —CONH—, —NHCO—, —(CH$_2$)$_2$—COO—, —OCO—(CH$_2$)$_2$—, —(CH$_2$)$_b$—, —O(CH$_2$)$_b$—, —(CH$_2$)$_b$O—, or —O(CH$_2$)$_b$O—; in these groups, b is an integer of 1 to 20; f is an integer of 0 to 4, and when f is 2 to 4, plural T$^1$'s may be the same or different and plural G$^1$'s may be the same or different.

2. The polymerizable liquid-crystal composition according to claim 1, which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; and P is acryloyloxy, methacryloyloxy, CH$_2$=C(CF$_3$)—COO—, CH$_2$=CF—COO—, vinyloxy, maleimido or vinylcarbonyl.

3. The polymerizable liquid-crystal composition according to claim 1, which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; P is acryloyloxy, methacryloyloxy, CH$_2$=C(CF$_3$)—COO—, CH$_2$=CF—COO—, vinyloxy, maleimido or vinylcarbonyl; G is a single bond, —O—, —CO—, —COO—, —OCO—, —CF$_2$O—, —OCF$_2$—, —CH=CH—COO—, —OCO—CH=CH—, —C≡C—COO—, —OCO—C≡C—, —CH=CH—CH$_2$O—, —OCH$_2$—CH=CH—, —(CH$_2$)$_2$—CF$_2$O— or —OCF$_2$—(CH$_2$)$_2$—; Sp is an alkylene having 1 to 20 carbon atoms, and in the alkylene, optional —CH$_2$— may be replaced by —O—; and G$^1$ is a single bond, —O—, —CO—, —COO—, —OCO—, —(CH$_2$)$_2$—COO—, —OCO—(CH$_2$)$_2$—, —CH=CH—COO—, —OCO—CH=CH—, —CH$_2$CH$_2$—, —(CH$_2$)$_4$—, —(CH$_2$)$_3$O—, —O(CH$_2$)$_3$—, —OCH$_2$— or —CH$_2$O—.

4. The polymerizable liquid-crystal composition according to claim 1, which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; P is acryloyloxy, methacryloyloxy, CH$_2$=C(CF$_3$)—COO—, or CH$_2$=CF—COO—; G is a single bond, or —O—; Sp is an alkylene having 2 to 20 carbon atoms, and in the alkylene, optional —CH$_2$— may be replaced by —O—; and G$^1$ is a single bond, —O—, —CO—, —COO—, —OCO—, —(CH$_2$)$_2$—COO—, —OCO—(CH$_2$)$_2$—, —CH$_2$CH$_2$—, —(CH$_2$)$_4$—, —(CH$_2$)$_3$O—, —O(CH$_2$)$_3$—, —OCH$_2$— or —CH$_2$O—.

5. The polymerizable liquid-crystal composition according to claim 1, which contains an organosilicon compound having a primary amino group, and a polymerizable liquid-crystal compound in which W is alkyl having 1 to 10 carbon atoms, alkoxy having 1 to 10 carbon atoms, —OCF$_3$, —CN, fluorine, or -(G-Sp)$_r$-P; P is acryloyloxy, methacryloyloxy, CH$_2$=C(CF$_3$)—COO—, or CH$_2$=CF—COO—; G is a single bond, or —O—; Sp is an alkylene having 4 to 8 carbon atoms; and G$^1$ is a single bond, —O—, —CO—, —COO—, —OCO—, —(CH$_2$)$_2$—COO—, —OCO—(CH$_2$)$_2$—, —CH$_2$CH$_2$—, —(CH$_2$)$_4$—, —(CH$_2$)$_3$O—, —O(CH$_2$)$_3$—, —OCH$_2$— or —CH$_2$O—; r is 1; and f is an integer of 0 to 2.

6. The polymerizable liquid-crystal composition according to claim 1, wherein the organosilicon compound having a primary amino group is a compound represented by Formula (3):

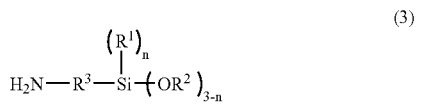

(3)

wherein R$^1$ is hydrogen, or a hydrocarbon group having 1 to 8 carbon atoms; R$^2$ is a hydrocarbon group having 1 to 8 carbon atoms; R$^3$ is alkylene having 1 to 20 carbon atoms, and in the alkylene, optional —CH$_2$— may be replaced by —O—, —NH—, —CH=CH—, —CONH—, cycloalkylene having 3 to 8 carbon atoms, or arylene having 6 to 10 carbon atoms, and in the arylene, optional hydrogen may be replaced by alkyl having 1 to 4 carbon atoms; and n is an integer of 0 to 2.

7. The polymerizable liquid-crystal composition according to claim 6, wherein R$^1$ is hydrogen, or a hydrocarbon group having 1 to 3 carbon atoms; R$^2$ is a hydrocarbon group having 1 to 4 carbon atoms; and R$^3$ is alkylene having 1 to 12 carbon atoms, and in the alkylene, optional —CH$_2$— may be replaced by —O—, —NH—, —CONH—, or arylene having 6 to 10 carbon atoms, and in the arylene, optional hydrogen may be replaced by alkyl having 1 to 4 carbon atoms.

8. The polymerizable liquid-crystal composition according to claim 6, wherein R$^1$ is hydrogen, or a hydrocarbon group having 1 to 3 carbon atoms; R$^2$ is a hydrocarbon group having 1 to 4 carbon atoms; and R$^3$ is alkylene having 3 to 12 carbon atoms, and in the alkylene, optional —CH$_2$— may be replaced by —O—, —NH— or phenylene.

9. The polymerizable liquid-crystal composition according to claim 6, wherein R$^1$ is hydrogen, or a hydrocarbon group having 1 to 3 carbon atoms; R$^2$ is a hydrocarbon group having 1 to 4 carbon atoms; and R$^3$ is alkylene having 3 to 12 carbon atoms, and in the alkylene, optional —CH$_2$— may be replaced by —O— or —NH—.

10. The polymerizable liquid-crystal composition according to claim 1, wherein the organosilicon compound having a primary amino group is a compound represented by Formula (4):

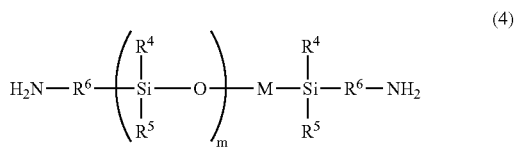

(4)

wherein R$^4$ and R$^5$ are independently alkyl having 1 to 4 carbon atoms, or phenyl; R$^6$ is alkylene having 1 to 10 carbon atoms, and in the alkylene, optional —CH$_2$— may be replaced by —O— or phenylene; in the phenylene, optional hydrogen may be replaced by alkyl having 1 to 4 carbon atoms; M is a single bond or phenylene; and m is an integer of 0 to 10.

11. The polymerizable liquid-crystal composition according to claim 10, wherein R$^4$ and R$^5$ are independently alkyl having 1 to 4 carbon atoms, or phenyl; and R$^6$ is alkylene having 1 to 10 carbon atoms, and in the alkylene, optional —CH$_2$— may be replaced by —O—.

12. The polymerizable liquid-crystal composition according to claim 10, wherein R$^4$ and R$^5$ are independently alkyl having 1 to 4 carbon atoms; R$^6$ is alkylene having 1 to 10 carbon atoms, and in the alkylene, optional —CH$_2$— may be replaced by —O—.

13. The polymerizable liquid-crystal composition according to claim 10, wherein R$^4$ and R$^5$ are methyl or ethyl; and R$^6$ is alkylene having 1 to 10 carbon atoms, and in the alkylene, optional —CH$_2$— may be replaced by —O—.

14. The polymerizable liquid-crystal composition according to claim 1, wherein the organosilicon compound having a primary amino group is a silsesquioxane derivative having a constitutive unit represented by Formula (5):

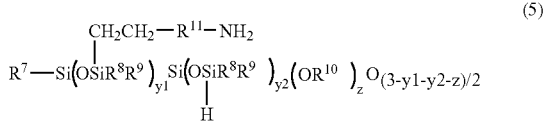

(5)

wherein $R^7$, $R^8$ and $R^9$ are independently alkyl having 1 to 18 carbon atoms, cycloalkyl having 3 to 8 carbon atoms, alkenyl having 2 to 6 carbon atoms, cloalkenyl having 4 to 8 carbon atoms, aryl having 6 to 10 carbon atoms, or arylalkyl having 7 to 10 carbon atoms; $R^{10}$ is alkyl having 1 to 4 carbon atoms, $CH_3CO$—, $CH_2$=CHCO—, or $CH_2$=$C(CH_3)CO$—; z is 0, or 0.05 to 2.0; (y1+y2) is 0.1 to 2.0 when z=0, and is 0.05 to 2.0 when z≠0, and y2 is 0, or less than or equal to 3 times of y1; (y1+y2+z) is 0.1 to 3.0; and $R^{11}$ is alkylene having 1 to 8 carbon atoms in which optional —$CH_2$— may be replaced by —O— or —NH—.

15. The polymerizable liquid-crystal composition according to claim 14, wherein $R^8$ and $R^9$ are methyl, isopropyl, isobutyl, tert-butyl or phenyl; and $R^{10}$ is alkyl having 1 to 4 carbon atoms; and $R^{11}$ is —$CH_2$—.

16. The polymerizable liquid-crystal composition according to claim 1, wherein the amount of the organosilicon compound having a primary amino group is 0.0001 to 0.30 in term of the ratio by weight thereof to the polymerizable liquid-crystal compound.

17. A polymerizable liquid-crystal layer obtained by directly applying the polymerizable liquid-crystal composition defined in claim 1 onto a substrate.

18. The polymerizable liquid-crystal layer according to claim 17, wherein the substrate is a glass substrate.

19. The polymerizable liquid-crystal layer according to claim 17, wherein the substrate is a plastic substrate.

20. The polymerizable liquid-crystal layer according to claim 17, wherein the substrate is a plastic substrate obtained by using any one selected from polyimide, polyamidimide, polyamide, polyetherimide, polyether-ether-ketone, polyether-ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, partially-saponified triacetyl cellulose, epoxy resin, phenol resin and norbornene resin.

21. The polymerizable liquid-crystal layer according to claim 17, wherein the substrate is mechanically, physically or chemically surface-treated.

22. The polymerizable liquid-crystal layer according to claim 21, wherein the surface treatment is rubbing treatment.

23. The polymerizable liquid-crystal layer according to claim 21, wherein the surface treatment is corona treatment or plasma treatment.

24. The polymerizable liquid-crystal layer according to claim 21, wherein the surface treatment is coating treatment with polymer.

25. The polymerizable liquid-crystal layer according to claim 21, wherein the surface treatment is coating treatment with a polymer having at least one polar group selected from a carboxyl group, a hydroxyl group and an amino group in the molecular.

26. The polymerizable liquid-crystal layer according to claim 21, wherein the surface treatment is coating treatment with a solution of a polyimide polymer.

27. The polymerizable liquid-crystal layer according to claim 21, wherein the surface treatment is coating treatment with a solution of at least one selected from polyamic acid, polyamic acid amide, polyamic acid ester, soluble polyimide and polyamidimide.

28. The polymerizable liquid-crystal layer according to claim 21, wherein the surface treatment is coating treatment with a solution of any one of polyamic acid and polyamic acid amide.

29. The polymerizable liquid-crystal layer according to claim 21, wherein the surface treatment is coating treatment with a solution of at least two selected from polyamic acid, polyamic acid amide, polyamic acid ester, soluble polyimide and polyamidimide.

30. The polymerizable liquid-crystal layer according to claim 21, wherein the surface treatment is coating treatment with a solution of one type of polyamic acid only, or with a solution of two types of polyamic acids.

31. The polymerizable liquid-crystal layer according to claim 21, wherein the surface treatment is coating treatment with a solution of a hydrolyzed product of a trialkoxysilane having an amino group.

32. The polymerizable liquid-crystal layer according to claim 21, wherein the surface treatment is coating treatment with polymer followed by rubbing treatment.

33. The polymerizable liquid-crystal layer according to claim 17, wherein the alignment state of the long molecular axis of the liquid crystal molecules in the polymerizable liquid-crystal layer is homeotropic alignment.

34. The polymerizable liquid-crystal layer according to claim 17, wherein the alignment state of the long molecular axis of the liquid crystal molecules in the polymerizable liquid-crystal layer is tilted alignment.

35. The polymerizable liquid-crystal layer according to claim 17, wherein the alignment state of the long molecular axis of the liquid crystal molecules in the polymerizable liquid-crystal layer is homogeneous alignment.

36. The polymerizable liquid-crystal layer according to claim 17, wherein the alignment state of the long molecular axis of the liquid crystal molecules in the polymerizable liquid-crystal layer is twisted alignment.

37. A liquid-crystal film obtained through polymerization of the polymerizable liquid-crystal layer defined in claim 17.

38. An optical compensation device comprising at least one liquid-crystal film defined in claim 37.

39. An optical device comprising at least one liquid-crystal film defined in claim 37 and a polarizer.

40. A liquid-crystal display device comprising the optical compensation device defined in claim 38 on the inner face or the outer face of a liquid-crystal cell.

41. A liquid-crystal display device comprising the optical device defined in claim 39 on the inner face or the outer face of a liquid-crystal cell.

42. A polymerizable liquid-crystal layer obtained by directly applying the polymerizable liquid-crystal composition defined in claim 6 onto a substrate.

43. A polymerizable liquid-crystal layer obtained by directly applying the polymerizable liquid-crystal composition defined in claim 10 onto a substrate.

44. A polymerizable liquid-crystal layer obtained by directly applying the polymerizable liquid-crystal composition defined in claim 14 onto a substrate.

* * * * *